US007634320B2

(12) United States Patent
Sakurai

(10) Patent No.: US 7,634,320 B2
(45) Date of Patent: Dec. 15, 2009

(54) INTERLOCK CONTROL APPARATUS

(75) Inventor: Toshio Sakurai, Miyagi-gun (JP)

(73) Assignee: Tokyo Electron Limited, Tokyo (JP)

( * ) Notice: Subject to any disclaimer, the term of this patent is extended or adjusted under 35 U.S.C. 154(b) by 287 days.

(21) Appl. No.: 11/669,450

(22) Filed: Jan. 31, 2007

(65) Prior Publication Data

US 2007/0203586 A1 Aug. 30, 2007

Related U.S. Application Data

(60) Provisional application No. 60/783,828, filed on Mar. 21, 2006.

(30) Foreign Application Priority Data

Feb. 24, 2006 (JP) ............................ 2006-048474

(51) Int. Cl.
*G05B 19/18* (2006.01)
*H04J 3/04* (2006.01)

(52) U.S. Cl. ............................ 700/3; 710/110; 370/535

(58) Field of Classification Search ..................... 700/2, 700/3; 710/110; 370/535–537
See application file for complete search history.

(56) References Cited

U.S. PATENT DOCUMENTS 6,144,654 A * 11/2000 Ibanez-Meier et al. ...... 370/342
6,618,628 B1 * 9/2003 Davlin et al. .................. 700/3

FOREIGN PATENT DOCUMENTS

JP 5-204401 8/1993

* cited by examiner

*Primary Examiner*—Ryan A Jarrett
*Assistant Examiner*—Sivalingam Sivanesan
(74) *Attorney, Agent, or Firm*—Oblon, Spivak, McClelland, Maier & Neustadt, L.L.P.

(57) ABSTRACT

An interlock control apparatus for a plurality of control modules each of which controls driving of at least one piece of equipment is of a simplified structure. The interlock control apparatus comprises slave switching apparatuses corresponding respectively to the control modules. Each of the slave switching apparatuses comprises a multiplexing apparatus that produces a multiplexed signal by multiplexing state detecting signals each of which indicates any of a plurality of states of a piece of the equipment whose driving is controlled by the corresponding control module, a storage apparatus that stores the multiplexed signal, a reading apparatus that reads out the stored multiplexed signal, a separating apparatus that separates the read out multiplexed signal so as to produce a plurality of separated signals, a transmitting apparatus that transmits a predetermined separated signal out of the separated signals to the control modules other than the corresponding control module, and at least one controller that controls driving of a corresponding piece of the equipment based on the predetermined separated signals.

8 Claims, 31 Drawing Sheets

POINT A DATA

POINT B (DIGITAL DATA)

POINT C (TRANSMITTED DATA)

POINT B (TRANSMITTED DATA)

POINT A (TRANSMITTED DATA)
CLOCK SIGNAL
FRAME PULSE SIGNAL
MULTIPLEXED DATA
D
E
X
...
ERROR MONITORING DATA
MULTI FRAME 1
ERROR MONITORING DATA
MULTI FRAME 2

POINT B (TRANSMITTED DATA)
CLOCK SIGNAL
FRAME PULSE SIGNAL
MULTIPLEXED DATA
ERROR MONITORING DATA
MULTI FRAME 1
ERROR MONITORING DATA
MULTI FRAME 2

POINT A (TRANSMITTED DATA)

POINT B (TRANSMITTED DATA)

POINT C (TRANSMITTED DATA)

INTERLOCK CONTROL APPARATUS

BACKGROUND OF THE INVENTION

1. Field of the Invention

The present invention relates to an interlock control apparatus for a plurality of control modules, and in particular relates to an interlock control apparatus that implements interlock control between a plurality of control modules each of which controls driving of at least one piece of equipment in a semiconductor manufacturing apparatus such as an etching apparatus.

2. Description of the Related Art

A conventional semiconductor manufacturing apparatus such as an etching apparatus may have an interlock control function. In such a conventional semiconductor manufacturing apparatus having an interlock function, an interlock circuit is provided for each of control modules which are for controlling a plurality of pieces of equipment for realizing functions of the semiconductor manufacturing apparatus, and interlock control is carried out for each of the control modules.

Moreover, the interlock control may also be carried out in a linked fashion between the control modules, and in this case signals for the interlock control are sent and received between the control modules. That is, in a conventional interlock control apparatus, separate interlock control signals for each of interlock factors for implementing the interlock control are sent and received between the control modules, whereby the interlock control is carried out in a linked fashion between the control modules (see, for example, Japanese Laid-Open Patent Publication No. H05-204401). For example, in the case that a gas supply control module that controls a gas supply apparatus implements interlock control on the gas supply apparatus, a plurality of interlock factors including, for example, a gas leak alarm from a gas leak detector are detected respectively by a plurality of control modules, a separate interlock control signal for each of the detected interlock factors is sent to the gas supply control module, and the gas supply control module receives the plurality of interlock factors, and in the case that an interlock condition is satisfied, implements interlock control on a gas supply box, which is the piece of equipment that is the interlock destination.

However, as the functions of an apparatus such as a semiconductor manufacturing apparatus become more complex, the interlock conditions also become more complex, and moreover if much importance is attached to safety of the apparatus, then the interlock conditions again become more complex; for a conventional interlock control apparatus, separate interlock control signals for each of the interlock factors are sent and received between the control modules as described above, and hence the number of interlock control signals has become very large, and wiring for connecting the control modules together has become complex.

Moreover, for a conventional interlock control apparatus, the interlock control signals sent and received between the control modules differ for each interlock condition, and hence it has been necessary to newly design or modify the design of the interlock circuit for each of the control modules each time a new semiconductor manufacturing apparatus is developed, a control module is added, or the like.

Furthermore, for a conventional interlock control apparatus, as the interlock function has become more complex, it has become difficult to analyze the cause when interlock control has been implemented due to a problem with the apparatus or the like.

SUMMARY OF THE INVENTION

It is an object of the present invention to provide an interlock control apparatus of a simplified structure.

To attain the above object, in a first aspect of the present invention, there is provided an interlock control apparatus for a plurality of control modules each of which controls driving of at least one piece of equipment, the interlock control apparatus comprising slave switching apparatuses corresponding respectively to the control modules, wherein each of the slave switching apparatuses comprises a multiplexing apparatus that produces a multiplexed signal by multiplexing state detecting signals each of which indicates any of a plurality of states of a piece of the equipment whose driving is controlled by the corresponding control module, a storage apparatus that stores the multiplexed signal, a reading apparatus that reads out the stored multiplexed signal, a separating apparatus that separates the read out multiplexed signal so as to produce a plurality of separated signals, a transmitting apparatus that transmits a predetermined separated signal out of the separated signals to the control modules other than the corresponding control module, and at least one controller that controls driving of a corresponding piece of the equipment based on the predetermined separated signals.

According to the above construction, the number of signals sent and received between the control modules can be reduced, and hence the amount of wiring for connecting the control modules together can be reduced. The structure of the interlock control apparatus can thus be simplified.

Preferably, the multiplexing apparatus multiplexes the state detecting signals in a preset order, and the reading apparatus reads out the state detecting signals from the stored multiplexed signal based on preset conditions, and re-multiplexes the read out state detecting signals in the read out order According to the above construction, even if functions of the control modules are added or changed, or a new control module is added, desired interlock control can be carried out for the control modules by changing the preset order and the preset conditions. In this way, addition or changing of the functions of the control modules, or addition of a new control module can easily be coped with.

Preferably, the interlock control apparatus further comprises a separated signal monitoring apparatus determines whether or not one of the separated signals is normal, and in response to that separated signal not being normal, produces a control signal for driving the piece of the equipment corresponding to that separated signal toward safety, and outputs the control signal to the controller corresponding to that separated signal.

According to the above construction, the safety of the interlock control apparatus can be improved.

Preferably, each of the slave switching apparatuses has a monitoring interface enabling display of the multiplexed signal.

According to the above construction, the operator can thus easily inspect the state of the apparatus from the interlock factor signals, and hence can easily analyze the cause or the like in the case that a problem has arisen in the apparatus.

Preferably, the interlock control apparatus further comprises a master switching apparatus, to which the transmitting apparatus is connected, that connects the slave switching apparatuses together, wherein the master switching apparatus comprises a master multiplexing apparatus that produces a master multiplexed signal by multiplexing the predetermined separated signals transmitted respectively by the transmitting apparatuses, a master storage apparatus that stores the master multiplexed signal, a master reading apparatus that reads out the stored master multiplexed signal, a master separating apparatus that separates the read out master multiplexed signal so as to produce a plurality of master separated signals, and an output apparatus that outputs one of the master separated signals to one of the slave switching apparatuses.

According to the above construction, the state detecting signals to be transmitted between the control modules can thus be made into a multiplexed signal. As a result, the number of signals sent and received between the control modules can be reduced, and hence the amount of wiring for connecting the control modules together can be reduced. The structure of the interlock control apparatus can thus be simplified. Moreover, even if functions of the control modules are added or changed, or a new control module is added, desired interlock control can be carried out for the control modules by changing the construction of the master switching apparatus. In this way, addition or changing of the functions of the control modules, or addition of a new control module can easily be coped with.

Preferably, the master multiplexing apparatus multiplexes the transmitted predetermined separated signals in a preset order, and the master reading apparatus reads out the state detecting signals from the stored master multiplexed signal based on preset conditions, and re-multiplexes the read out state detecting signals in the read out order.

According to the above construction, even if functions of the control modules are added or changed, or a new control module is added, desired interlock control can be carried out for the control modules by changing the preset order and the preset conditions. In this way, addition or changing of the functions of the control modules, or addition of a new control module can easily be coped with.

Preferably, the multiplexing apparatus multiplexes the state detecting signal and the master separated signal.

According to the above construction, the interlock control can be carried out for the control modules based on a plurality of states of the equipment corresponding to the control modules.

Preferably, each of the slave switching apparatuses further comprises a master separated signal monitoring apparatus that determines whether or not the master separated signal is normal, and in response to the master separated signal not being normal, produces a control signal for driving the equipment controlled by the control module corresponding to the master separated signal toward safety.

According to the above construction, the safety of the interlock control apparatus can be improved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIG. 1I is an enlarged view schematically showing the construction of part of the interlock control apparatus shown in FIG. 1A;

DETAILED DESCRIPTION OF THE PREFERRED EMBODIMENTS

Preferred embodiments of the present invention will be described in detail below with reference to the drawings.

First, the basic construction of an interlock control apparatus according to an embodiment of the present invention will be described.

Figure 1A:
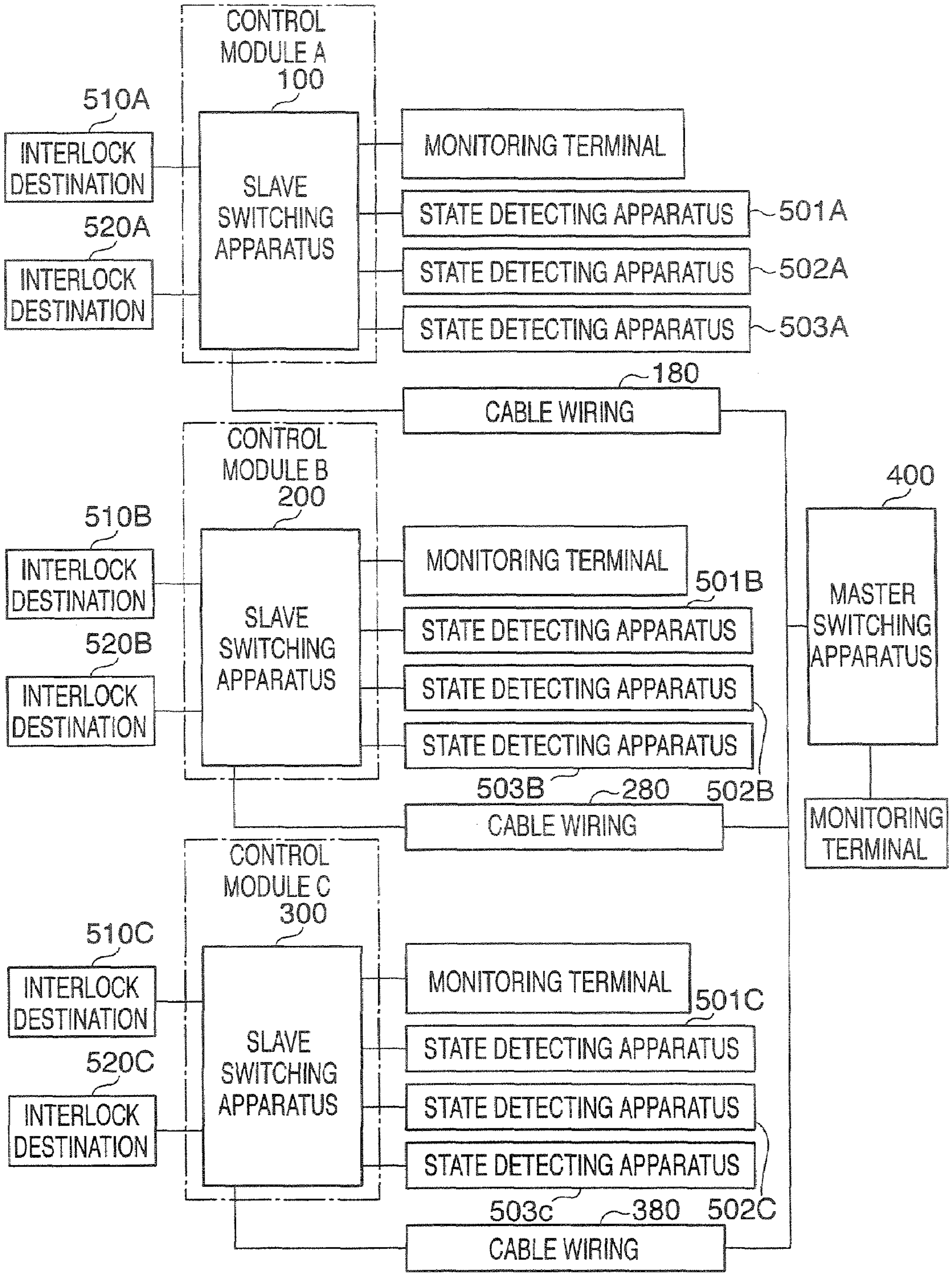
FIG. 1A is a block diagram schematically showing the overall construction of an interlock control apparatus according to an embodiment of the present invention.

FIG. 1A is a block diagram schematically showing the overall construction of an interlock control apparatus according to an embodiment of the present invention, and FIGS. 1B to 1I are enlarged views schematically showing the construction of parts of the interlock control apparatus. In the following description, it is assumed that the interlock control apparatus implements interlock control between control modules A, B, and C that control equipment groups for each of various functions in a processing apparatus that implements a plurality of types of processing.

As shown in FIG. 1A, the interlock control apparatus 1 has slave switching apparatuses 100, 200, and 300 corresponding respectively to the control modules A, B, and C, and a master switching apparatus 400 that is connected to the slave switching apparatuses 100, 200, and 300. The slave switching apparatuses 100, 200, and 300 are communicably connected to the master switching apparatus 400 by cable wiring 180, 280, and 380 respectively.

Figure 1B:
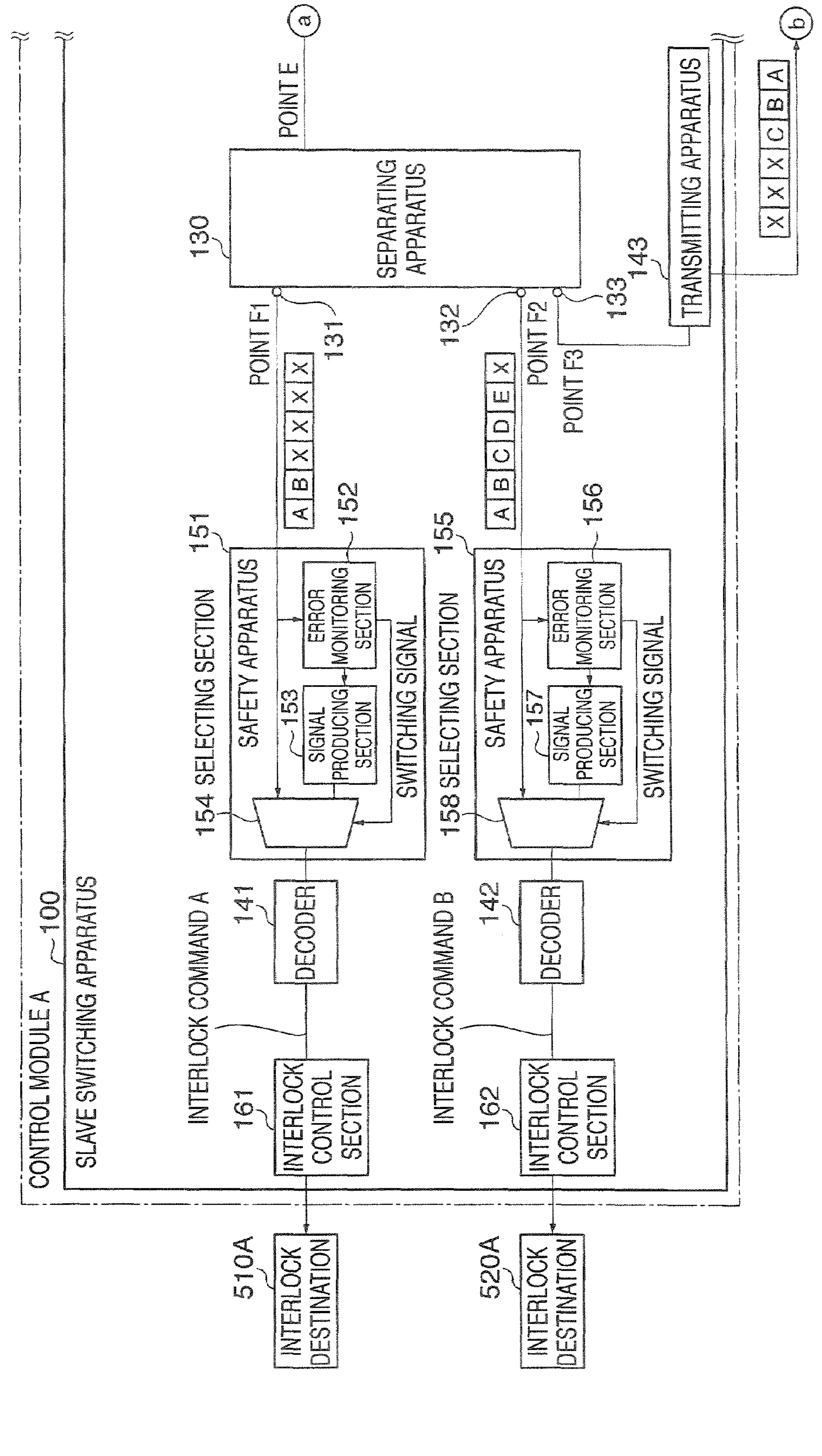
FIG. 1B is an enlarged view schematically showing the construction of part of the interlock control apparatus shown in FIG. 1A.
Figure 1C:
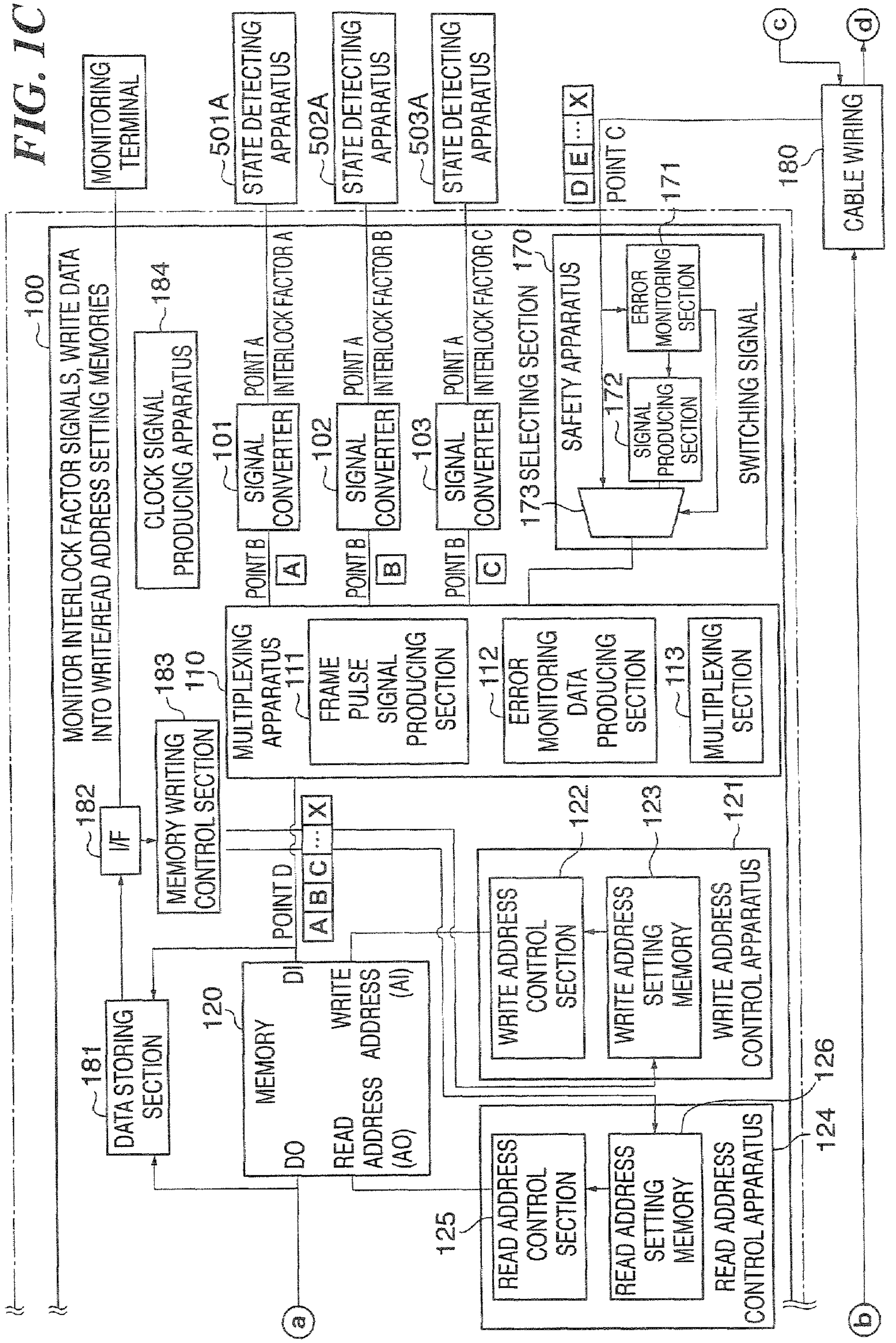
FIG. 1C is an enlarged view schematically showing the construction of part of the interlock control apparatus shown in FIG. 1A.
Figure 1D:
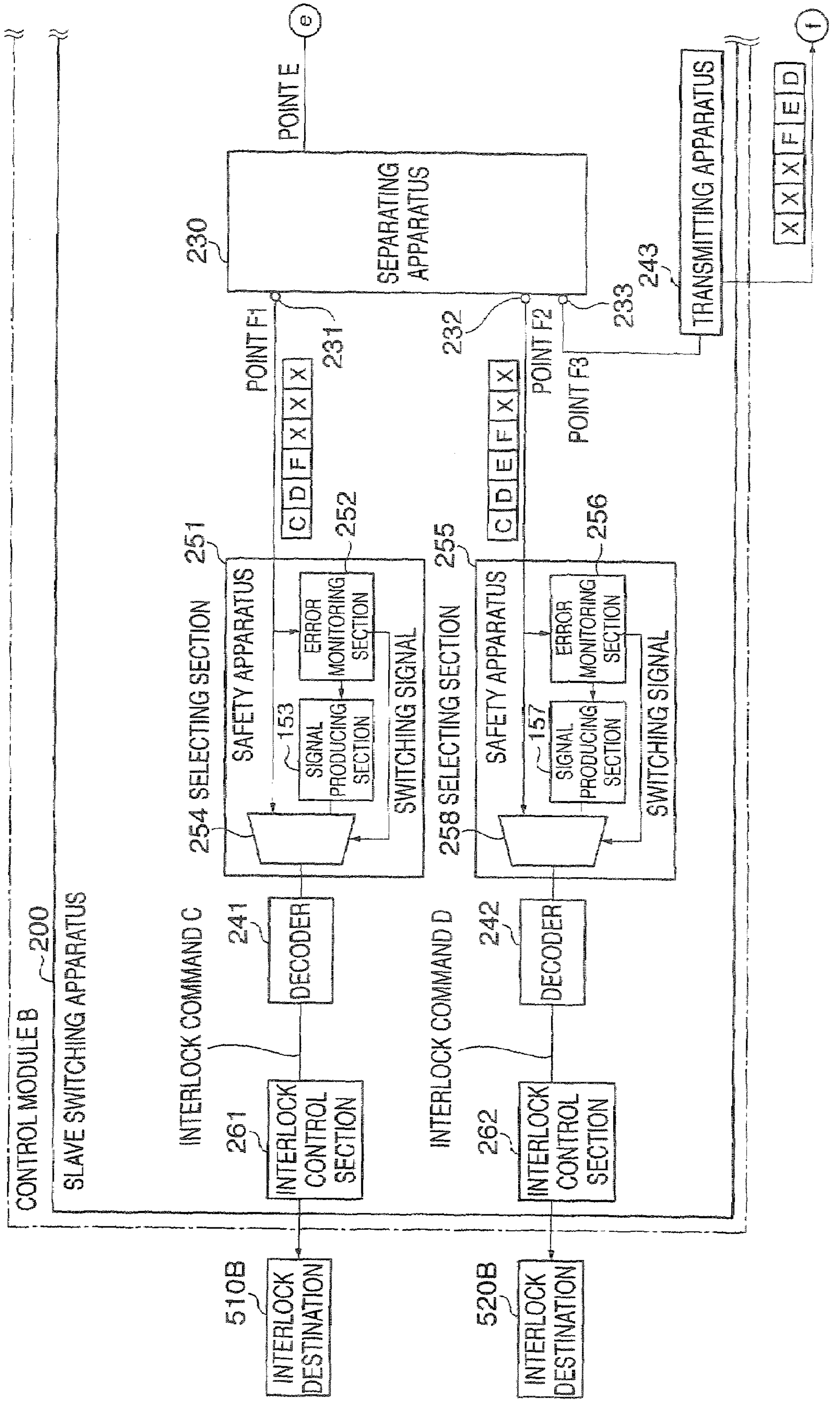
FIG. 1D is an enlarged view schematically showing the construction of part of the interlock control apparatus shown in FIG. 1A.
Figure 1E:
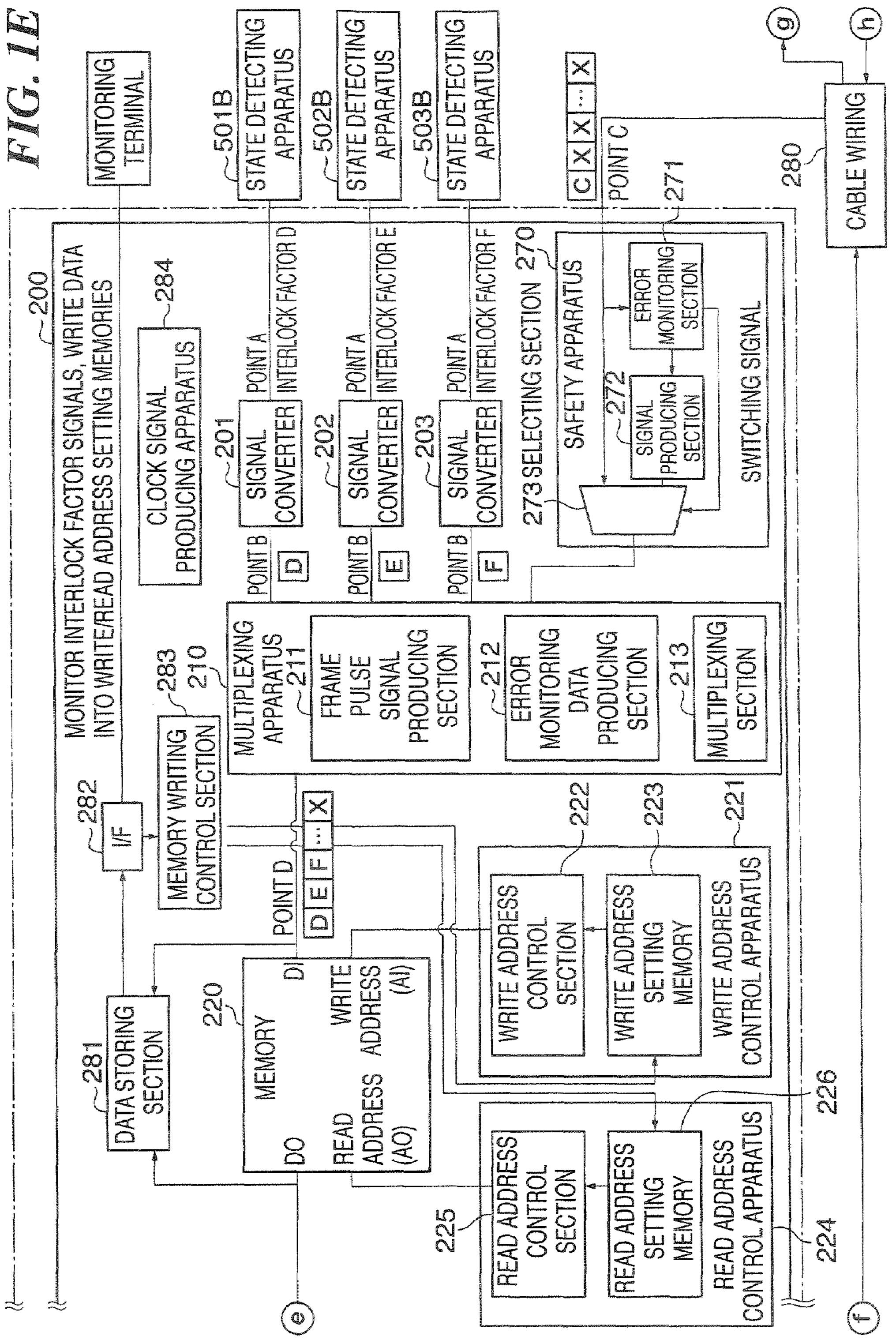
FIG. 1E is an enlarged view schematically showing the construction of part of the interlock control apparatus shown in FIG. 1A.
Figure 1F:
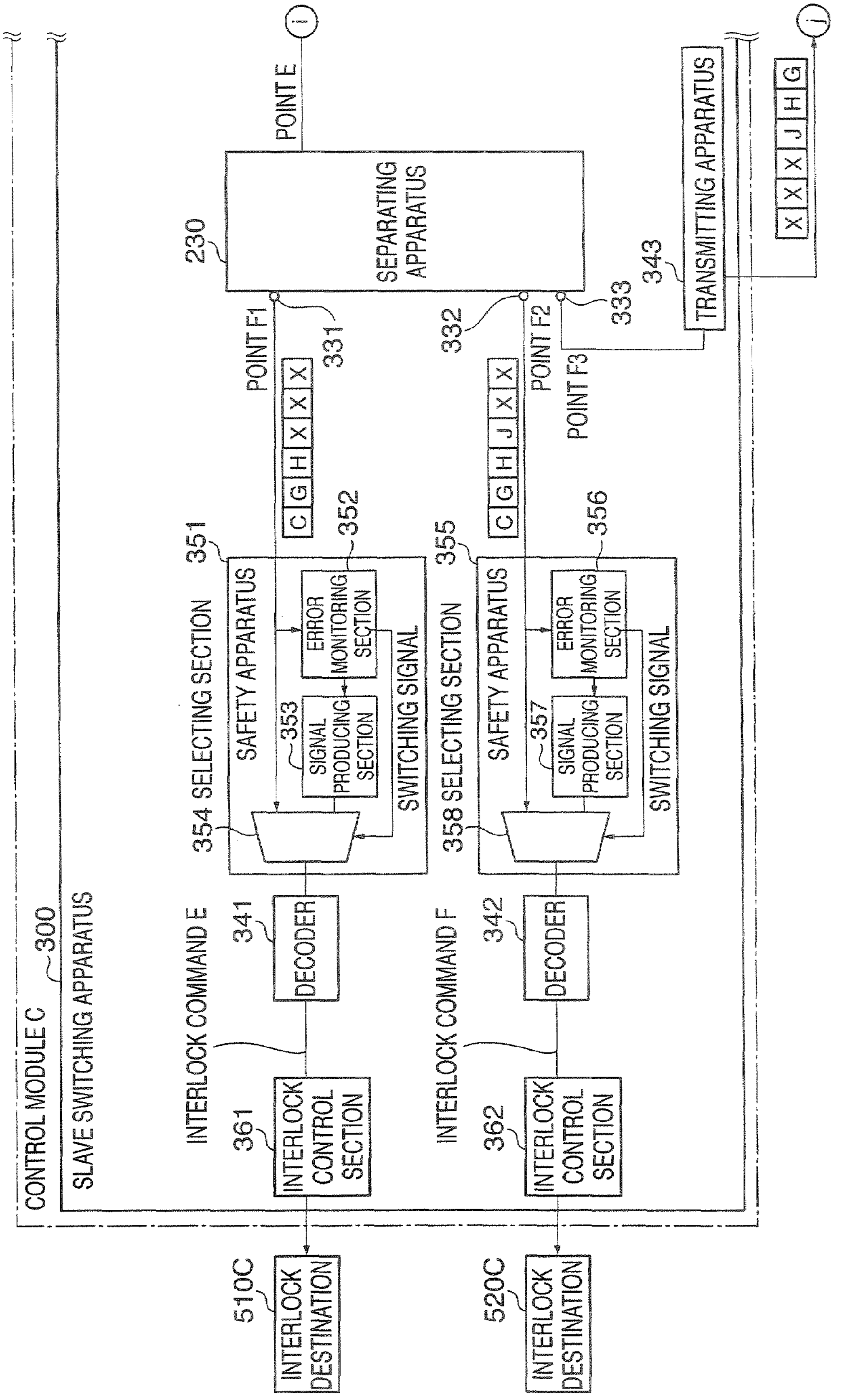
FIG. 1F is an enlarged view schematically showing the construction of part of the interlock control apparatus shown in FIG. 1A.
Figure 1G:
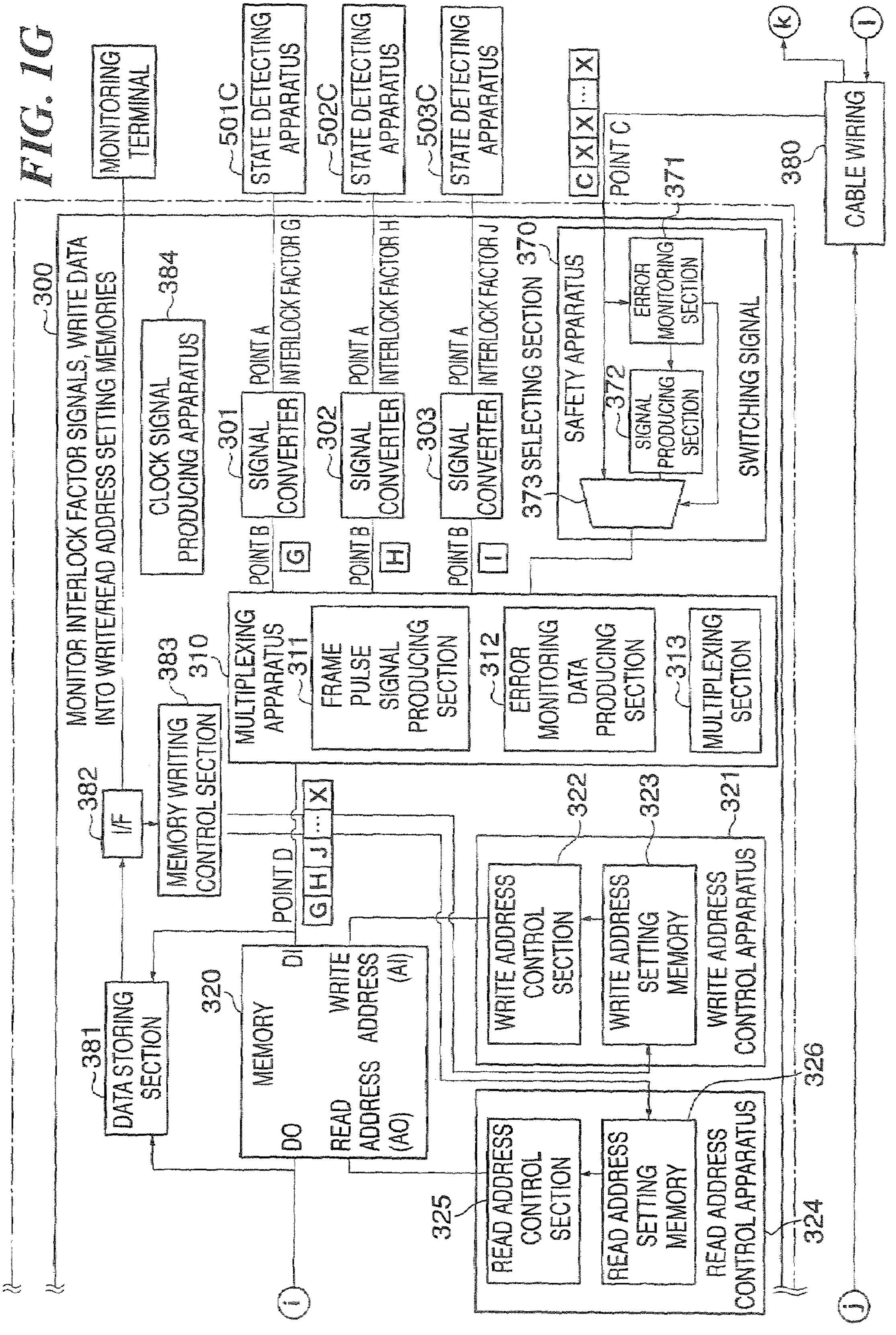
FIG. 1G is an enlarged view schematically showing the construction of part of the interlock control apparatus shown in FIG. 1A.

As shown in FIGS. 1B and 1C, the slave switching apparatus 100 has signal converters 101, 102, and 103, a multiplexing apparatus 110, a memory 120, a write address control apparatus 121, a read address control apparatus 124, a separating apparatus 130, decoders 141 and 142, safety apparatuses (separated signal monitoring apparatuses) 151 and 155, and interlock control sections 161 and 162. The interlock control sections 161 and 162 send interlock commands to interlock destinations 510A and 520A, which are pieces of equipment controlled by the control module A, thus implementing interlock control on the interlock destinations 510A and 520A.

In the slave switching apparatus 100, the signal converters 101, 102, and 103 are connected respectively to state detecting apparatuses 501A, 502A, and 503A, that each detect a predetermined state relating to a function of the corresponding control module A. Each of the state detecting apparatuses 501A, 502A, and 503A is a sensor or piece of equipment that sends a state detecting signal that indicates the state of a predetermined piece of equipment or the state of a predetermined parameter in the processing apparatus, and outputs a high level signal or a low level signal in accordance with the state detected. Each state detecting signal is a factor for implementing the interlock control in the interlock control apparatus 1 as described below. The state detecting signal sent by the state detecting apparatus 501A is also known as the interlock factor signal A, the state detecting signal sent by the state detecting apparatus 502A is also known as the interlock factor signal B, and the state detecting signal sent by the state detecting apparatus 503A is also known as the interlock factor signal C. Each of the interlock factor signals A, B, and C is an ON/OFF signal (high level/low level signal) indicating the state detected by the state detecting apparatus 501A, 502A, or 503A.

The signal converter 101 converts the interlock factor signal A from the state detecting apparatus 501A into a digital signal through A/D conversion. Similarly, the signal converters 102 and 103 convert the interlock factor signals B and C from the state detecting apparatuses 502A and 503A into digital signals through A/D conversion.

The multiplexing apparatus 110 has a frame pulse signal producing section 111 that produces a frame pulse signal having a preset pulse width, an error monitoring data producing section 112 that produces error monitoring data, described below, and a multiplexing section 113 that multiplexes signals. The frame pulse signal is a signal for stipulating a length (temporal length) of one frame of a multiplexed signal produced by the multiplexing apparatus 110 as described below. The multiplexing apparatus 110 is connected to the signal converters 101, 102, and 103, and is also connected to the master switching apparatus 400 via a safety apparatus 170, described below, and the cable wiring 180. The multiplexing apparatus 110 multiplexes the digitized interlock factor signals A, B, and C, and a signal transmitted from the master switching apparatus 400, described below, in a preset order as described below, so as to produce the multiplexed signal. The frame pulse signal producing section 111 is constructed such that the pulse width of the frame pulse signal produced can be changed.

The memory 120 is a memory for which writing and reading of data are possible, and has the multiplexed signal stored therein in accordance with control from the write address control apparatus 121, and has the multiplexed signal read out therefrom in accordance with control from the read address control apparatus 124. The write address control apparatus 121 has a write address control section 122 and a write address setting memory 123. The read address control apparatus 124 has a read address control section 125 and a read address setting memory 126.

The write address setting memory 123 has write address setting data therein. In the write address setting data is set the relationship between the various data constituting the multiplexed signal (hereinafter referred to as the "component data", the order in which this component data is to be written, and the addresses to be written to in the memory 120. The write address setting data in the write address setting memory 123 is changeable, it being possible to set any chosen write addresses.

The write address control section 122 controls the memory 120 such that each piece of component data of the multiplexed signal is written to the write destination address specified by the write address setting data. In this way, the multiplexed signal produced by the multiplexing apparatus 110 is stored at predetermined addresses in the memory 120 in accordance with the write address setting data.

The read address setting memory 126 has read address setting data therein. In the read address setting data is set an order of the data to be read out from the memory 120. That is, in the read address setting data is set the relationship between the data to be read out from the memory 120, the order of reading out the data, and the addresses in the memory 120 corresponding to the data. The read address setting data in the read address setting memory 126 is changeable, it being possible to set any chosen reading order.

The read address control section 125 controls the memory 120 such that the component data is read out from the memory 120 in the order specified in the read address setting data. The component data is read out from the memory 120 in the order set in the read address setting data in accordance with control from the read address control section 125, and the read out component data is multiplexed in the order read out. The read addresses in the read address setting memory can be set based on the settings for the write address setting memory.

The separating apparatus 130 separates the multiplexed signal read out from the memory 120, allots the component signals to respective output destinations, and multiplexes the allotted signals, so as to produce a separated signal for each output destination. As shown in FIG. 1B, the decoder 141, the decoder 142, and a transmitting apparatus 143 which are the output destinations are connected respectively to a first output terminal 131, a second output terminal 132, and a third output terminal 133 of the separating apparatus 130, and hence the received multiplexed signal is separated in correspondence with the decoder 141, the decoder 142, and the transmitting apparatus 143, being allotted into three groups, and the signals for each group are multiplexed, so as to produce three separated signals corresponding respectively to the three output destinations.

The safety apparatus 151 is provided between the decoder 141 and the separating apparatus 130. The safety apparatus 151 is comprised of an error monitoring section 152, a signal producing section 153, and a selecting section 154. In the safety apparatus 151, the error monitoring section 152 monitors the separated signal outputted from the separating apparatus 130 and determines whether or not an error has arisen in the separated signal, and in the case that an error has arisen, sends an error signal to the signal producing section 153 and also sends a switching signal to the selecting section 154. Upon receiving the error signal from the error monitoring section 152, the signal producing section 153 produces a signal for driving the piece of equipment to which the separated signal was to be sent (the interlock destination 510A in FIG. 1B) toward safety (hereinafter referred to as the "safe driving signal"), and sends the safe driving signal to the selecting section 154. The selecting section 154 selects whether to send the separated signal received from the separating apparatus 130 or the safe driving signal received from the signal producing section 153 to the decoder 141. Specifically, in the case of having received the switching signal from the error monitoring section 152, i.e. in the case that there is an error in the received separated signal, the selecting section 154 sends the safe driving signal to the decoder 141, whereas in the case of not having received the switching signal from the error monitoring section 152, i.e. in the case that there is no error in the received separated signal, the selecting section 154 sends the separated signal to the decoder 141 as is.

The decoder 141 decodes the received separated signal or safe driving signal, separating the separated signal or safe driving signal into the interlock factor signals.

The interlock control section 161 analyzes each of the interlock factor signals decoded by the decoder 141, and sends an interlock command to the interlock destination 510A connected thereto in accordance with the analysis results. Upon receiving the interlock command, the interlock destination 510A operates in accordance with the received interlock command. The sent interlock command is preset in correspondence with the state (ON or OFF) of each of the interlock factor signals, and can be changed to any chosen command. The method of controlling the interlock destination can thus be set as desired in accordance with the contents of the received interlock factor signals.

The transmitting apparatus 143 transmits the separated signal received from the separating apparatus 130 to the master switching apparatus 400 via the cable wiring 180.

In the slave switching apparatus 100, the decoder 142, the safety apparatus 155, and the interlock control section 162 have a similar construction to the decoder 141, the safety apparatus 151, and the interlock control section 161 described above. The safety apparatus 170 has a similar construction to the safety apparatus 151 described above. Detailed description of these component elements is thus omitted.

Moreover, the slave switching apparatus 100 has a data storing section 181 in which are stored the multiplexed signal to be written into the memory 120 and the multiplexed signal read out from the memory 120. The data storing section 181 is connected to an interface (I/F) 182 to which can be connected a monitoring terminal of a personal computer or the like. Moreover, the I/F 182 has connected thereto a memory writing control section 183 that enables the write address setting data in the write address setting memory 123 and the read address setting data in the read address setting memory 126 to be changed. According to this construction, a user can connect a monitoring terminal to the I/F 182 and thus inspect the stored multiplexed signals on the monitoring terminal. That is, the user can inspect the stored interlock factor signals, i.e. various current or past states of the apparatus, and can thus, for example, easily analyze the cause in the case that a problem has arisen in the apparatus. Moreover, the user can check or change the set write address setting data and read address setting data using the monitoring terminal.

Moreover, the slave switching apparatus 100 has a clock signal producing apparatus 184 that produces a clock signal of a predetermined frequency.

The slave switching apparatus 200 corresponding to the control module B and the slave switching apparatus 300 corresponding to the control module C have a similar construction to the slave switching apparatus 100 described above, and hence description is omitted (see FIGS. 1D to 1G).

Figure 1H:
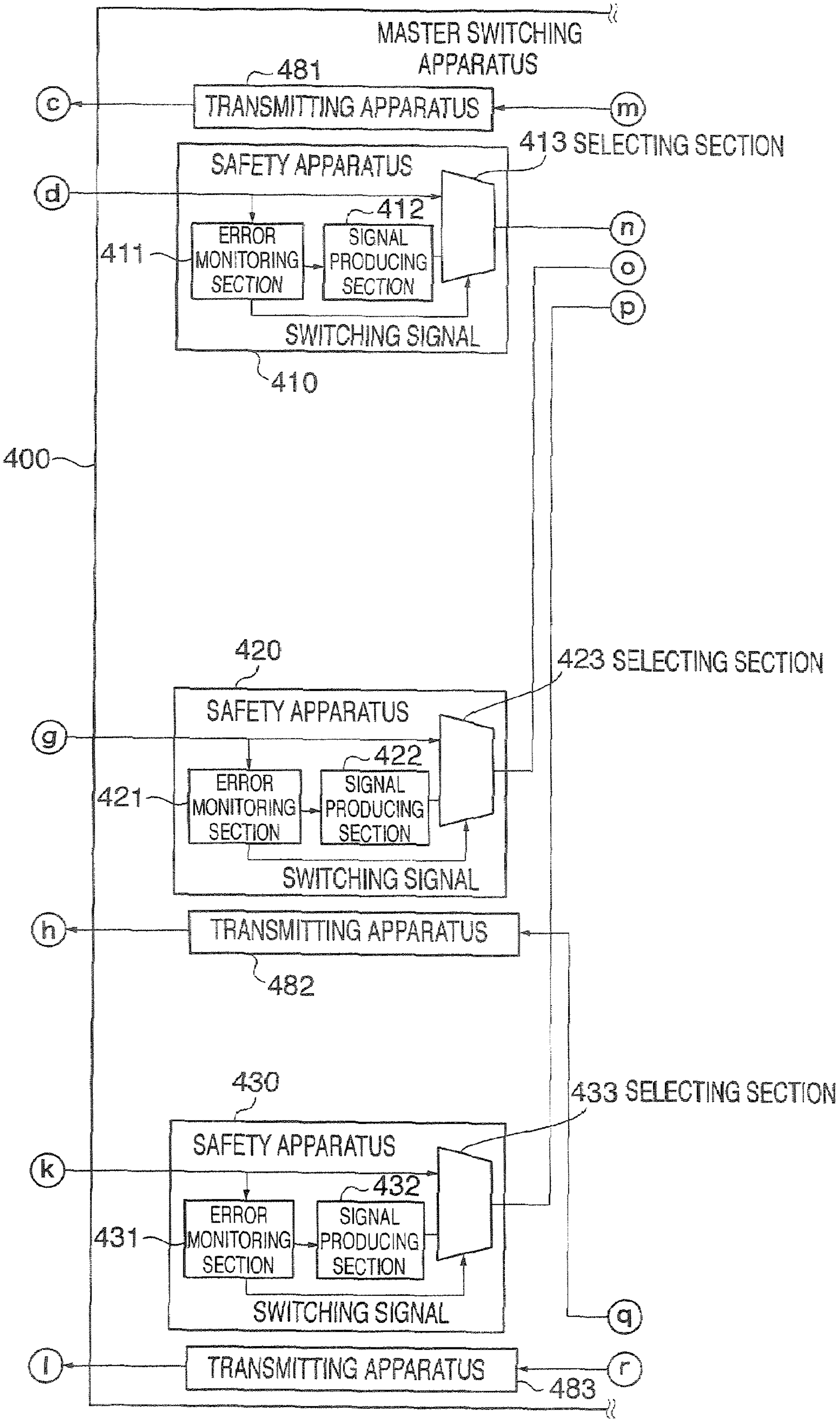
FIG. 1H is an enlarged view schematically showing the construction of part of the interlock control apparatus shown in FIG. 1A.
Figure 11:
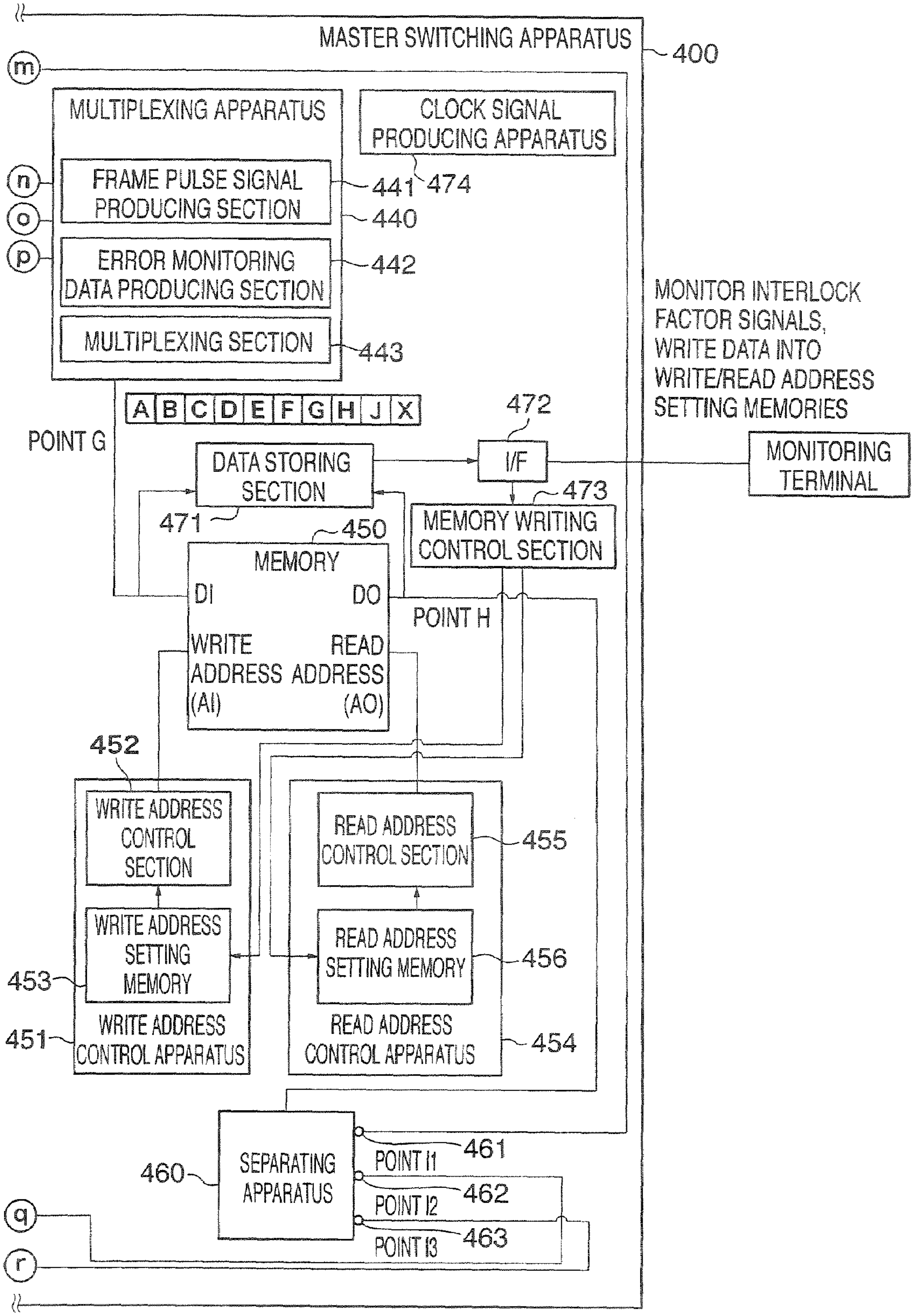

As shown in FIGS. 1H and 1I, the master switching apparatus 400 has safety apparatuses 410, 420, and 430 connected respectively to the transmitting apparatuses 143, 243, and 343 of the slave switching apparatuses 100, 200, and 300 via the cable wiring 180, 280, and 380. The safety apparatus 410 has a similar construction to the safety apparatus 151 of the slave switching apparatus 100. An error monitoring section 411 determines whether or not an error has arisen in the separated signal transmitted from the transmitting apparatus 143, and in the case that an error has arisen, a signal producing section 412 produces a signal such that the interlock factor signals corresponding to the separated signal head toward safety (a safe driving signal), and a selecting section 413 outputs the safe driving signal, whereas in the case that an error has not arisen, the separated signal is outputted from the selecting section 413 as is. The safety apparatuses 420 and 430 have a similar construction to the safety apparatus 410, and hence description is omitted.

Moreover, the master switching apparatus 400 has a multiplexing apparatus 440 connected to the safety apparatuses 410, 420, and 430, a memory 450, a write address control apparatus 451, a read address control apparatus 454, a separating apparatus 460, a data storing section 471, an I/F 472, a memory writing control section 473, and a clock signal producing apparatus 474. The separating apparatus 460 is connected respectively to the multiplexing apparatuses 110, 210, and 310 of the slave switching apparatuses 100, 200, and 300 via the cable wiring 180, 280, and 380 and the safety apparatuses 170, 270, and 370.

The multiplexing apparatus 440, the memory 450, the write address control apparatus 451, the read address control apparatus 454, the separating apparatus 460, the data storing section 471, the I/F 472, the memory writing control section 473, and the clock signal producing apparatus 474 of the master switching apparatus 400 have a similar construction to the multiplexing apparatus 110, the memory 120, the write address control apparatus 121, the read address control apparatus 124, the separating apparatus 130, the data storing section 181, the I/F 182, the memory writing control section 183, and the clock signal producing apparatus 184 of the slave switching apparatus 100 described above, and hence detailed description is omitted.

Next, operation of the interlock control apparatus 1 will be described.

FIGS. 2A to 2H are drawings for explaining basic operation of the interlock control apparatus 1, FIGS. 2A to 2E and FIGS. 2F to 2H being respectively drawings showing examples of data transmitted at points A, B, C, D, and E, and points F1 to F3 appearing in FIGS. 1B and 1C.

First, the operation of the interlock control apparatus 1 will be described in outline. In the slave switching apparatus 100 corresponding to the control module A, the interlock control section 161 carries out interlock control on the interlock destination 510A in accordance with the detection results from the state detecting apparatuses 501A and 502A, i.e. the values of the interlock factor signals A and B. Moreover, the interlock control section 162 carries out interlock control on the interlock destination 520A in accordance with the detection results from the state detecting apparatuses 501A, 502A, and 503A and the state detecting apparatuses 501B and 502B, i.e. the values of the interlock factor signals A, B, C, D, and E.

In the slave switching apparatus 200 corresponding to the control module B, the interlock control section 261 carries out interlock control on the interlock destination 510B in accordance with the detection results from the state detecting apparatuses 503A, 501B, and 503B, i.e. the values of the interlock factor signals C, D, and F. Moreover, the interlock control section 262 carries out interlock control on the interlock destination 520B in accordance with the detection results from the state detecting apparatuses 503A, 501B, 502B, and 503B, i.e. the values of the interlock factor signals C, D, E, and F.

In the slave switching apparatus 300 corresponding to the control module C, the interlock control section 361 carries out interlock control on the interlock destination 510C in accordance with the detection results from the state detecting apparatuses 503A, 501C, and 502C, i.e. the values of the interlock factor signals C, G, and H. Moreover, the interlock control section 362 carries out interlock control on the interlock destination 520C in accordance with the detection results from the state detecting apparatuses 503A, 501C, 502C, and 503C, i.e. the values of the interlock factor signals C, G, H, and J.

Based on the above relationships, the master switching apparatus 400 sends a multiplexed signal containing the interlock factor signals D and E to the slave switching apparatus 100 via the cable wiring 180, sends a multiplexed signal containing the interlock factor signal C to the slave switching apparatus 200 via the cable wiring 280, and sends a multiplexed signal containing the interlock factor signal C to the slave switching apparatus 300 via the cable wiring 380. Moreover, the state detecting signals relating to the functions of the control modules A, B, and C corresponding to the slave switching apparatuses 100, 200, and 300 are transmitted from the slave switching apparatuses 100, 200, and 300 to the master switching apparatus 400. That is, the interlock factor signals A, B, and C are transmitted from the transmitting apparatus 143 of the slave switching apparatus 100, the interlock factor signals D, E, and F are transmitted from the transmitting apparatus 243 of the slave switching apparatus 200, and the interlock factor signals G, H, and J are transmitted from the transmitting apparatus 343 of the slave switching apparatus 300.

Next, the operation of the interlock control apparatus 1 will be described in detail.

First, the operation of the slave switching apparatus 100 will be described.

Figure 2A:
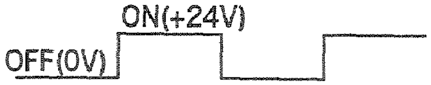
FIGS. 2A to 2E are drawings for explaining basic operation of the interlock control apparatus shown in FIG. 1A, and show respectively examples of data transmitted at points A, B, C, D, and E appearing in FIGS. 1B and 1C.
Figure 2B:
Figure 2C:
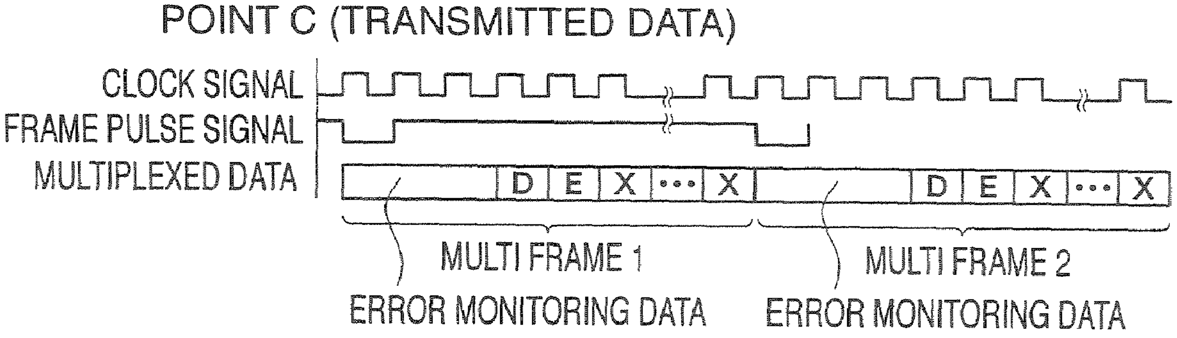

The signal converters 101, 102, and 103 receive the interlock factor signals A, B, and C from the state detecting apparatuses 501A, 502A, and 503A respectively. As shown in FIG. 2A, each of the interlock factor signals A, B, and C is a signal indicating the contents of the interlock factor A, B, or C as an ON/OFF signal, i.e. a high level signal (e.g. +24 V) or a low level signal (e.g. 0 V). The state detecting apparatuses 501A, 502A, and 503A are each constructed such as to output an ON signal or an OFF signal in accordance with the detected state. The signal converters 101, 102, and 103 convert the interlock factor signals A, B, and C into digital through A/D conversion, thus each producing an ON/OFF digital signal as shown in FIG. 2B.

The safety apparatus 170 receives the multiplexed signal containing the interlock factor signals D and E from the master switching apparatus 400 as described below, monitors for errors and so on, and outputs the multiplexed signal to the multiplexing apparatus 110. The operation of the safety apparatus 170 will be described in detail below. The transmitted data received from the master switching apparatus 400 by the safety apparatus 170 contains the multiplexed signal, a clock signal having a predetermined period, and a frame pulse signal for stipulating the length of one frame of the multiplexed signal (see FIG. 2C). The multiplexed signal contains error monitoring data, described below, and the predetermined interlock factor signals (D and E).

Next, the multiplexing apparatus 110 produces a frame pulse signal having a preset pulse width in the frame pulse signal producing section 111 based on the clock signal from the clock signal producing apparatus 184, produces error monitoring data in the error monitoring data producing section 112, and multiplexes together the error monitoring data, the interlock factor signals A, B, and C from the signal converters 101, 102, and 103, and the interlock factor signals D and E from the master switching apparatus 400 in a preset order in the multiplexing section 113.

Figure 3:
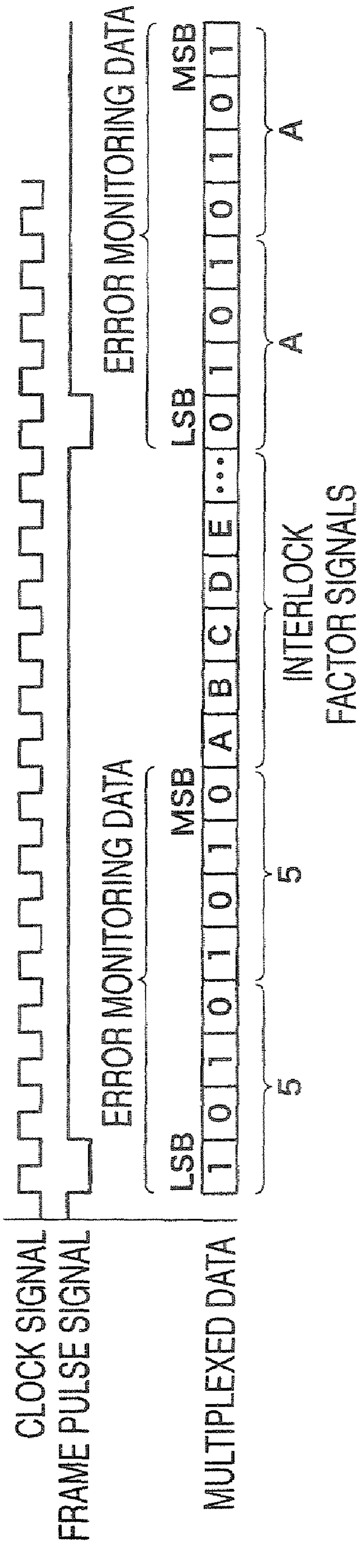
FIG. 3 is a drawing showing an example of error monitoring data.

The error monitoring data produced in the error monitoring data producing section 112 is preset data, specifically is comprised of 55 digital data 1, 0, 1, 0, 1, 0, 1, 0 and AA digital data 0, 1, 0, 1, 0, 1, 0, 1 as shown in FIG. 3. The error monitoring data producing section 112 alternately produces 55 digital data and AA digital data as the error monitoring data. Through this error monitoring data, multiplexed signal error monitoring can be carried out by the error monitoring section 152 and so on as described below. Note that the error monitoring data is not limited to being as above.

The multiplexing section 113 multiplexes the received interlock factor signals in alphabetical order after the error monitoring data so as to produce the multiplexed signal. The multiplexing section 113 produces the multiplexed signal such that the length of one frame of the produced multiplexed signal is a length corresponding to one pulse period of the frame pulse signal from the frame signal pulse producing section 111 (see FIG. 2D). In the case that the multiplexed signal produced by multiplexing together the error monitoring data and the received interlock factor signals is shorter than the frame length stipulated by the frame pulse signal, the multiplexing section 113 multiplexes on a predetermined number of blank signals X so as to make the length of the produced multiplexed signal be the frame length. Each blank signal X is a predetermined signal having no meaning for the interlock control, for example a one bit signal of 0 or 1. Moreover, as the error monitoring data given to each frame of the multiplexed signal, 55 digital data and AA digital data are used alternately as described above.

Figures 2D, 2E:
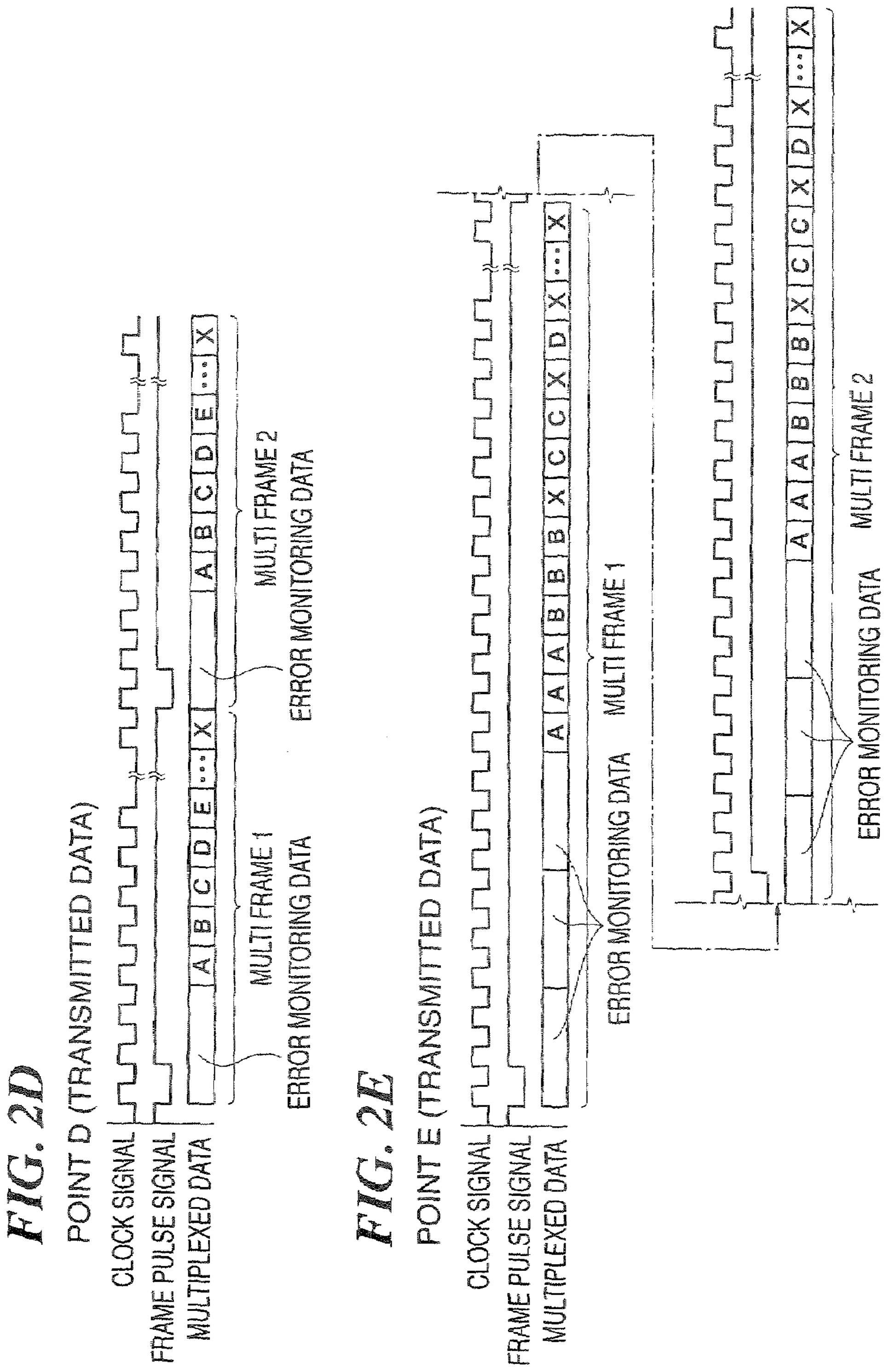
Figure 2F:
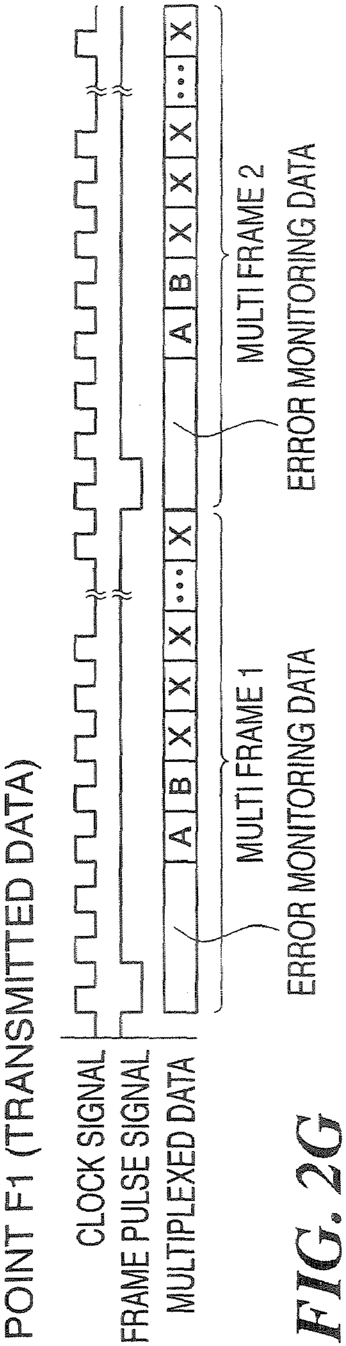
FIGS. 2F to 2H are drawings for explaining the basic operation of the interlock control apparatus shown in FIG. 1A, and show respectively examples of data transmitted at points F1, F2, and F3 appearing in FIG. 1B.
Figure 2G:
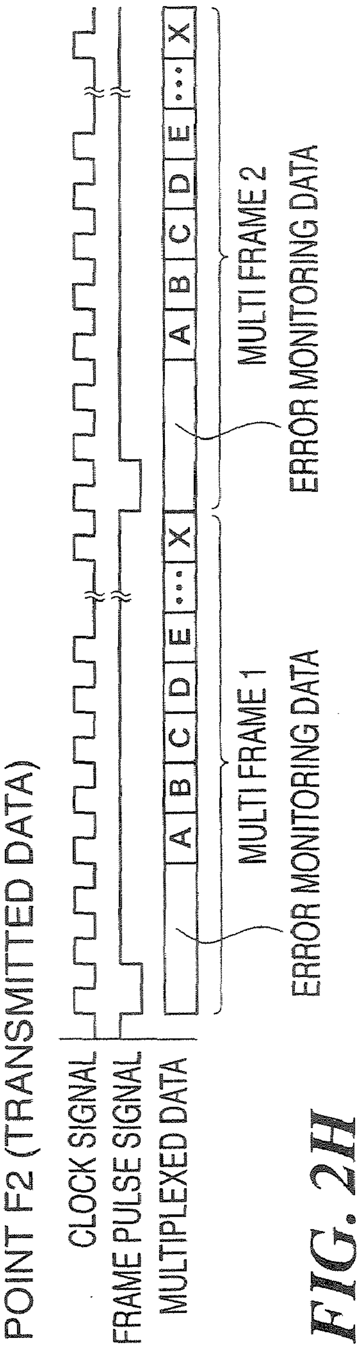
Figure 2H:
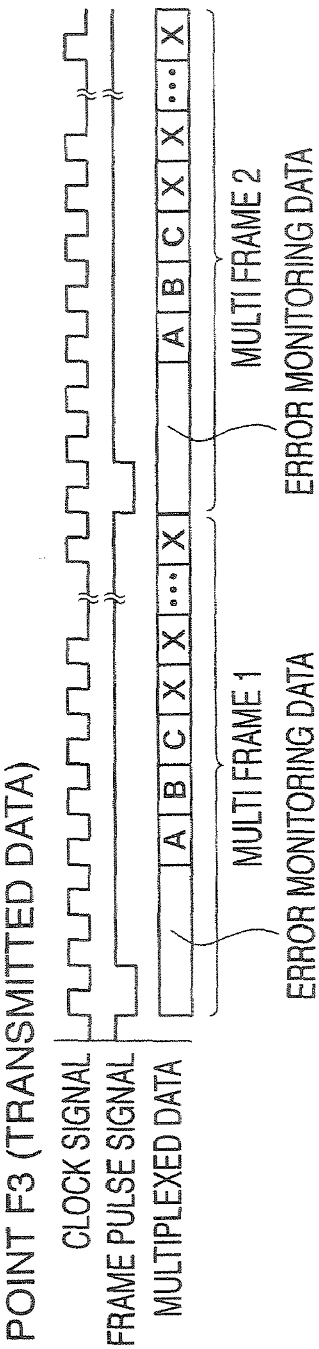

The multiplexed signal produced by the multiplexing section 113 as described above is thus a signal in which are multiplexed the error monitoring data, the interlock factor signals A, B, C, D, and E, and the predetermined number of blank signals in this order as shown in FIG. 2D.

The pulse width of the frame pulse signal produced by the frame pulse producing section 111 can be changed. In this way, the length of one frame of the multiplexed signal outputted can be changed in accordance with the type of the interlock factor signals sent to the multiplexing apparatus 110.

Next, the multiplexing apparatus 110 outputs the clock signal, the frame pulse signal produced by the frame pulse producing section 111, and the multiplexed signal produced by the multiplexing section 113 as a single piece of transmitted data (see FIG. 2D).

The multiplexed signal produced through the multiplexing by the multiplexing apparatus 110 is stored in the memory 120 in accordance with control from the write address control apparatus 121. In the write address setting data in the write address setting memory 123, the relationship between the order of the component data of the multiplexed signal and the write destination addresses is set such that the component data of the multiplexed signal is written to predetermined addresses in the memory 120 in order from the top. In the memory 120, the pieces of component data of the multiplexed signal are written to the predetermined addresses from the top in accordance with the write address setting data under control from the write address control section 122. Specifically, in the memory 120, the error monitoring data which is the piece of component data at the top of the multiplexed signal is written to a predetermined address in the memory 120, for example the address having the youngest number, the interlock factor signal A which is the $2^{nd}$ piece of component data is written to the next address, the interlock factor signal B which is the $3^{rd}$ piece of component data is written to the next address after that, the interlock factor signal C which is the $4^{th}$ piece of component data is written to the next address after that, and so on in order up to the final piece of component data in one frame of the multiplexed signal.

The multiplexed signal that has been written into the memory 120 is next read out from the memory 120 in accordance with control from the read address control apparatus 124. In the read address setting data from the read address setting memory 126 is set the relationship between the component data to be read out, the order of reading out the component data, and the read addresses of the component data, such that the error monitoring data is first read out by a number of times equal to the number m of the separated signals (multiplexed signals) to be outputted from the separating apparatus 130 (for the slave switching apparatus 100, m=3), and then the interlock factor signals that will be the respective pieces of component data of the separated signals outputted from the separating apparatus 130 are read out one at a time in order. That is, first, the error monitoring data is read out three times, next the interlock factor signal A which is one of the interlock factor signals of the separated signal to be sent to the interlock control section 161 (hereinafter referred to as the "first separated signal") (see FIG. 2F) is read out, the interlock factor signal A which is one of the interlock factor signals of the separated signal to be sent to the interlock control section 162 (hereinafter referred to as the "second separated signal") (see FIG. 2G) is read out, the interlock factor signal A which is one of the interlock factor signals of the separated signal to be sent to the transmitting apparatus 143 (hereinafter referred to as the "third separated signal") (see FIG. 2H) is read out, the interlock factor signal B which is one of the interlock factor signals of the first separated signal, the interlock factor signal B which is one of the interlock factor signals of the second separated signal, and the interlock factor signal B which is one of the interlock factor signals of the third separated signal are read out, and then a blank signal X is read out because all of the interlock factor signals of the first separated signal have already been read out, the interlock factor signal C which is one of the interlock factor signals of the second separated signal, and the interlock factor signal C which is one of the interlock factor signals of the third separated signal are read out, and so on, the reading being carried out alternately in order until all of the interlock factor signals of each of the separated signals have been read out.

In the reading described above, the number of times of reading out component data is the same for all of the separated signals; when all of the interlock factor signals for a separated signal have been read out, a blank signal is read out. That is, the reading is carried out such that each of the separated signals becomes the same length. Moreover, the memory 120 multiplexes each of the pieces of component data in the order read out (see FIG. 2E). Note that the length of one frame of the multiplexed signal produced is one pulse period of the frame pulse signal outputted from the multiplexing apparatus 110. Moreover, the speed of the multiplexing here is m times (the number of outputs of the separating apparatus 130) the speed of the multiplexing by the multiplexing apparatus 110. That is, in the present embodiment, the speed is three times the speed of the multiplexing by the multiplexing apparatus 110. Next, the memory 120 outputs transmitted data containing the clock signal, the frame pulse signal, and the read out multiplexed signal (see FIG. 2E).

Next, in the separating apparatus 130, the pieces of component data of the multiplexed signal read out from the memory 120 are allotted to the output terminals in order from the top one at a time in order. Specifically, the pieces of component data of the multiplexed signal are allotted to the terminals in order one at a time until the component data runs out, i.e. the error monitoring data that is the piece of component data at the top of the multiplexed signal is allotted to the first output terminal 131, the error monitoring data that is the $2^{nd}$ piece of component data of the multiplexed signal is allotted to the second output terminal 132, the error monitoring data that is the $3^{rd}$ piece of component data of the multiplexed signal is allotted to the third output terminal 133, the interlock factor signal A that is the $4^{th}$ piece of component data of the multiplexed signal is allotted to the first output terminal 131, the interlock factor signal A that is the $5^{th}$ piece of component data of the multiplexed signal is allotted to the second output terminal 132, the interlock factor signal A that is the $6^{th}$ piece of component data of the multiplexed signal is allotted to the third output terminal 133, and so on (see FIGS. 2F to 2H).

Next, the allotted signals are multiplexed to produce separated signals. Here, the first separated signal to be sent to the interlock control section 161 corresponding to the first output terminal 131 is produced (see FIG. 2F), the second separated signal to be sent to the interlock control section 162 corresponding to the second output terminal 132 is produced (see FIG. 2G), and the third separated signal to be sent to the transmitting apparatus 143 corresponding to the third output terminal 133 is produced (see FIG. 2H). The separating apparatus 130 carries out the separation and the multiplexing such that the length of each of the separated signals is one pulse period of the received frame pulse signal.

The above operation is carried out continuously. That is, each multiplexed signal (one frame length) is produced continuously as shown in FIGS. 2A to 2H.

Next, the separating apparatus 130 outputs transmitted data containing the clock signal, the frame pulse signal, and the first separated signal from the first output terminal 131 to the safety apparatus 151, transmitted data containing the clock signal, the frame pulse signal, and the second separated signal from the second output terminal 132 to the safety apparatus 155, and transmitted data containing the clock signal, the frame pulse signal, and the third separated signal from the third output terminal 133 to the transmitting apparatus 143.

In the safety apparatus 151, the error monitoring section 152 monitors whether or not the clock signal is missing from the received transmitted data, and inspects the received frame pulse signal and first separated signal so as to monitor whether or not the two types (55/AA) of error monitoring data (see FIG. 3) attached by the multiplexing apparatus 110 are attached alternately each pulse signal, thus monitoring for data omission, data bit slippage and so on in the separated signal. In the case that the clock signal is not missing, and the two types of error monitoring data attached by the multiplexing apparatus 110 are attached alternately each frame pulse signal, it is determined that there is no data omission, data bit slippage or the like in the separated signal, and hence that there is no error in the separated signal. On the other hand, in the case that the clock signal is missing, or the two types of error monitoring data attached by the multiplexing apparatus 110 are not attached alternately each frame pulse signal, it is determined that data omission, data bit slippage or the like has arisen in the separated signal, and hence that there is an error in the separated signal, in which case an error signal is sent to the signal producing section 153, and a switching signal is sent to the selecting section 154

Next, upon receiving the error signal from the error monitoring section 152, the signal producing section 153 changes the value of each of the interlock factor signals in the first separated signal (the interlock factor signals A and B) to a preset value ON or OFF such that the interlock control section 161 to which the first separated signal is to be sent will drive the interlock destination 510A toward safety, thus producing a predetermined safe driving signal, and sends the safe driving signal to the selecting section 154.

Next, in the case of receiving the switching signal from the error monitoring section 152, i.e. in the case that there is an error in the first separated signal, the selecting section 154 sends the safe driving signal to the decoder 141, whereas in the case of not receiving the switching signal from the error monitoring section 152, i.e. in the case that there is no error in the first separated signal, the selecting section 154 sends the first separated signal to the decoder 141 as is.

The safety apparatus 155 operates similarly to the safety apparatus 151.

Upon receiving the separated signal or the safe driving signal from the safety apparatus 151, the decoder 141 decodes the received separated signal or safe driving signal, separating the separated signal or safe driving signal into component signals, extracts only the interlock factor signals (the interlock factor signals A and B), and outputs the interlock factor signals to the interlock control section 161. The decoder 142 similarly decodes the received separated signal or safe driving signal, separating the separated signal or safe driving signal into component signals, extracts only the interlock factor signals (the interlock factor signals A, B, C, D, and E), and outputs the interlock factor signals to the interlock control section 162.

On the other hand, the transmitting apparatus 143 transmits the third separated signal received from the separating apparatus 130 to the master switching apparatus 400 via the cable wiring 180.

Upon receiving the interlock factor signals A and B from the decoder 141, the interlock control section 161 then analyzes the contents of the received interlock factor signals A and B, i.e. determines whether each of the interlock factor signals is an ON signal or an OFF signal, and sends a preset interlock command (an interlock command A) to the interlock destination 510A in accordance with the combination of the contents of the interlock factor signals A and B. As a result, the interlock destination 510A carries out a predetermined interlock operation. Similarly, the interlock control section 162 analyzes the contents of the received interlock factor signals A, B, C, D, and E, and sends a preset interlock command (an interlock command B) to the interlock destination 520A in accordance with the combination of the contents of the interlock factor signals A, B, C, D, and E. As a result, the interlock destination 520A carries out a predetermined operation.

The slave switching apparatuses 200 and 300 operate similarly to the slave switching apparatus 100, and hence description is omitted.

The contents of the write address setting data and the read address setting data are not limited to the above, but rather may be other contents. In this case, the separating method of the separating apparatus 130 is made to correspond to the read address setting data accordingly.

Next, the operation of the master switching apparatus 400 will be described with reference to FIGS. 4A to 4E. FIGS. 4A to 4E are drawings for explaining the basic operation of the master switching apparatus, and show respectively examples of data transmitted at points G, H, I1, I2, and I3 of the master switching apparatus 400 appearing in FIGS. 1H and 1I.

The safety apparatuses 410, 420, and 430 receive respectively first, second, and third transmitted data (see FIG. 2H) from the transmitting apparatuses 143, 243, and 343 of the slave switching apparatuses 100, 200, and 300 via the cable wiring 180, 280, and 380. As described above, the first transmitted data is data containing the third separated signal produced by the separating apparatus 130; the first transmitted data contains the clock signal, the frame pulse signal, and the multiplexed signal containing the error monitoring data and all of the interlock factor signals detected by the control module A corresponding to the slave switching apparatus 100 (the interlock factor signals A, B, and C). Similarly, the second transmitted data contains the clock signal, the frame pulse signal, and the multiplexed signal containing the error monitoring data and all of the interlock factor signals detected by the control module B corresponding to the slave switching apparatus 200 (the interlock factor signals D, E, and F), and the third transmitted data contains the clock signal, the frame pulse signal, and the multiplexed signal containing the error monitoring data and all of the interlock factor signals detected by the control module C corresponding to the slave switching apparatus 300 (the interlock factor signals G, H, and J).

Similarly to in the safety apparatus 151, in each of the safety apparatuses 410, 420, and 430, the error monitoring section 411, 421, or 423 inspects for the clock signal being missing and inspects the error monitoring data, thus determining whether or not there is an error. In the case that there is no error, the received transmitted data is outputted from the selecting section 413, 423, or 433 as is. On the other hand, in the case that there is an error, the multiplexed signal is made to be a safe driving signal obtained by the signal producing section 412, 422, or 432 by changing the contents of each of the interlock factor signals in the multiplexed signal to a preset value (ON or OFF) such that each piece of equipment (interlock destination) will be driven toward safety, and the safe driving signal is outputted from the selecting section 413, 423, or 433 together with the clock signal and the frame pulse signal. Note that the clock signal and the frame pulse signal in the transmitted data sent from each of the safety apparatuses 410, 420, and 430 are the same signals for each. Moreover, the error monitoring data in the multiplexed signal sent from each of the safety apparatuses 410, 420, and 430 is also the same for each.

Next, similarly to for the multiplexing apparatus 110 described above, the multiplexing apparatus 440 multiplexes the received multiplexed signals in a preset order. Specifically, the multiplexing apparatus 440 multiplexes the received interlock factor signals in alphabetical order after the error monitoring data so as to produce a multiplexed signal. The multiplexing apparatus 440 produces the multiplexed signal such that the length of one frame of the produced multiplexed signal is a length corresponding to one pulse period of the received frame pulse signal. In the case that the multiplexed signal produced by multiplexing together the error monitoring data and the received interlock factor signals is shorter than the frame length stipulated by the frame pulse signal, the multiplexing apparatus 440 multiplexes on a predetermined number of blank signals so as to make the length of the produced multiplexed signal be the frame length.

Figure 4A:
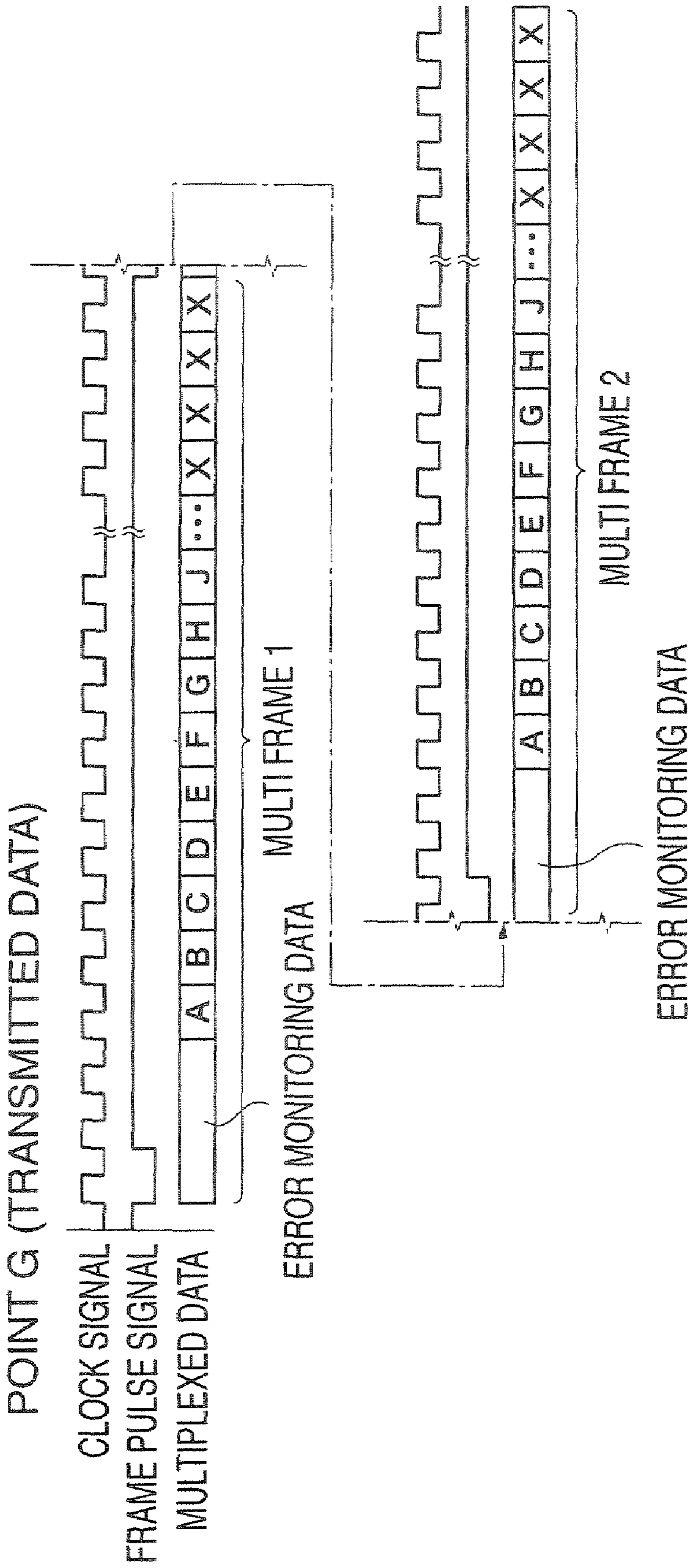
FIGS. 4A and 4B are drawings for explaining the basic operation of a master switching apparatus appearing in FIG. 1A, and show respectively examples of data transmitted at points G and H of the master switching apparatus appearing in FIG. 1I.
Figure 4B:
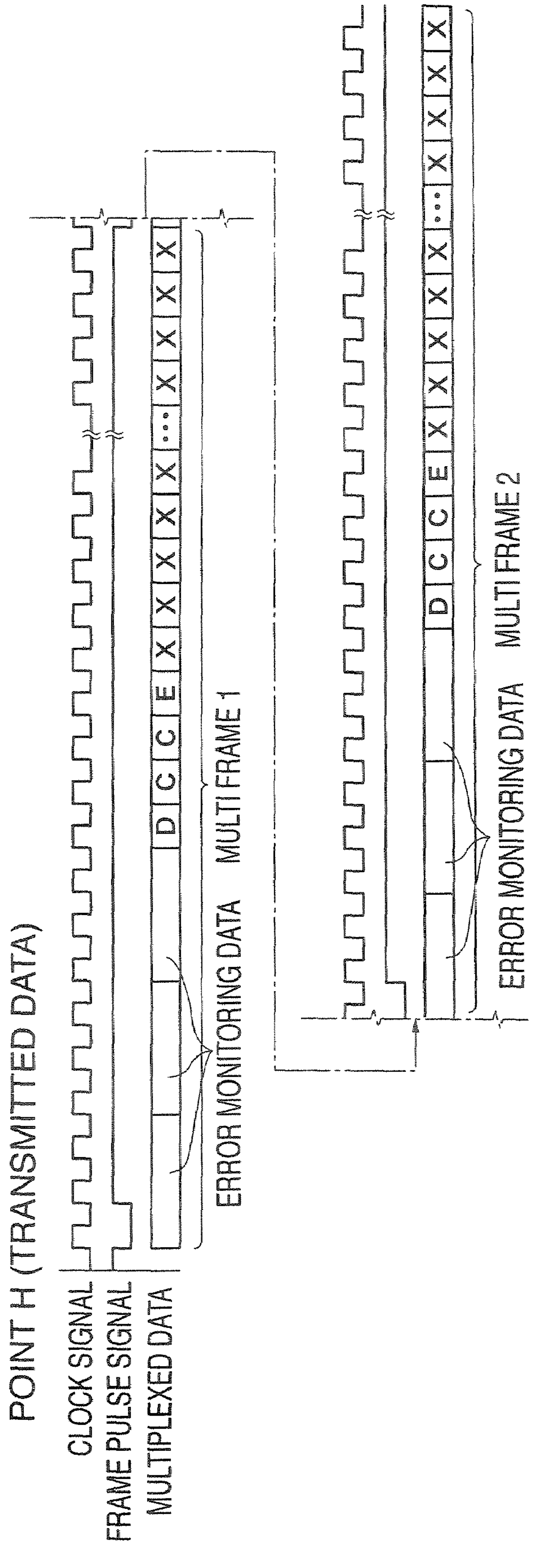
Figure 4C:
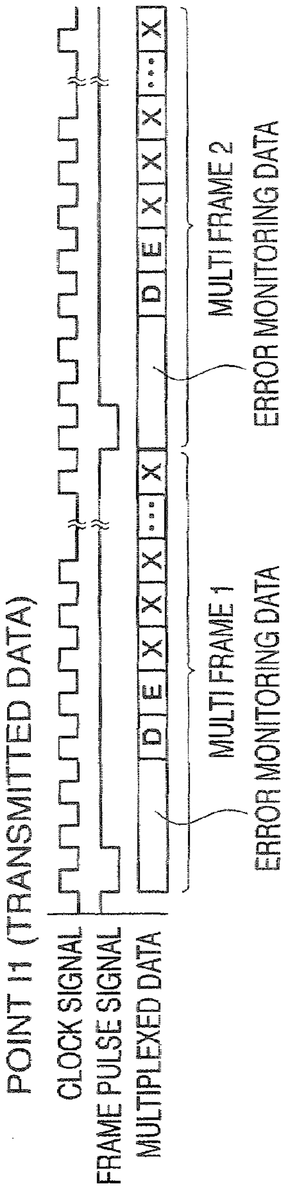
FIGS. 4C to 4E are drawings for explaining the basic operation of the master switching apparatus appearing in FIG. 1A, and show respectively examples of data transmitted at points I1, I2, and I3 of the master switching apparatus appearing in FIG. 1I.
Figure 4D:
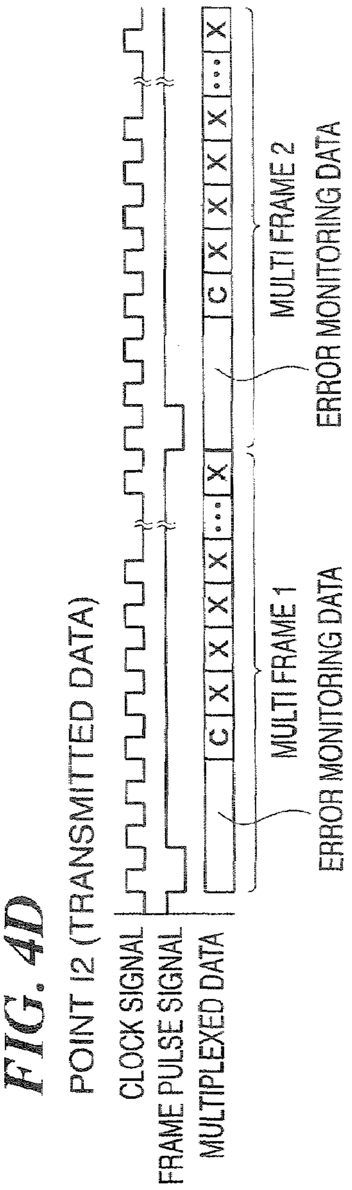
Figure 4E:
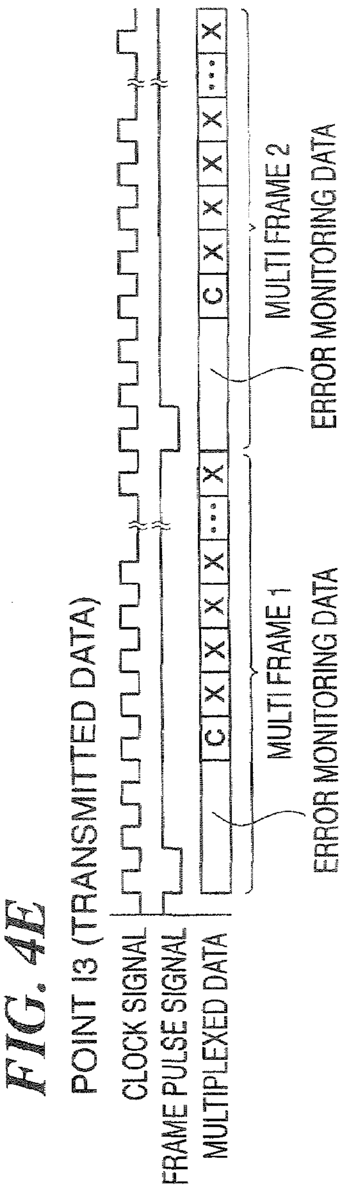

Next, the multiplexing apparatus 440 outputs the clock signal, the frame pulse signal, and the produced multiplexed signal as a single piece of transmitted data (see FIG. 4A).

The multiplexed signal produced through the multiplexing by the multiplexing apparatus 440 is stored in the memory 450 in accordance with control from the write address control apparatus 451. In write address setting data in a write address setting memory 453, the relationship between the component data of the multiplexed signal, the order of the component data, and write destination addresses is set such that the component data of the multiplexed signal is written to predetermined addresses in the memory 450 in order from the top. In the memory 450, the pieces of component data of the multiplexed signal are written to the predetermined addresses from the top in accordance with the write address setting data under control from a write address control section 452. Specifically, in the memory 450, the error monitoring data which is the piece of component data at the top of the multiplexed signal is written to a predetermined address in the memory 450, for example the address having the youngest number, the interlock factor signal A which is the $2^{nd}$ piece of component data is written to the next address, the interlock factor signal B which is the $3^{rd}$ piece of component data is written to the next address after that, the interlock factor signal C which is the $4^{th}$ piece of component data is written to the next address after that, and so on, the writing being carried out to successive addresses in order up to the final piece of component data in one frame of the multiplexed signal.

The multiplexed signal that has been written into the memory 450 is next read out from the memory 450 in accordance with control from the read address control apparatus 454. In read address setting data from a read address setting memory 456 is set the relationship between the component data to be read out, the order of reading out the component data, and the read addresses of the component data, such that the error monitoring signal is first read out by a number of times equal to the number n of separated signals (multiplexed signals) to be outputted from the separating apparatus 460 (for the master switching apparatus 400, n=3), and then the interlock factor signals that will be the respective pieces of component data of the separated signals outputted from the separating apparatus 460 are read out one at a time in order. That is, first, the error monitoring data is read out three times, next the interlock factor signal D which is one of the interlock factor signals of the separated signal to be sent to the slave switching apparatus 100 (hereinafter referred to as the "tenth separated signal") (see FIG. 4C) is read out, the interlock factor signal C which is one of the interlock factor signals of the separated signal to be sent to the slave switching apparatus 200 (hereinafter referred to as the "eleventh separated signal") (see FIG. 4D) is read out, the interlock factor signal C which is one of the interlock factor signals of the separated signal to be sent to the slave switching apparatus 300 (hereinafter referred to as the "twelfth separated signal") (see FIG. 4E) is read out, the interlock factor signal E which is one of the interlock factor signals of the tenth separated signal is read out, and then a blank signal is read out because all of the interlock factor signals of the eleventh separated signal have already been read out, and a blank signal is read out because all of the interlock factor signals of the twelfth separated signal have already been read out, the reading being carried out until all of the interlock factor signals of each of the separated signals have been read out.

In the reading described above, the number of times of reading out component data is the same for all of the separated signals; when all of the interlock factor signals for a separated signal have been read out, a blank signal is read out. That is, the reading is carried out such that each of the separated signals becomes the same length. Moreover, the memory 450 multiplexes each of the pieces of component data in the order read out so as to produce a multiplexed signal, and outputs the multiplexed signal together with the clock signal and the frame pulse signal (see FIG. 4B). Note that the length of one frame of the multiplexed signal produced is one pulse period of the received frame pulse signal.

Next, in the separating apparatus 460, the pieces of component data of the multiplexed signal read out from the memory 450 are allotted to the output terminals in order from the top one at a time in order. Specifically, the pieces of component data of the multiplexed signal are allotted alternately to the terminals in order one at a time until the component data runs out, i.e. the error monitoring data that is the piece of component data at the top of the multiplexed signal is allotted to a first output terminal 461, the error monitoring data that is the $2^{nd}$ piece of component data of the multiplexed signal is allotted to a second output terminal 462, the error monitoring data that is the $3^{rd}$ piece of component data of the multiplexed signal is allotted to a third output terminal 463, the interlock factor signal D that is the $4^{th}$ piece of component data of the multiplexed signal is allotted to the first output terminal 461, the interlock factor signal C that is the $5^{th}$ piece of component data of the multiplexed signal is allotted to the second output terminal 462, the interlock factor signal C that is the $6^{th}$ piece of component data of the multiplexed signal is allotted to the third output terminal 463, and so on. Next, the allotted signals are multiplexed to produce separated signals. Here, the tenth separated signal to be sent to the slave switching apparatus 100 corresponding to the first output terminal 461 is produced (see FIG. 4C), the eleventh separated signal to be sent to the slave switching apparatus 200 corresponding to the second output terminal 462 is produced (see FIG. 4D), and the twelfth separated signal to be sent to the slave switching apparatus 300 corresponding to the third output terminal 463 is produced (see FIG. 4E). The separating apparatus 460 carries out the separation and the multiplexing such that the length of each of the separated signals is one pulse period of the received frame pulse signal.

The above operation is carried out continuously. That is, each multiplexed signal (one frame length) is produced continuously.

Next, the separating apparatus 460 outputs transmitted data containing the clock signal, the frame pulse signal, and the tenth separated signal from the output terminal 461 (see FIG. 4C) to a transmitting apparatus 481, outputs transmitted data containing the clock signal, the frame pulse signal, and the eleventh separated signal from the output terminal 462 (see FIG. 4D) to a transmitting apparatus 482, and outputs transmitted data containing the clock signal, the frame pulse signal, and the twelfth separated signal from the output terminal 463 (see FIG. 4E) to a transmitting apparatus 483.

The transmitting apparatus 481, 482, and 483 send the transmitted data respectively to the safety apparatus 170 of the slave switching apparatus 100, the safety apparatus 270 of the slave switching apparatus 200, and the safety apparatus 370 of the slave switching apparatus 300 via the cable wiring 180, 280, and 380.

In the slave switching apparatus 100, the safety apparatus 170 processes the transmitted data received from the master switching apparatus 400 similarly to for the safety apparatus 151. That is, in the safety apparatus 170, an error monitoring section 171 monitors whether or not the clock signal is missing from the received transmitted data, and inspects the received frame pulse signal and tenth separated signal so as to monitor whether or not the two types (55/AA) of error monitoring data (see FIG. 3) are attached alternately each pulse signal, thus monitoring for data omission, data bit slippage and so on in the separated signal. In the case that the clock signal is not missing, and the two types of error monitoring data are attached alternately each frame pulse signal, it is determined that there is no data omission, data bit slippage or the like in the separated signal, and hence that there is no error in the separated signal. On the other hand, in the case that the clock signal is missing, or the two types of error monitoring data are not attached alternately each frame pulse signal, it is determined that data omission, data bit slippage or the like has arisen in the separated signal, and hence that there is an error in the separated signal, in which case an error signal is sent to a signal producing section 172, and a switching signal is sent to a selecting section 173.

Next, upon receiving the error signal from the error monitoring section 171, the signal producing section 172 changes each of the interlock factor signals in the tenth separated signal (the interlock factor signals C and D) to ON or OFF such that the interlock destination to which the tenth separated signal is to be sent will be driven toward safety, thus producing a predetermined safe driving signal, and sends the safe driving signal to the selecting section 173.

Next, in the case of receiving the switching signal from the error monitoring section 171, i.e. in the case that there is an error in the tenth separated signal, the selecting section 173 sends the safe driving signal to the multiplexing apparatus 110, whereas in the case of not receiving the switching signal from the error monitoring section 171, i.e. in the case that there is no error in the tenth separated signal, the selecting section 173 sends the tenth separated signal to the multiplexing apparatus 110 as is.

The safety apparatus 270 of the slave switching apparatus 200 and the safety apparatus 370 of the slave switching apparatus 300 operate similarly to the safety apparatus 170 described above.

For the master switching apparatus 400, the contents of the write address setting data and the read address setting data are not limited to the above, but rather may be other contents. In this case, the separating method of the separating apparatus 460 is made to correspond to the read address setting data accordingly.

As described above, according to the interlock control apparatus of the embodiment of the present invention, when implementing interlock control between a plurality of control modules, interlock factor signals sent and received between the control modules (the slave switching apparatuses) are sent and received in multiplexed form. As a result, the number of signals sent and received between the control modules can be reduced, and hence the amount of wiring for connecting the control modules together can be reduced. The structure of the interlock control apparatus can thus be simplified.

Moreover, according to the interlock control apparatus of the present embodiment, the control modules (the slave switching apparatuses) are connected together by the master switching apparatus, and interlock factor signals required for the interlock control in each of the control modules are sent by the master switching apparatus to the respective control module in multiplexed form. As a result, the number of signals sent and received between the control modules can be further reduced, and hence the amount of wiring for connecting the control modules together can be further reduced. The structure of the interlock control apparatus can thus be further simplified.

According to the interlock control apparatus of the present embodiment, conditions for multiplexing and separating the sent and received interlock factor signals are set through changeable preset conditions such as multiplexing conditions for the slave switching apparatuses and the master switching apparatus, write address setting data, read address setting data, separating conditions, and the pulse period of the frame pulse signal. As a result, even if functions of the control modules are added or changed, or a new control module is added, desired interlock control can be carried out between the control modules by changing the above preset conditions. In this way, the interlock control apparatus according to the present embodiment can easily cope with addition or changing of the functions of the control modules, or addition of a new control module.

The interlock control apparatus according to the present embodiment has safety apparatuses, and in the case that there is an error in transmitted data transmitted between the control modules, a safety apparatus produces a signal for driving the equipment toward safety. As a result, in the case that an error has arisen in transmitted data transmitted between the control modules, control is carried out such as to drive the equipment toward safety. The safety of the interlock control apparatus can thus be improved, and hence the safety of the apparatus can be improved.

In the interlock control apparatus according to the present embodiment, each of the slave switching apparatuses and the master switching apparatus has a data storing section, it being possible to connect a monitoring terminal to the data storing section via an I/F. As a result, an operator can easily inspect state detecting signals, i.e. interlock factor signals, that are multiplexed and transmitted. The operator can thus easily inspect the state of the apparatus from the interlock factor signals, and hence can easily analyze the cause or the like in the case that a problem has arisen.

In the interlock control apparatus according to the embodiment of the present invention, the processing apparatus has three control modules, and there are three slave switching apparatuses corresponding thereto, but the number of slave switching apparatuses is not limited to this. For example, the number of slave switching apparatuses may be increased in correspondence with the number of control modules in the apparatus, or functions may be further subdivided, and the number of slave switching apparatuses may be increased in correspondence with the subdivided functions.

Next, a substrate processing apparatus having therein an interlock control apparatus according to an embodiment of the present invention will be described as a working example of the present invention. The substrate processing apparatus is constructed such as to carry out predetermined processing on substrates using a reactive active gas.

Figure 5:
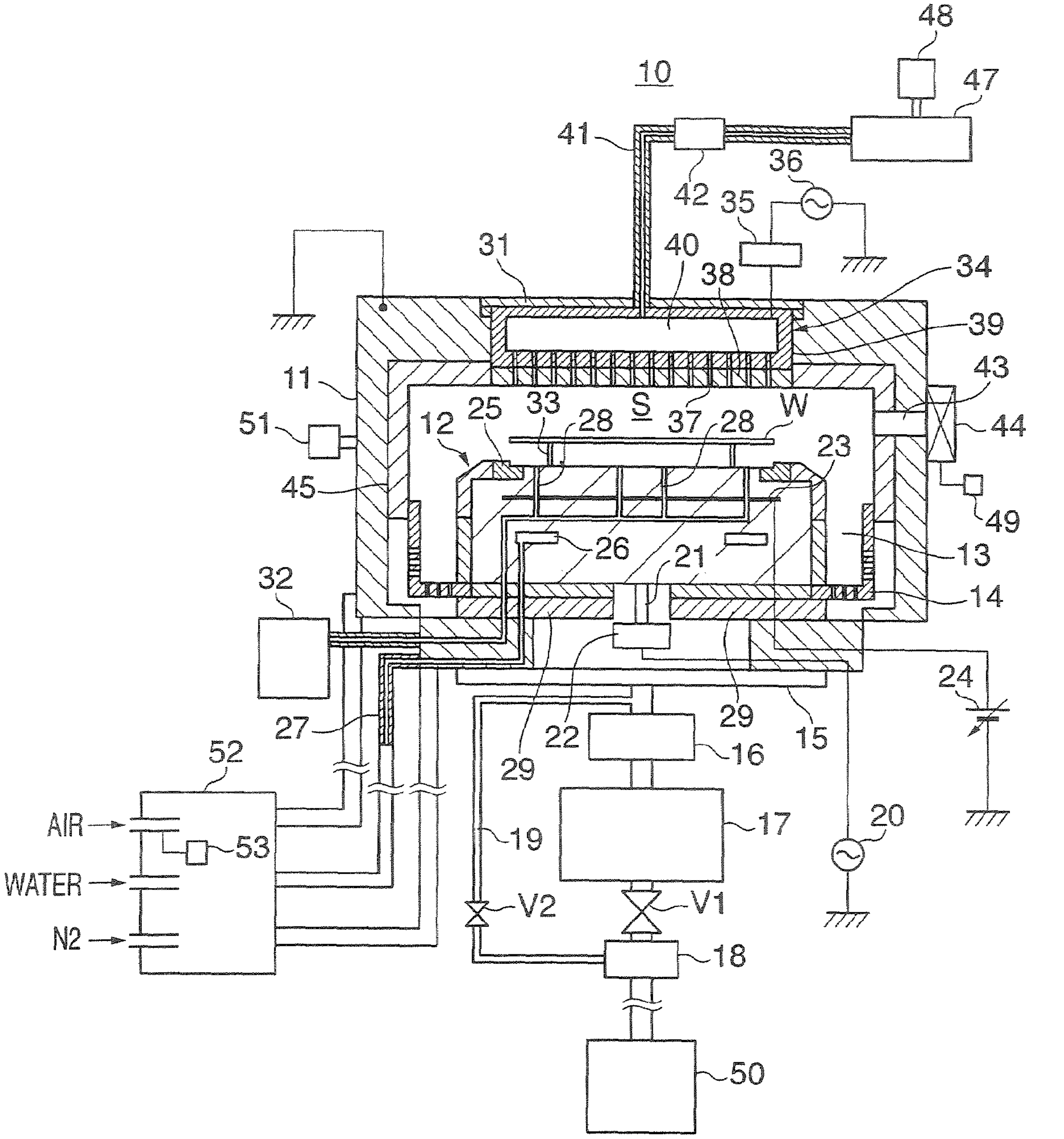
FIG. 5 is a sectional view schematically showing the construction of a plasma processing apparatus as a substrate processing apparatus having therein the interlock control apparatus according to the above embodiment.

FIG. 5 is a sectional view schematically showing the construction of a plasma processing apparatus as the substrate processing apparatus having therein the interlock control apparatus according to the present embodiment. The plasma processing apparatus carries out RIE (reactive ion etching) processing on semiconductor wafers W as substrates, and moreover is constructed such that WLDC processing can also be carried out.

As shown in FIG. 5, the plasma processing apparatus 10 has a cylindrical vacuum vessel 11 (reduced pressure vessel), and the vacuum vessel 11 has a processing space S therein. A cylindrical susceptor 12 is disposed in the vacuum vessel 11 as a stage on which is mounted a semiconductor wafer W (hereinafter referred to merely as the “wafer W”) having a diameter of, for example, 300 mm. An inner wall of the vacuum vessel 11 is covered with a side wall member 45. The side wall member 45 is made of aluminum, a surface thereof facing the processing space S being coated with a ceramic such as yttria ($Y_2O_3$) Moreover, the vacuum vessel 11 is electrically grounded, and the susceptor 12 is installed in a bottom portion of the vacuum vessel 11 via an insulating member 29.

In the plasma processing apparatus 10, an exhaust path 13 that acts as a flow path through which gas molecules above the susceptor 12 are exhausted to the outside of the vacuum vessel 11 is formed between the inner wall of the vacuum vessel 11 and a side face of the susceptor 12. An annular baffle plate 14 that prevents leakage of plasma is disposed part way along the exhaust path 13. A space in the exhaust path 13 downstream of the baffle plate 14 bends round below the susceptor 12, and is communicated with an adaptive pressure control valve (hereinafter referred to as the “APC valve”) 15, which is a variable valve. The APC valve 15 is connected to a turbo-molecular pump (hereinafter referred to as the “TMP”) 17, which is an exhausting pump for evacuation, via an isolator 16, and the TMP 17 is connected to a dry pump (hereinafter referred to as the “DP”) 18, which is also an exhausting pump, via a valve V1. The exhaust flow path comprised of the APC valve 15, the isolator 16, the TMP 17, the valve V1, and the DP 18 (hereinafter referred to as the “main exhaust line”) is used for controlling the pressure in the vacuum vessel 11 using the APC valve 15, and also for reducing the pressure in the vacuum vessel 11 down to a substantially vacuum state using the TMP 17 and the DP 18.

Moreover, piping 19 is connected from between the isolator 16 and the APC valve 15 to the DP 18 via a valve V2. The line comprised of the piping 19 and the valve V2 (hereinafter referred to as the “bypass line”) bypasses the isolator 16 and the TMP 17, and is used for roughing the vacuum vessel 11 using the DP 18.

As shown in FIG. 5, a gas detoxifying apparatus 50 is connected to the DP 18. The gas detoxifying apparatus 50 detoxifies the gas exhausted out from the vacuum vessel 11.

A lower electrode radio frequency power source 20 is connected to the susceptor 12 via a feeder rod 21 and a matcher 22. The lower electrode radio frequency power source 20 supplies predetermined radio frequency electrical power to the susceptor 12. The susceptor 12 thus acts as a lower electrode. The matcher 22 reduces reflection of the radio frequency electrical power from the susceptor 12 so as to maximize the efficiency of the supply of the radio frequency electrical power into the susceptor 12.

A disk-shaped ESC electrode plate 23 comprised of an electrically conductive film is provided in an upper portion of the susceptor 12. A DC power source 24 is electrically connected to the ESC electrode plate 23. A wafer W is attracted to and held on an upper surface of the susceptor 12 through a Johnsen-Rahbek force or a Coulomb force generated by a DC voltage applied to the ESC electrode plate 23 from the DC power source 24. Moreover, an annular focus ring 25 is provided on the upper portion of the susceptor 12 so as to surround the wafer W attracted to and held on the upper surface of the susceptor 12. The focus ring 25 is exposed to the processing space S, and focuses the plasma in the processing space S toward a surface of the wafer W, thus improving the efficiency of the RIE processing.

An annular coolant chamber 26 that extends, for example, in a circumferential direction of the susceptor 12 is provided inside the susceptor 12. A coolant, for example cooling water or a Galden® fluid, at a predetermined temperature is circulated through the coolant chamber 26 via coolant piping 27 from a chiller unit (not shown). A processing temperature of the wafer W attracted to and held on the upper surface of the susceptor 12 is controlled through the temperature of the coolant.

A plurality of heat-transmitting gas supply holes 28 are provided in a portion of the upper surface of the susceptor 12 on which the wafer W is attracted and held (hereinafter referred to as the “attracting surface”). The heat-transmitting gas supply holes 28 are connected to a heat-transmitting gas supply unit 32 by a heat-transmitting gas supply line 30 provided inside the susceptor 12. The heat-transmitting gas supply unit 32 supplies helium gas as a heat-transmitting gas via the heat-transmitting gas supply holes 28 into a gap between the attracting surface of the susceptor 12 and a rear surface of the wafer W.

A plurality of pusher pins 33 are provided in the attracting surface of the susceptor 12 as lifting pins that can be made to project out from the upper surface of the susceptor 12. The pusher pins 33 are connected to a motor (not shown) by a ball screw (not shown), and can be made to project out from the attracting surface of the susceptor 12 through rotational motion of the motor, which is converted into linear motion by the ball screw. The pusher pins 33 are housed inside the susceptor 12 when a wafer W is being attracted to and held on the attracting surface of the susceptor 12 so that the wafer W can be subjected to the RIE processing, and are made to project out from the upper surface of the susceptor 12 so as to lift the wafer W up away from the susceptor 12 when the wafer W is to be transferred out from the vacuum vessel 11 after having been subjected to the RIE processing.

A gas introducing shower head 34 is disposed in a ceiling portion of the vacuum vessel 11 facing the susceptor 12. An upper electrode radio frequency power source 36 is connected to the gas introducing shower head 34 via a matcher 35. The upper electrode radio frequency power source 36 supplies predetermined radio frequency electrical power to the gas introducing shower head 34. The gas introducing shower head 34 thus acts as an upper electrode. The matcher 35 has a similar function to the matcher 22, described earlier.

The gas introducing shower head 34 has a ceiling electrode plate 38 having a large number of gas holes 37 therein, and an electrode support 39 on which the ceiling electrode plate 38 is detachably supported. A buffer chamber 40 is provided inside the electrode support 39. A processing gas introducing pipe 41 that extends out from a processing gas supply apparatus 47 is connected to the buffer chamber 40. A piping insulator 42 is disposed part way along the processing gas introducing pipe 41. The piping insulator 42 is made of an electrically insulating material, and prevents the radio frequency electrical power supplied to the gas introducing shower head 34 from leaking into the processing gas supply apparatus 47 via the processing gas introducing pipe 41. A processing gas, for example a mixed gas of $C_xF_y$ gas as a reactive active gas and argon (Ar) gas, supplied into the buffer chamber 40 from the gas supply apparatus 47 via the processing gas introducing pipe 41 is supplied by the gas introducing shower head 34 into the vacuum vessel 11 (the processing space S) via the gas holes 37. The gas introducing shower head 34 is covered by a vessel lid 31. Moreover, the gas supply apparatus 47 has attached thereto a gas leak sensor 48 that detects leakage of the supplied processing gas.

A transfer port 43 for the wafers W is provided in a side wall of the vacuum vessel 11 in a position at the height of a wafer W that has been lifted up from the susceptor 12 by the pusher pins 33. A gate valve 44 for opening and closing the transfer port 43 is provided in the transfer port 43. The vacuum vessel 11 is connected to a load lock unit, not shown, via the gate valve 44. The load lock unit acts as a preliminary vacuum transfer chamber whose internal pressure can be adjusted. The gate valve 44 is provided with a chamber open/closed detecting sensor 49 for detecting whether the gate valve 44 is open or closed. Moreover, the vacuum vessel 11 is provided with a chamber internal pressure monitoring sensor 51 for detecting the pressure in the processing space S.

Moreover, the plasma processing apparatus 10 has a utility supply apparatus 52 that supplies air, cooling water, and $N_2$ gas into the plasma processing apparatus 10. The utility supply apparatus 52 supplies air for driving the gate valve 44 and so on, supplies cooling water from the chiller unit, and supplies $N_2$ gas from an $N_2$ tank into the load lock unit, not shown, whereby various states in the plasma processing apparatus 10 are controlled. The utility supply apparatus 52 is provided with an air supply pressure monitoring sensor 53 that detects the pressure of the supplied air.

Upon supplying radio frequency electrical power to the susceptor 12 and the gas introducing shower head 34 in the vacuum vessel 11 of the plasma processing apparatus 10 as described above, and thus applying radio frequency electrical power into the processing space S between the susceptor 12 and the gas introducing shower head 34, the mixed gas supplied from the gas introducing shower head 34 into the processing space S is turned into plasma, and hence ions are produced; the wafer W is subjected to the RIE processing by the ions.

Component elements of the plasma processing apparatus 10 having the construction described above are controlled by a system controller 60, described below with reference to FIG. 6, whereby various types of processing are carried out.

Figure 6:
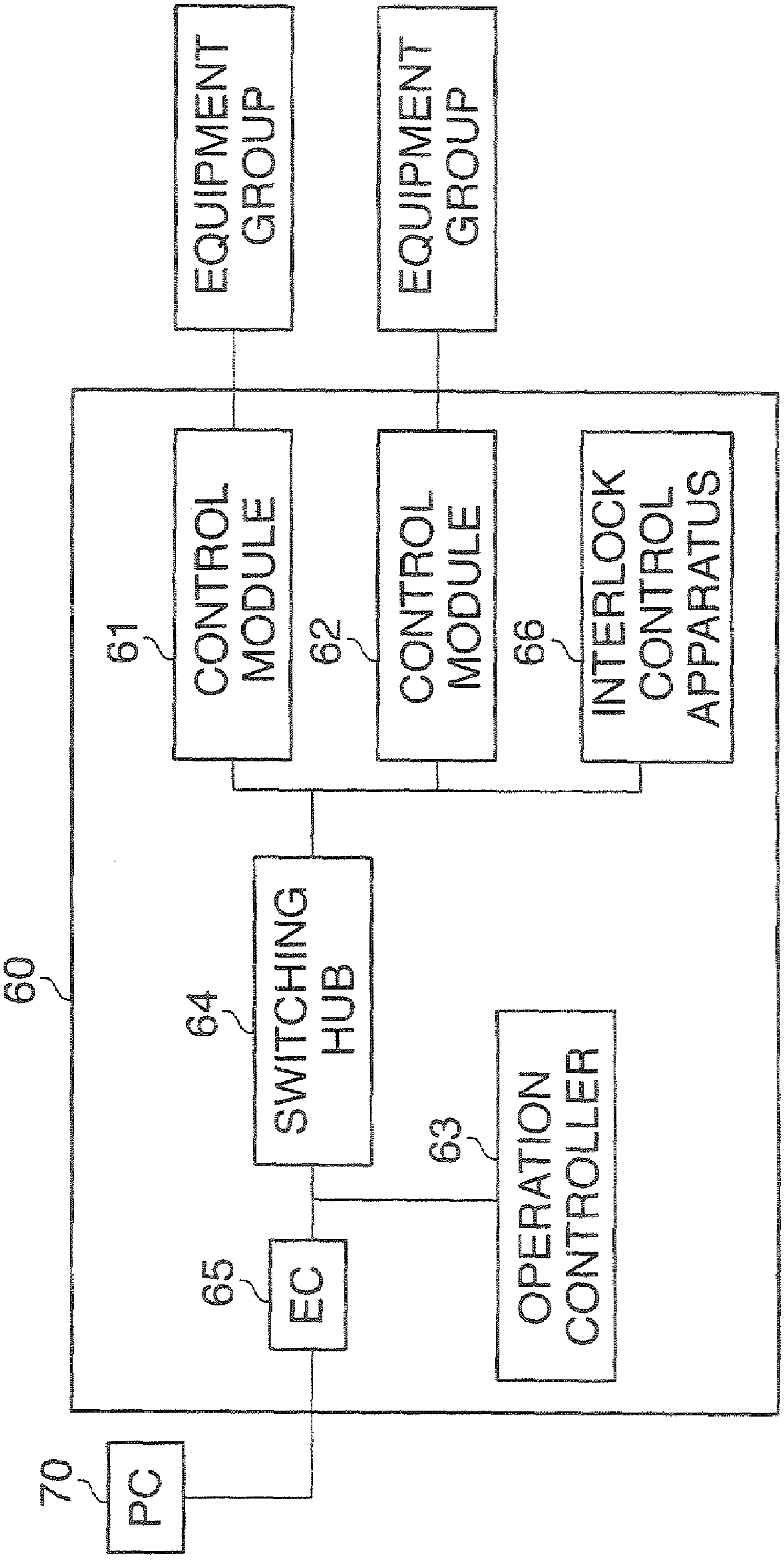
FIG. 6 is a block diagram showing a system controller of the plasma processing apparatus shown in FIG. 5.

FIG. 6 is a block diagram schematically showing the construction of the system controller 60.

The system controller 60 has, for functions of the plasma processing apparatus 10, a plurality of control modules that control equipment groups for realizing the functions. The functions of the plasma processing apparatus 10 include, for example, a wafer transfer function, a processing gas flow rate control function, and an electrical power control function. As shown in FIG. 6, the system controller 60 has control modules 61 and 62 that control the equipment groups for realizing the functions of the plasma processing apparatus 10, and an operation controller 63 that displays the operational state of the plasma processing apparatus 10, and receives operations for the plasma processing apparatus 10 from a user. Each of the control modules in the system controller 60 is connected to an EC (equipment controller) 65 via a switching hub 64. The EC 65 of the system controller 60 is connected via a LAN (local area network) 71 to a PC 70, which is an MES (manufacturing execution system) that carries out overall control of the manufacturing processes in the manufacturing plant in which the plasma processing apparatus 10 is installed. In collaboration with the system controller, the MES feeds back real real-time data on the processes in the manufacturing plant to a basic work system (not shown), and makes decisions relating to the processes in view of the overall load on the manufacturing plant and so on.

The EC 65 is a main controller (master controller) that controls the control modules and carries out overall control of the operation of the plasma processing apparatus 10. The EC 65 has a CPU, a RAM, an HDD and so on. The CPU of the EC 65 sends control signals to the control modules in accordance with programs corresponding to wafer W processing methods, i.e. recipes, specified by the user using the operation controller 63, thus controlling the operations of the equipment of the plasma processing apparatus 10.

The switching hub 64 switches which control module is connected to the EC 65 in accordance with the control signals from the EC 65.

The control modules 61 and 62 are auxiliary controllers (slave controllers) that control the operations of the equipment of the plasma processing apparatus 10, each being connected to an equipment group for a function of the plasma processing apparatus 10 via a network, not shown. The control module 61 is a processing chamber module, and controls an equipment group that implements the RIE processing in the vacuum vessel 11 of the plasma processing apparatus 10. The control module 62 is a system module, and controls an equipment group for implementing wafer transfer and so on required for implementing the RIE processing continuously and systematically.

In the plasma processing apparatus 10, when any of various processing is to be carried out on wafers W, the CPU of the EC 65 carries out switching of the switching hub 64 and sends control signals to the control modules in accordance with a program corresponding to a recipe for the processing, and the control modules control the equipment based on the received control signals.

Moreover, as shown in FIG. 6, the system controller 60 has an interlock control apparatus 66 that implements interlock control between the control modules.

In FIG. 6, to facilitate understanding of the description, the system controller 60 is shown as having only two control modules, but the control modules of the system controller 60 are not limited to the above. For example the functions of the plasma processing apparatus 10 may be more finely subdivided, the system controller 60 having more control modules in correspondence with the subdivided functions.

Next, the interlock control apparatus 66 of the plasma processing apparatus 10 will be described.

Figure 7A:
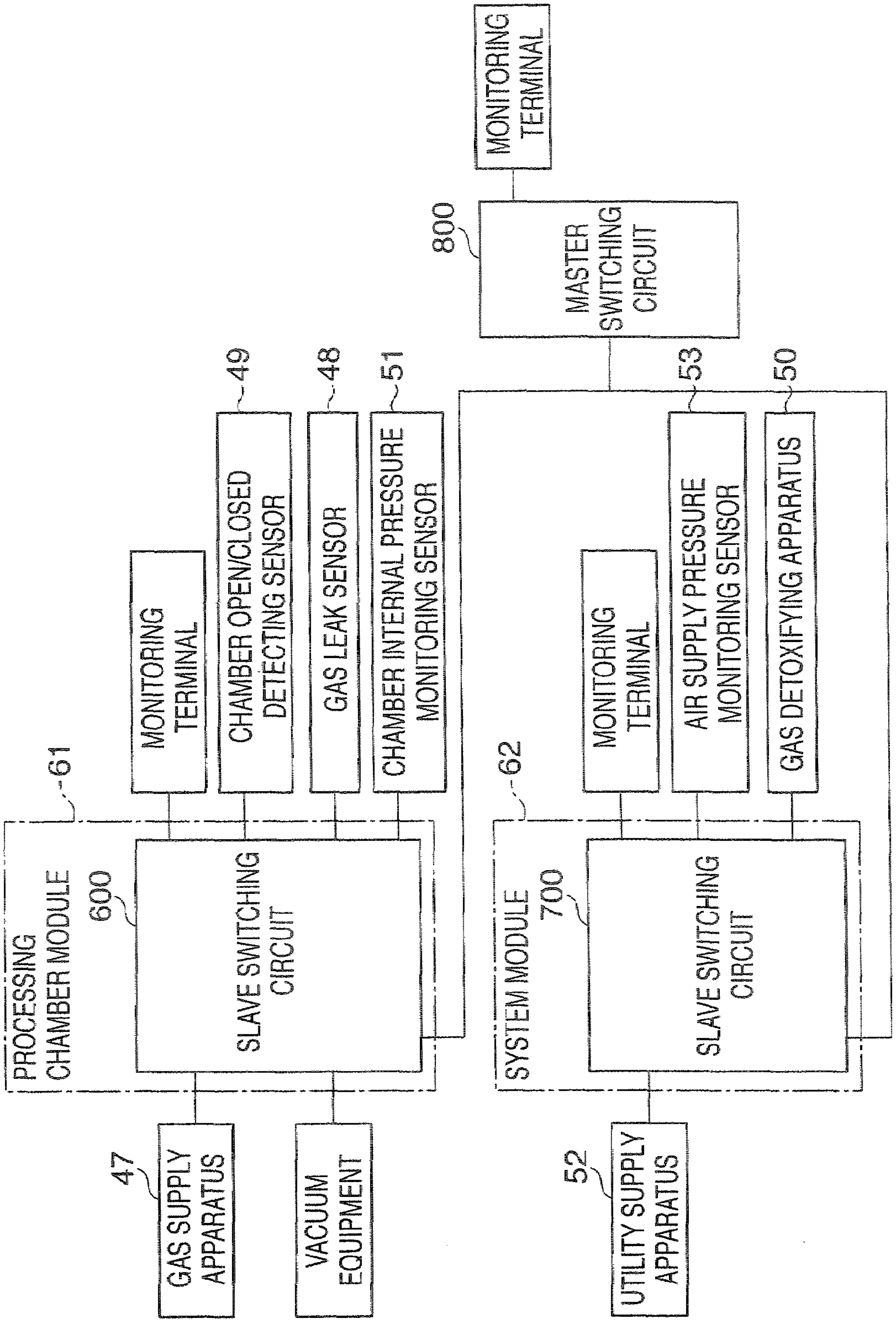
FIG. 7A is a block diagram schematically showing the overall construction of an interlock control apparatus of the plasma processing apparatus shown in FIG. 5.

FIG. 7A is a block diagram schematically showing the overall construction of the interlock control apparatus 66 of the plasma processing apparatus 10, and FIGS. 7B to 7G are enlarged views schematically showing the construction of parts of the interlock control apparatus 66. In the following description, to facilitate understanding of the description, it is assumed that the interlock control carried out between the processing chamber module 61 and the system module 62 by the interlock control apparatus 66 is carried out on vacuum equipment and the gas supply apparatus 47, which are controlled by the processing chamber module 61, and the utility supply apparatus 52, which is controlled by the system module 62.

As shown in FIG. 7A, the interlock control apparatus 66 has a slave switching circuit 600 as a slave switching apparatus provided in the processing chamber module 61, a slave switching circuit 700 as a slave switching apparatus provided in the system module 62, and a master switching circuit 800 as a master switching apparatus that connects the slave switching circuit 600 and the slave switching circuit 700 together.

Figure 7B:
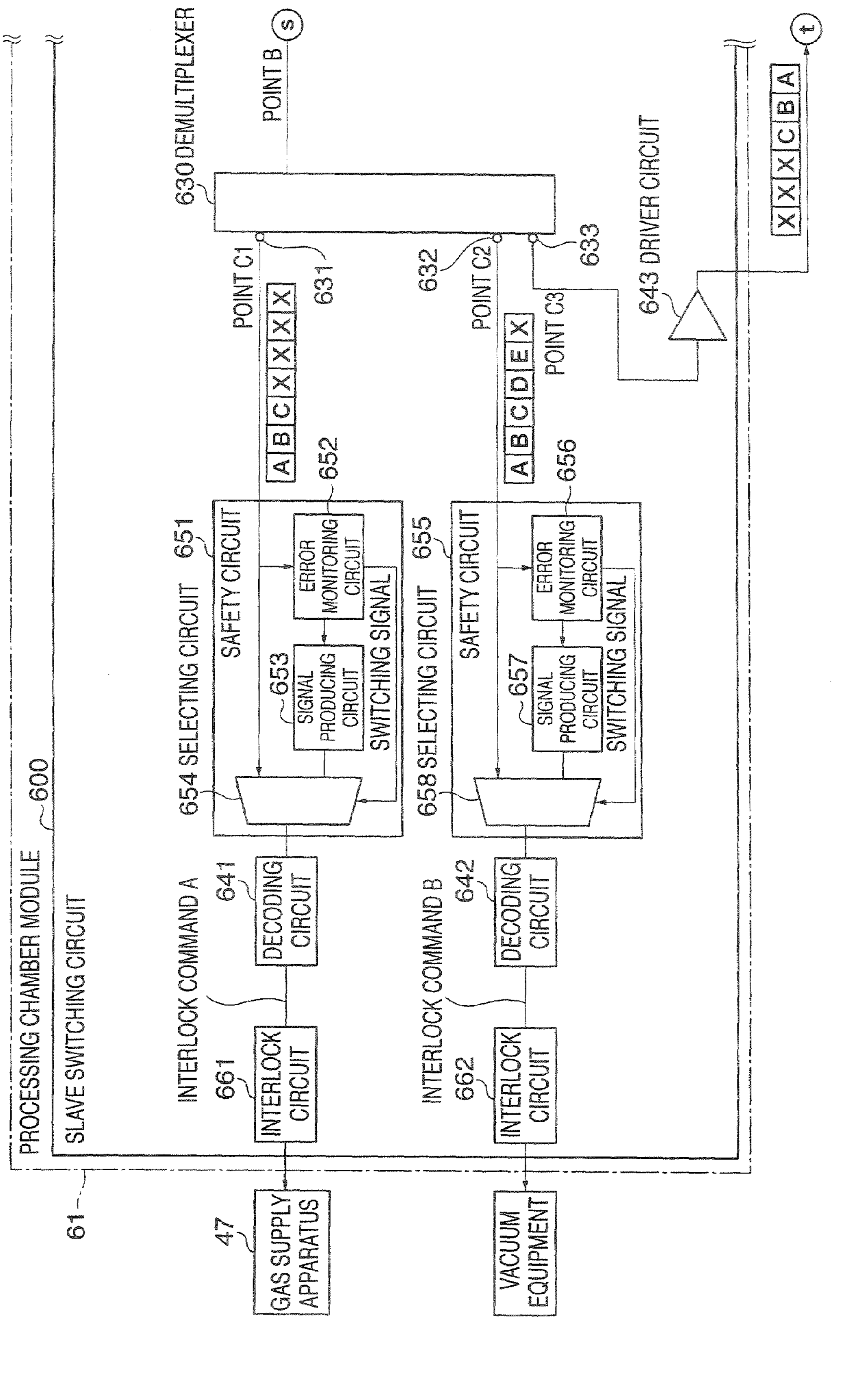
FIG. 7B is an enlarged view schematically showing the construction of part of the interlock control apparatus shown in FIG. 7A.
Figure 7C:
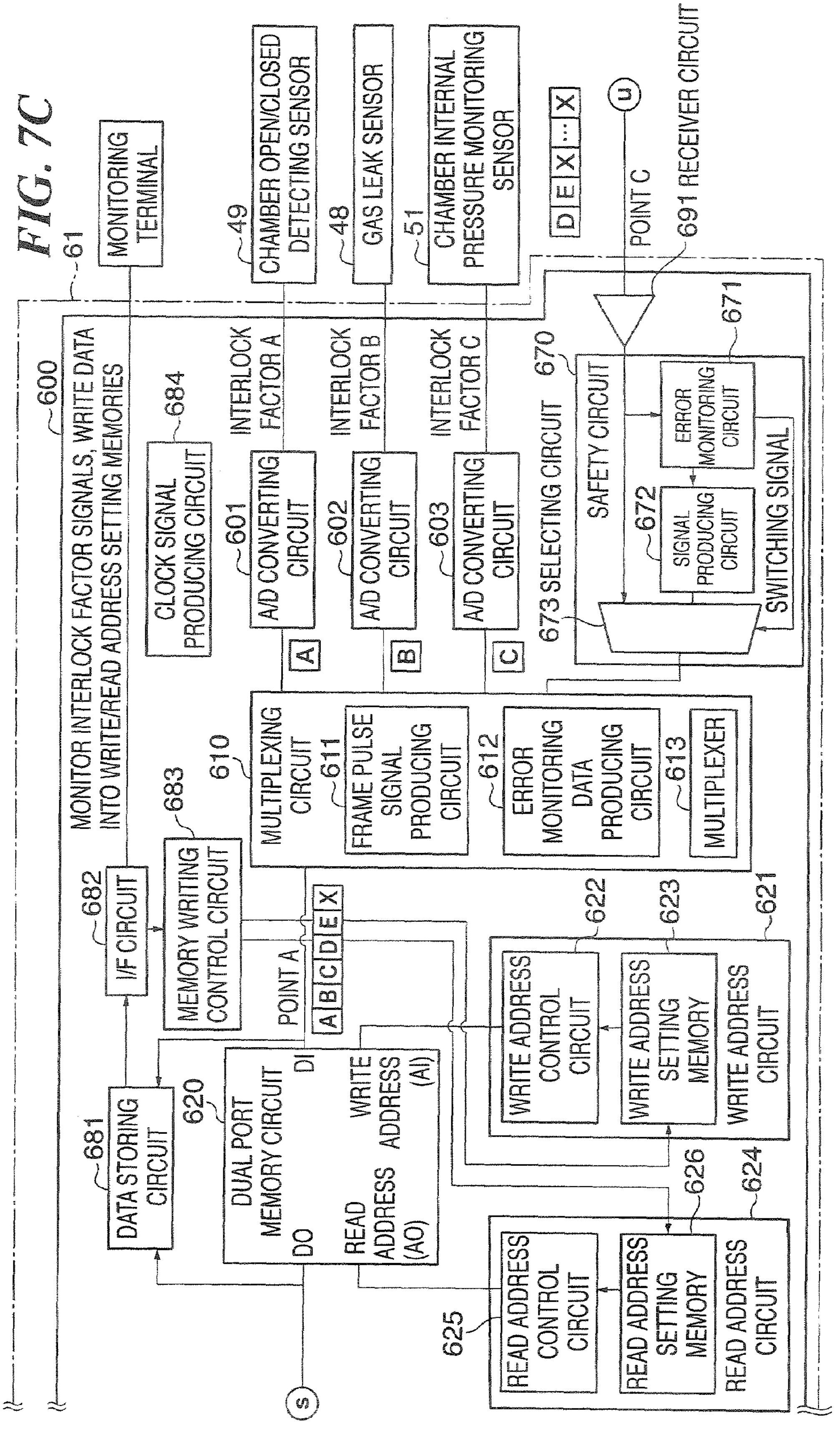
FIG. 7C is an enlarged view schematically showing the construction of part of the interlock control apparatus shown in FIG. 7A.

As shown in FIGS. 7B and 7C, the slave switching circuit 600 has A/D converting circuits 601, 602, and 603 as signal converters, a multiplexing circuit 610, a dual port memory circuit 620 as a memory, a write address circuit 621 as a write address control apparatus that controls the dual port memory circuit 620, a read address circuit 624 as a read address control apparatus that controls the dual port memory circuit 620, a demultiplexer 630 as a separating apparatus, decoding circuits 641 and 642 as decoders, a driver circuit 643 as a transmitting apparatus, safety circuits 651, 655, and 670 as safety apparatuses, and interlock circuits 661 and 662 as interlock control sections.

The multiplexing circuit 610 has a frame pulse signal producing circuit 611, an error monitoring data producing circuit 612, and a multiplexer 613 as a multiplexing section.

The write address circuit 621 has a write address control circuit 622 and a write address setting memory 623. The read address circuit 624 has a read address control circuit 625 and a read address setting memory 626.

The safety circuits 651, 655, and 670 respectively have an error monitoring circuit 652, 656, or 671, a signal producing circuit 653, 657, or 672, and a selecting circuit 654, 658, or 673.

Moreover, the slave switching circuit 600 has a data storing circuit 681 as a data storing section, an I/F circuit 682, a memory writing control circuit 683 as a memory writing control section, and a clock signal producing circuit 684 as a clock signal producing apparatus. The slave switching circuit 600 further has a receiver circuit 691.

In the slave switching circuit 600, the A/D converting circuits 601, 602, and 603 are connected respectively to the chamber open/closed detecting sensor 49, the gas leak sensor 48, and the chamber internal pressure monitoring sensor 51.

The chamber open/closed detecting sensor 49 outputs an interlock factor signal A that indicates the open/closed state of the gate valve 44 of the plasma processing apparatus 10. The chamber open/closed detecting sensor 49 outputs an ON signal as the interlock factor signal A in the case that the gate valve 44 is in the open state, and outputs an OFF signal as the interlock factor signal A in the case that the gate valve 44 is in the closed state.

The gas leak sensor 48 outputs an interlock factor signal B that indicates whether or not a processing gas leak has arisen in the gas supply apparatus 47. The gas leak sensor 48 outputs an ON signal as the interlock factor signal B in the case that a processing gas leak has arisen in the gas supply apparatus 47, and outputs an OFF signal as the interlock factor signal B in the case that a processing gas leak has not arisen in the gas supply apparatus 47.

The chamber internal pressure monitoring sensor 51 outputs an interlock factor signal C that indicates whether or not the processing space S in the vacuum vessel 11 is in an atmospheric pressure state. The chamber internal pressure monitoring sensor 51 outputs an ON signal as the interlock factor signal C in the case that the processing space S in the vacuum vessel 11 is in the atmospheric pressure state, and outputs an OFF signal as the interlock factor signal C in the case that the processing space S in the vacuum vessel 11 is not in the atmospheric pressure state.

The interlock circuit 661 is connected to the gas supply apparatus 47 of the plasma processing apparatus 10, and carries out interlock control on the gas supply apparatus 47 in accordance with the values of the interlock factor signals A, B, and C. Specifically, the interlock circuit 661 issues an interlock command A to the gas supply apparatus 47 commanding the gas supply apparatus 47 to stop and suspend gas supply of the processing gas in the case of any of the following conditions: the case that the value of the interlock factor signal A is in the ON state and hence the gate valve 44 is in the open state, the case that the value of the interlock factor signal B is in the ON state and hence a gas leak has arisen in the gas supply apparatus 47, or the case that the interlock factor signal C is in the ON state and hence the processing space S in the vacuum vessel 11 is in the atmospheric pressure state. Upon receiving the interlock command A, the gas supply apparatus 47 stops and suspends gas supply of the processing gas. On the other hand, in the case that none of the value of the interlock factor signal A, the value of the interlock factor signal B, and the value of the interlock factor signal C is in the ON state, the interlock circuit 661 does not issue the interlock command A.

Moreover, the interlock circuit 662 is connected to the vacuum equipment of the plasma processing apparatus 10, and carries out interlock control on the vacuum equipment in accordance with the values of the interlock factor signals A, B, and C, and interlock factor signals D and E. The vacuum equipment is equipment including the APC valve 15, the TMP 17, and the DP 18. Moreover, the interlock factor signal D is a signal outputted by the air supply pressure monitoring sensor 53, the value thereof being ON in the case that the pressure of the air supplied from the utility supply apparatus 52 has decreased below a predetermined pressure required for driving systems such as the gate valve 44 of the plasma processing apparatus 10. The interlock factor signal E is a signal that indicates the state of the gas detoxifying apparatus 50, the value thereof being ON in the case that a fault has arisen in the gas detoxifying apparatus 50.

Specifically, the interlock circuit 662 issues an interlock command B to the vacuum equipment commanding the vacuum equipment to stop and suspend evacuation of the vacuum vessel 11 in the case of any of the following conditions: the case that the interlock factor signal A is in the ON state and hence the gate valve 44 is in the open state, the case that the interlock factor signal B is in the ON state and hence a gas leak has arisen in the gas supply apparatus 47, the case that the interlock factor signal C is in the ON state and hence the processing space S in the vacuum vessel 11 is in the atmospheric pressure state, the case that the interlock factor signal D is in the ON state and hence the pressure of the air supplied from the utility supply apparatus 52 has decreased below the predetermined pressure, or the case that the interlock factor signal E is in the ON state and hence a fault has arisen in the gas detoxifying apparatus 50. Upon receiving the interlock command B, the vacuum equipment stops and suspends evacuation of the vacuum vessel 11. On the other hand, in the case that none of the values of the interlock factor signals A, B, C, D, and E is in the ON state, the interlock circuit 662 does not issue the interlock command B.

Figure 7D:
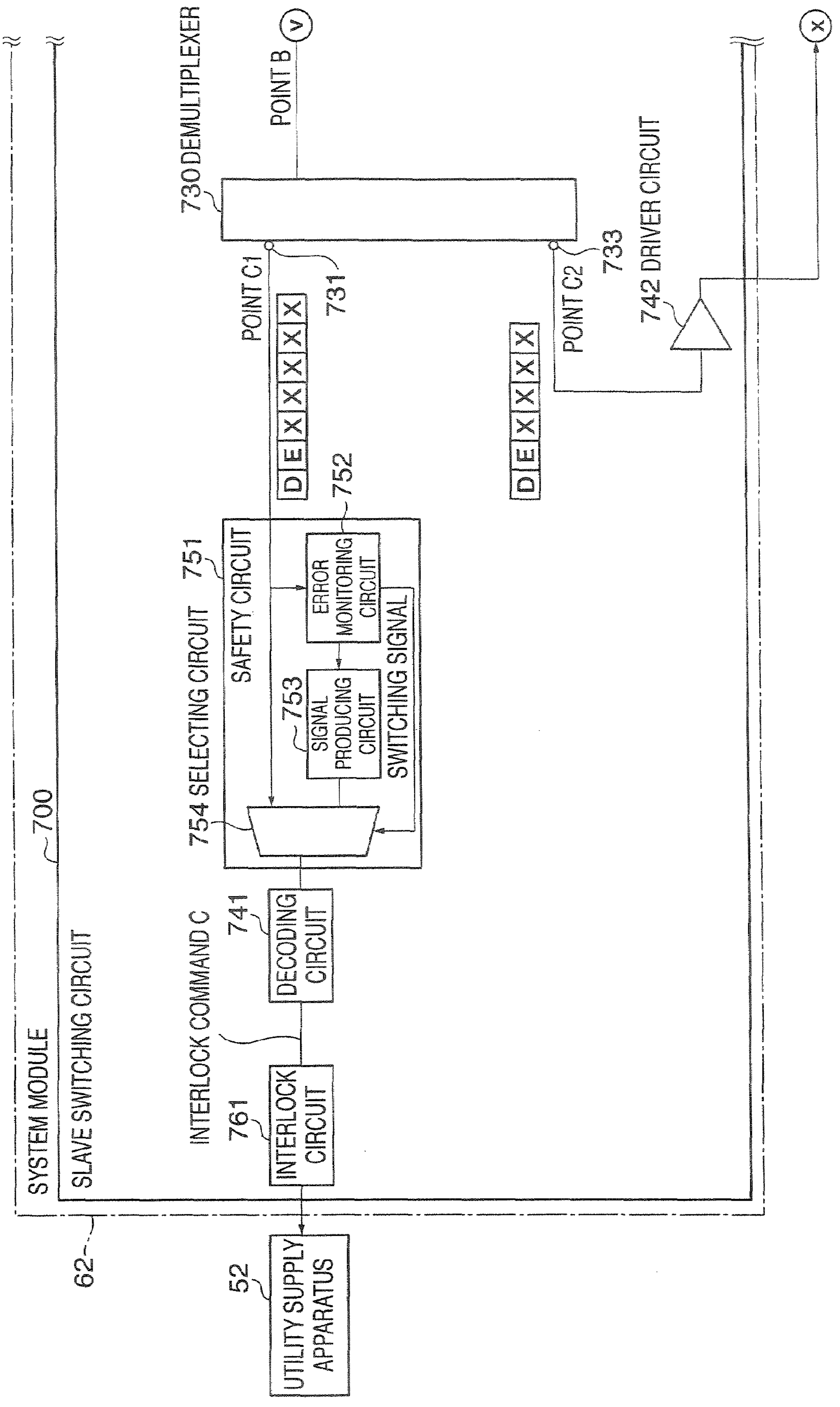
FIG. 7D is an enlarged view schematically showing the construction of part of the interlock control apparatus shown in FIG. 7A.
Figure 7E:
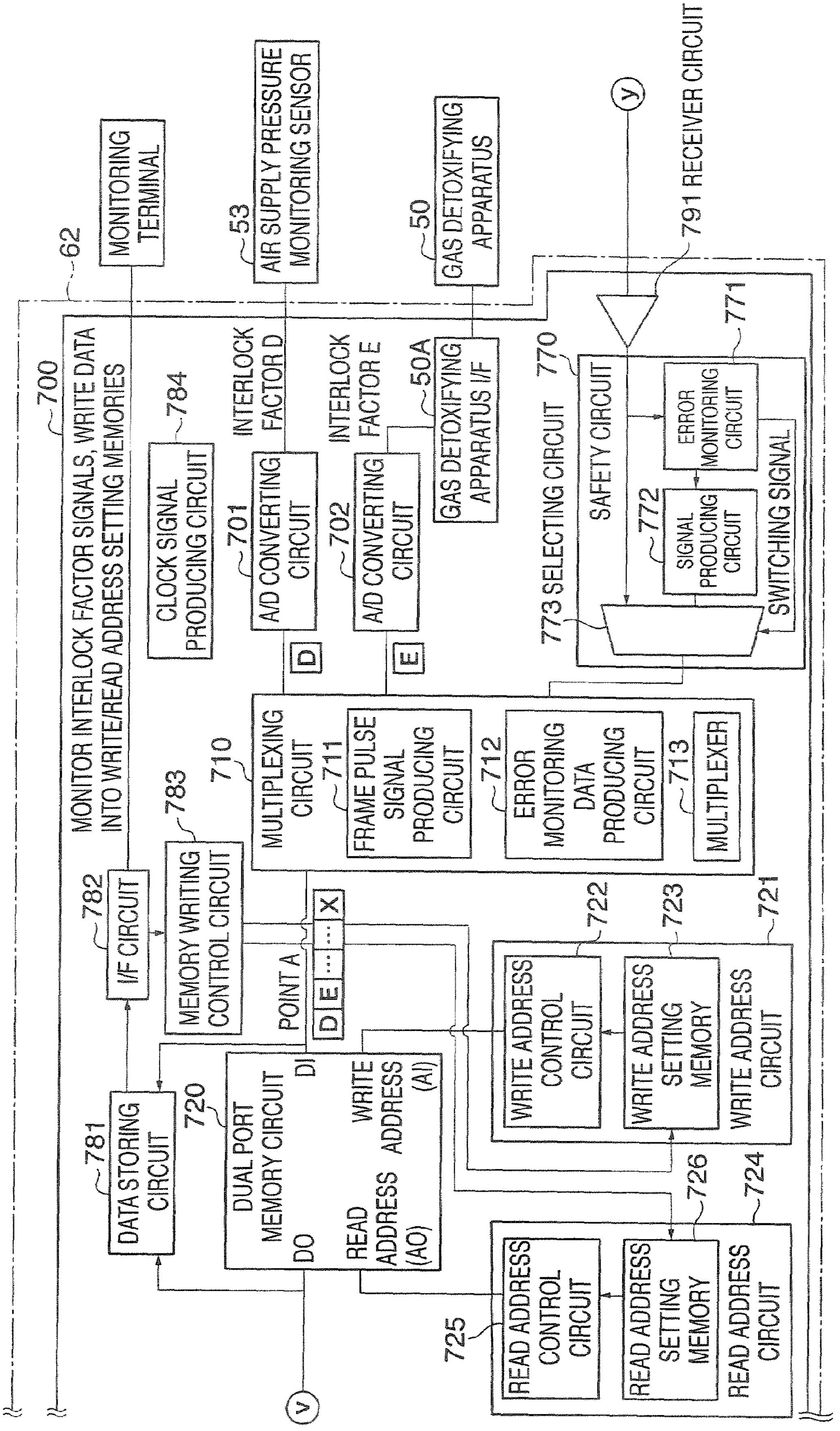
FIG. 7E is an enlarged view schematically showing the construction of part of the interlock control apparatus shown in FIG. 7A.

As shown in FIGS. 7D and 7E, the slave switching circuit 700 has A/D converting circuits 701 and 702 as signal converters, a multiplexing circuit 710, a dual port memory circuit 720 as a memory, a write address circuit 721 as a write address control apparatus that controls the dual port memory circuit 720, a read address circuit 724 as a read address control apparatus that controls the dual port memory circuit 720, a demultiplexer 730 as a separating apparatus, a decoding circuit 741 as a decoder, a driver circuit 742 as a transmitting apparatus, safety circuits 751 and 770 as safety apparatuses, and an interlock circuit 761 as an interlock control section.

The multiplexing circuit 710 has a frame pulse signal producing circuit 711, an error monitoring data producing circuit 712, and a multiplexer 713 as a multiplexing section.

The write address circuit 721 has a write address control circuit 722 and a write address setting memory 723. The read address circuit 724 has a read address control circuit 725 and a read address setting memory 726.

The safety circuits 751 and 770 respectively have an error monitoring circuit 752 or 771, a signal producing circuit 753 or 772, and a selecting circuit 754 or 773.

Moreover, the slave switching circuit 700 has a data storing circuit 781 as a data storing section, an I/F circuit 782, a memory writing control circuit 783 as a memory writing control section, and a clock signal producing circuit 784 as a clock signal producing apparatus. The slave switching circuit 700 further has a receiver circuit 791.

In the slave switching circuit 700, the A/D converting circuits 701 and 702 are connected respectively to the air supply pressure monitoring sensor 53, and via a gas detoxifying apparatus I/F 50*a* to the gas detoxifying apparatus 50.

As described above, the air supply pressure monitoring sensor 53 outputs the interlock factor signal D indicating the state of the pressure of the air supplied from the utility supply apparatus 52. The air supply pressure monitoring sensor 53 outputs an ON signal as the interlock factor signal D in the case that the pressure of the air supplied from the utility supply apparatus 52 has decreased below the predetermined pressure required for driving the systems such as the gate valve 44 of the plasma processing apparatus 10, and outputs an OFF signal as the interlock factor signal D in the case that the pressure of the air supplied from the utility supply apparatus 52 is not less than the predetermined pressure.

The gas detoxifying apparatus 50 outputs the interlock factor signal E indicating the state of the gas detoxifying apparatus 50 via the gas detoxifying apparatus I/F 50*a*. The gas detoxifying apparatus 50 is able to determine whether or not a fault has arisen in the gas detoxifying apparatus 50, outputting an ON signal as the interlock factor signal E in the case that a fault has arisen in the gas detoxifying apparatus 50, and outputting an OFF signal as the interlock factor signal E in the case that a fault has not arisen in the gas detoxifying apparatus 50.

The interlock circuit 761 is connected to the utility supply apparatus 52 of the plasma processing apparatus 10, and carries out interlock control on the utility supply apparatus 52 in accordance with the values of the interlock factor signals D and E. Specifically, the interlock circuit 761 issues an interlock command C to the utility supply apparatus 52 commanding the utility supply apparatus 52 to stop supply of processing air, water, and $N_2$ gas in the case of either of the following conditions: the value of the interlock factor signal D is ON and hence the pressure of the air supplied from the utility supply apparatus 52 has decreased below the predetermined pressure required for driving the systems such as the gate valve 44 of the plasma processing apparatus 10, or the case that the interlock factor signal E is in the ON state and hence a fault has arisen in the gas detoxifying apparatus 50. Upon receiving the interlock command C, the utility supply apparatus 52 stops supply of the air, water, and $N_2$ gas. On the other hand, in the case that neither the value of the interlock factor signal D nor the value of the interlock factor signal E is ON, the interlock circuit 761 does not issue the interlock command C.

Figure 7F:
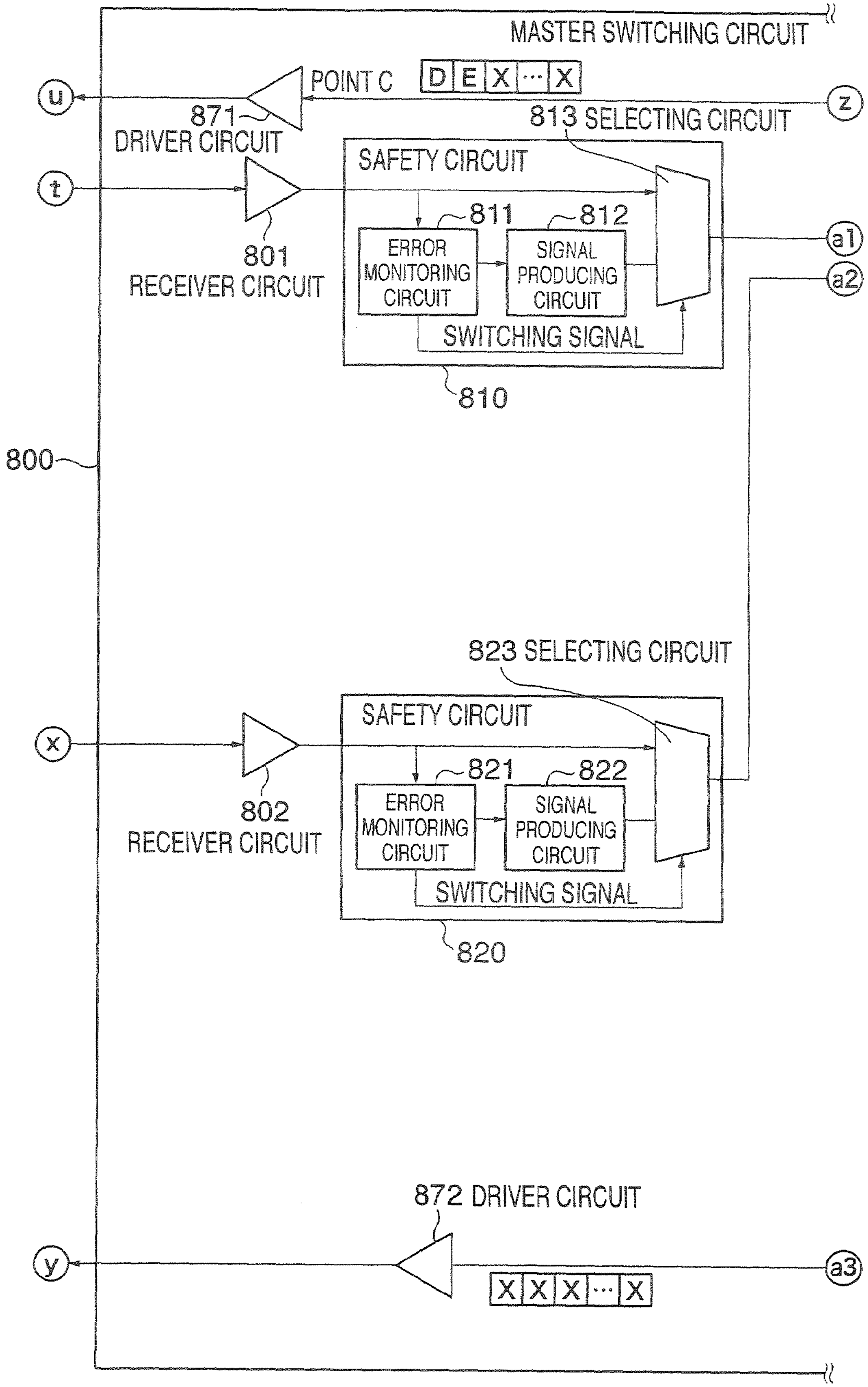
FIG. 7F is an enlarged view schematically showing the construction of part of the interlock control apparatus shown in FIG. 7A.
Figure 7G:
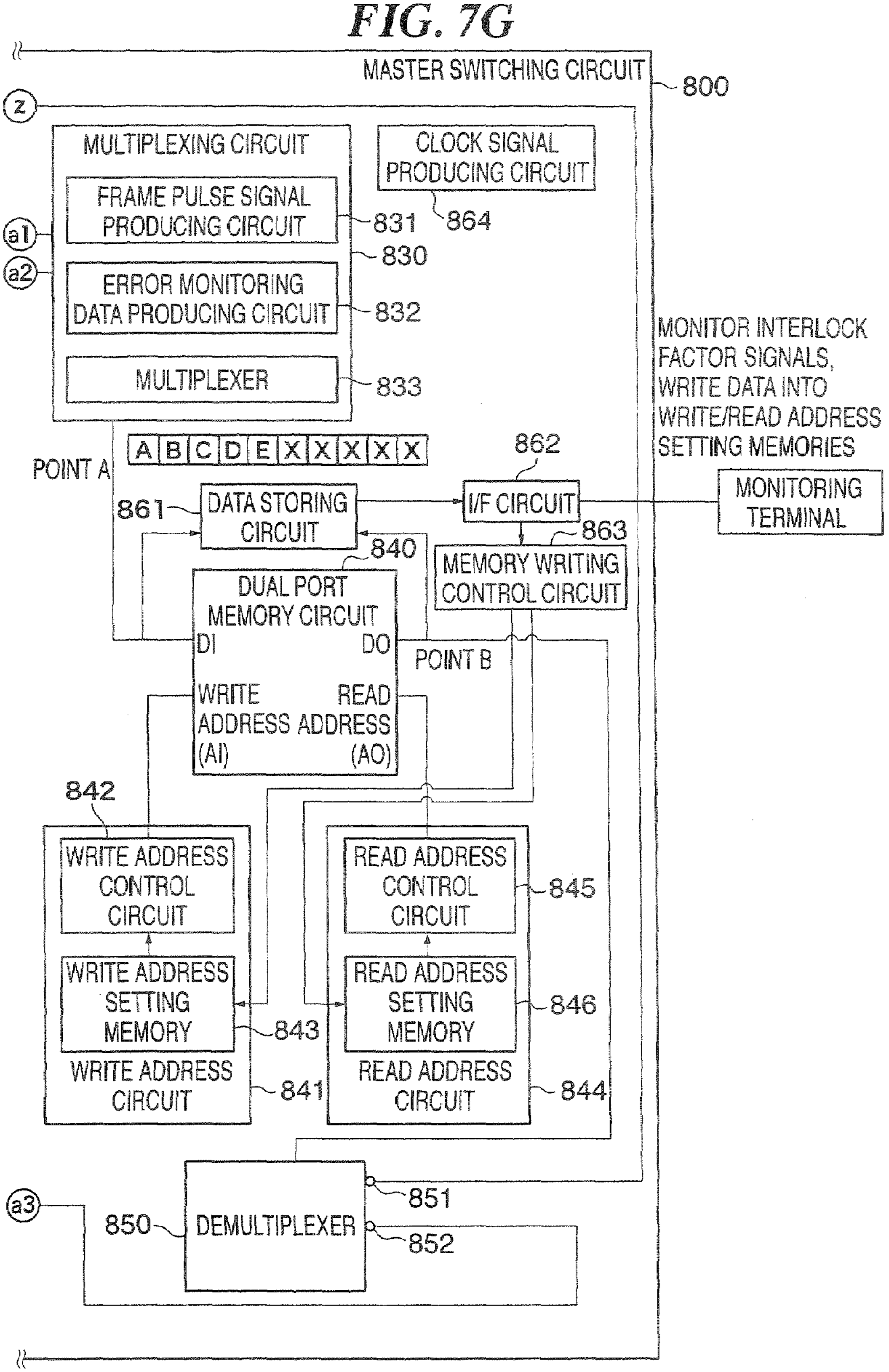
FIG. 7G is an enlarged view schematically showing the construction of part of the interlock control apparatus shown in FIG. 7A.

As shown in FIGS. 7F and 7G, the master switching circuit 800 has receiver circuits 801 and 802 connected respectively to the driver circuit 643 of the slave switching circuit 600 and the driver circuit 742 of the slave switching circuit 700, safety circuits 810 and 820 as safety apparatuses connected respectively to the receiver circuits 801 and 802, a multiplexing circuit 830, a dual port memory circuit 840 as a memory, a write address circuit 841 as a write address control apparatus that controls the dual port memory circuit 840, a read address circuit 844 as a read address control apparatus that controls the dual port memory circuit 840, a demultiplexer 850 as a separating apparatus, and driver circuits 871 and 872 as transmitting apparatuses.

The multiplexing circuit 830 has a frame pulse signal producing circuit 831, an error monitoring data producing circuit 832, and a multiplexer 833 as a multiplexing section.

The write address circuit 841 has a write address control circuit 842 and a write address setting memory 843. The read address circuit 844 has a read address control circuit 845 and a read address setting memory 846.

The safety circuits 810 and 820 respectively have an error monitoring circuit 811 or 821, a signal producing circuit 812 or 822, and a selecting circuit 813 or 823.

Moreover, the master switching circuit 800 has a data storing circuit 861 as a data storing section, an I/F circuit 862, a memory writing control circuit 863 as a memory writing control section, and a clock signal producing circuit 864 as a clock signal producing apparatus.

The slave switching circuit 600 and the master switching circuit 800 are communicably connected together by the driver circuit 643 and the receiver circuit 801, and by the receiver circuit 691 and the driver circuit 871. The driver circuit 643 and the receiver circuit 801, and the receiver circuit 691 and the driver circuit 871, thus each correspond to a transmitting apparatus and cable wiring of the interlock control apparatus 1 shown in FIG. 1. Similarly, the slave switching circuit 700 and the master switching circuit 800 are communicably connected together by the driver circuit 742 and the receiver circuit 802, and by the receiver circuit 791 and the driver circuit 872. The driver circuit 742 and the receiver circuit 802, and the receiver circuit 791 and the driver circuit 872, thus each correspond to a transmitting apparatus and cable wiring of the interlock control apparatus 1 shown in FIG. 1.

The constructions of the slave switching circuits 600 and 700 and the master switching circuit 800 are similar to for the slave switching apparatuses and the master switching apparatus of the interlock control apparatus 1 shown in FIG. 1, and hence detailed description is omitted.

Figures 9A, 9B:
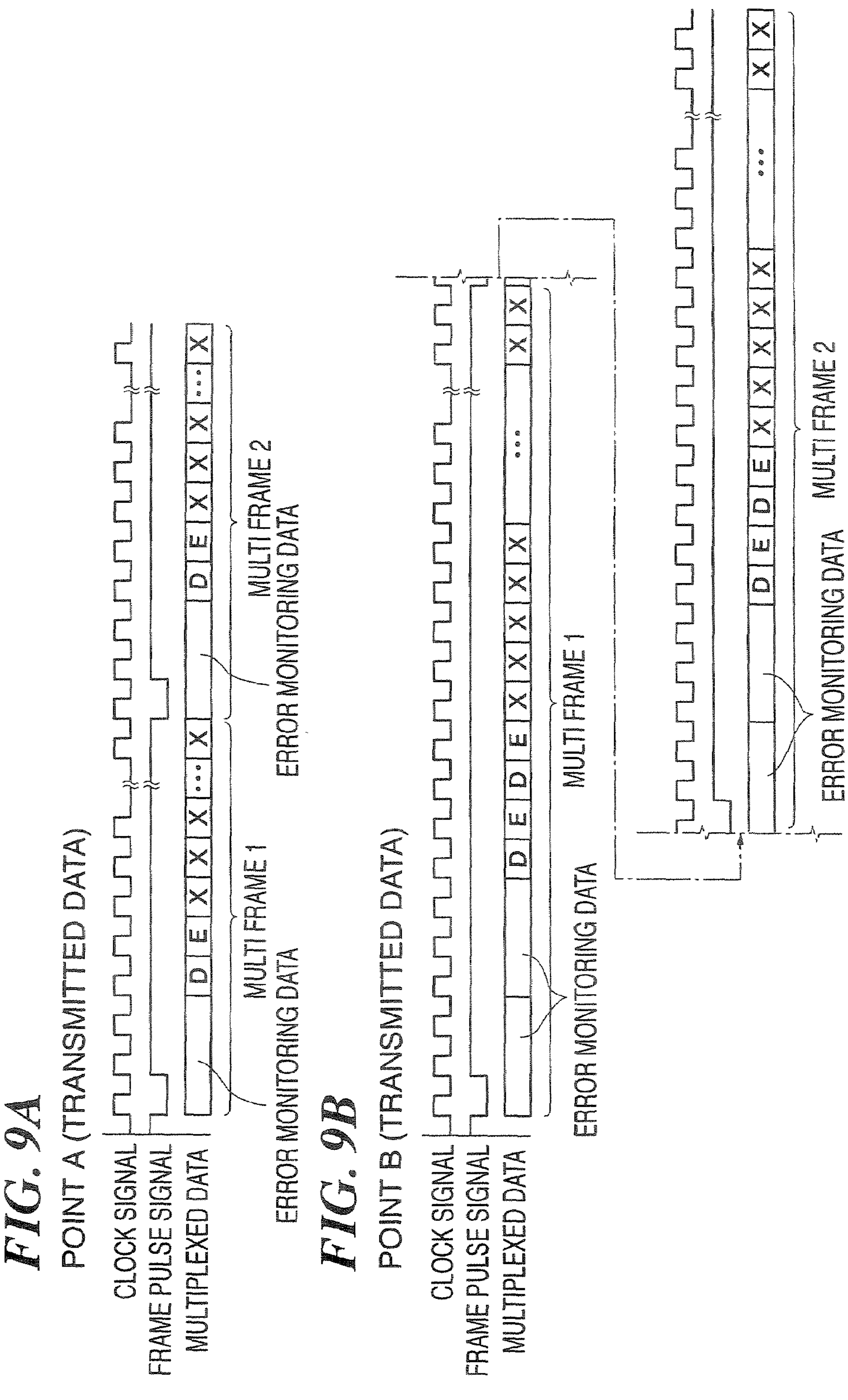
FIGS. 9A and 9B are drawings for explaining the operation of a slave switching circuit appearing in FIG. 7A, and show respectively transmitted data transmitted at points A and B of the slave switching circuit appearing in FIGS. 7D and 7E.
Figure 9C:
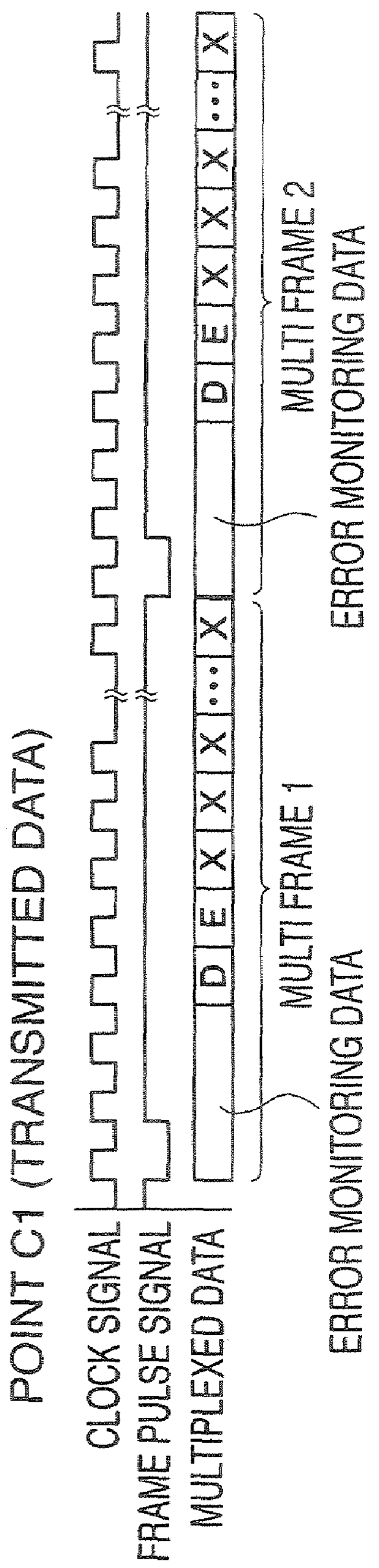
FIGS. 9C and 9D are drawings for explaining the operation of the slave switching circuit appearing in FIG. 7A, and show respectively transmitted data transmitted at points C1 and C2 of the slave switching circuit appearing in FIG. 7D.
Figure 9D:
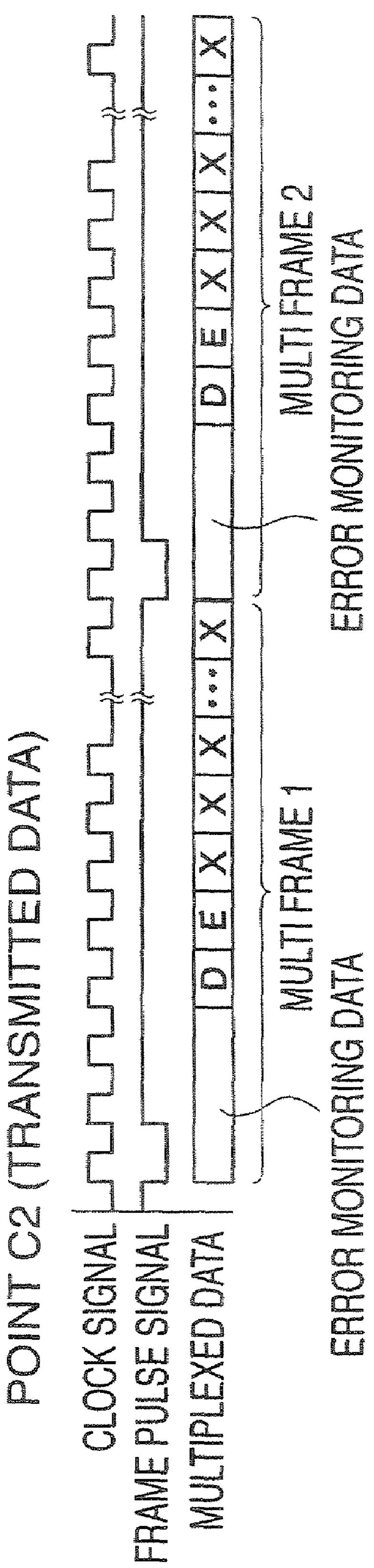
Figure 10A:
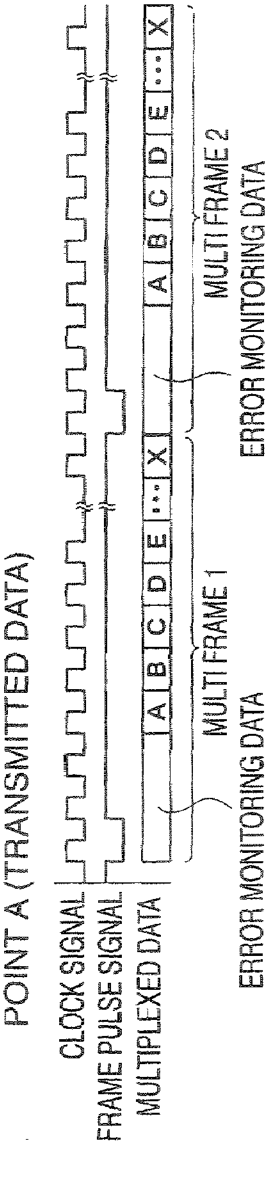
FIGS. 10A to 10C are drawings for explaining operation of a master switching circuit appearing in FIG. 7A, and show respectively transmitted data transmitted at points A, B, and C of the master switching circuit appearing in FIGS. 7F and 7G.
Figure 10B:
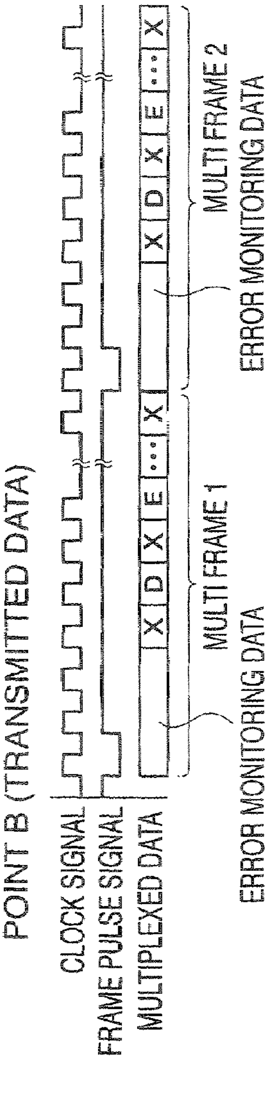
Figure 10C:
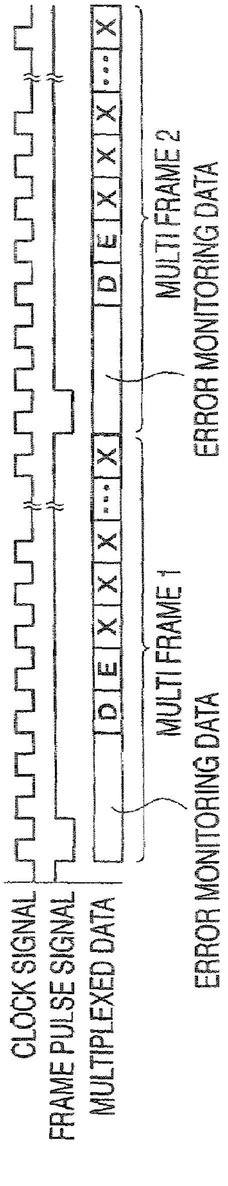

Operation of the interlock control apparatus 66 will now be described with reference to FIGS. 8A to 8E, FIGS. 9A to 9D, and FIGS. 10A to 10C. FIGS. 8A to 8E are drawings for explaining operation of the slave switching circuit 600, being respectively drawings showing transmitted data transmitted at points A, B, C1, C2, and C3 of the slave switching circuit 600 appearing in FIGS. 7B and 7C. FIGS. 9A to 9D are drawings for explaining operation of the slave switching circuit 700, showing respectively transmitted data transmitted at points A, B, C1, and C2 of the slave switching circuit 700 appearing in FIGS. 7D and 7E. FIGS. 10A to 10C are drawings for explaining operation of the master switching circuit 800, showing respectively transmitted data transmitted at points A, B, and C of the master switching circuit 800 appearing in FIGS. 7F and 7G.

First, the operation of the slave switching circuit 600 will be described.

The A/D converting circuits 601, 602, and 603 convert the interlock factor signals A, B, and C received from the chamber open/closed detecting sensor 49, the gas leak sensor 48, and the chamber internal pressure monitoring sensor 51 respectively into digital signals through A/D conversion. Each of the interlock factor signals A, B, and C outputted respectively from the chamber open/closed detecting sensor 49, the gas leak sensor 48, and the chamber internal pressure monitoring sensor 51 is a high level ON signal or a low level OFF signal as shown in FIG. 2A. Upon being subjected to the A/D conversion by the A/D converting circuits 601, 602, and 603 respectively, each of the interlock factor signals A, B, and C becomes an ON/OFF digital signal as shown in FIG. 2B.

Next, the multiplexer 613 multiplexes together error monitoring data produced by the error monitoring data producing circuit 612, the interlock factor signals A, B, and C that have been subjected to the A/D conversion, and interlock factor signals D and E transmitted from the master switching circuit 800 as described below, so as to produce a multiplexed signal. The error monitoring data is predetermined data of two types, for example data as shown in FIG. 3.

The multiplexer 613 multiplexes the received interlock factor signals in alphabetical order after the error monitoring data so as to produce the multiplexed signal. The multiplexing section 613 produces the multiplexed signal such that the length of one frame of the produced multiplexed signal is a length corresponding to one pulse period of the frame pulse signal from the frame pulse signal producing circuit 611 (see FIG. 8A). In the case that the multiplexed signal produced by multiplexing together the error monitoring data and the received interlock factor signals is shorter than the frame length stipulated by the frame pulse signal, the multiplexer 613 multiplexes on a predetermined number of blank signals so as to make the length of the produced multiplexed signal be the frame length. The multiplexed signal produced by the multiplexer 613 is thus a signal in which are multiplexed the error monitoring data, the interlock factor signals A, B, C, D, and E, and the predetermined number of blank signals in this order as shown in FIG. 8A.

The frame pulse signal is a pulse signal having a preset pulse width. The frame pulse signal producing circuit 611 produces the frame pulse signal based on the clock signal from the clock signal producing circuit 684. The frame pulse signal producing circuit 612 is constructed such that the pulse width of the frame pulse signal produced can be changed.

Figure 8A:
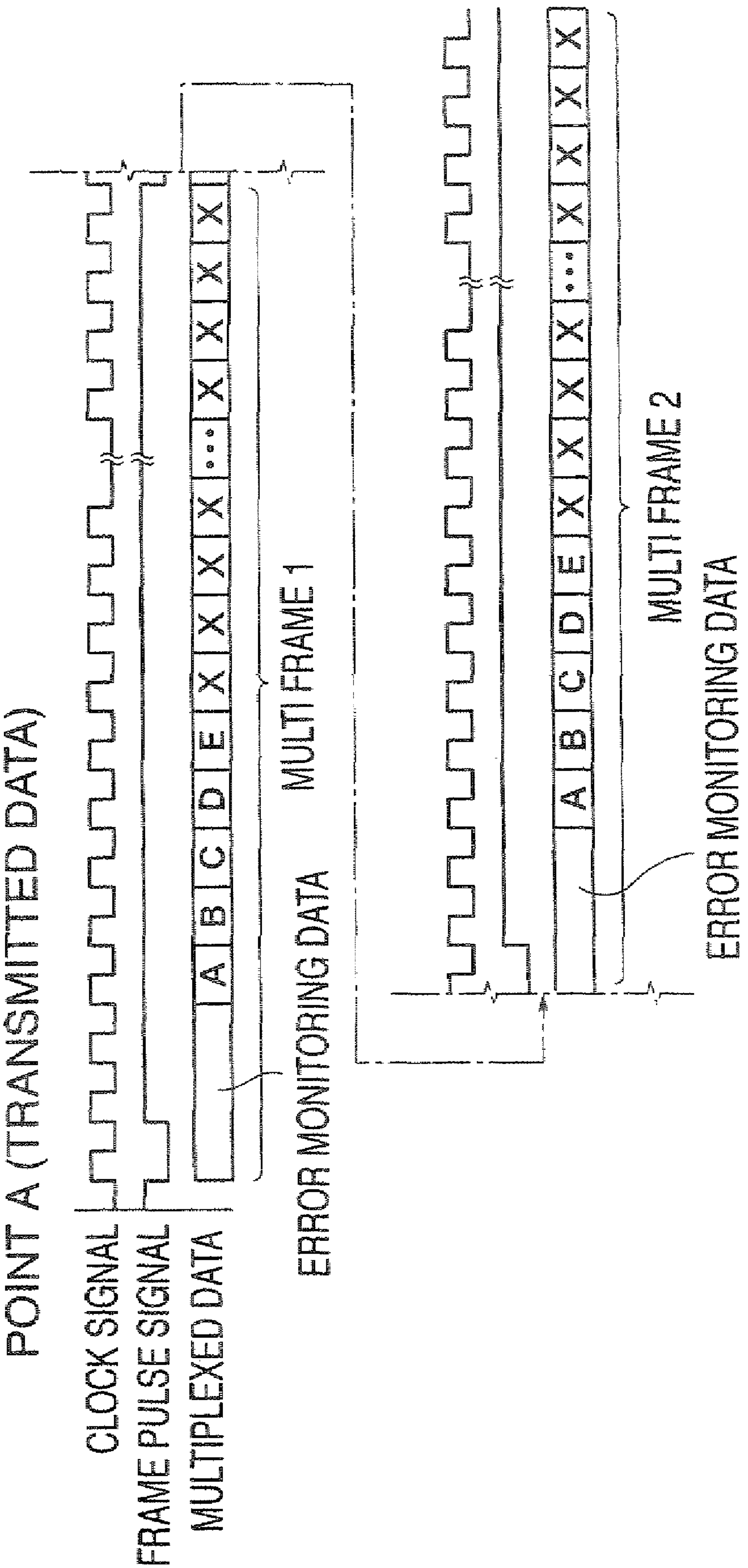
FIGS. 8A and 8B are drawings for explaining operation of a slave switching circuit appearing in FIG. 7A, and show respectively transmitted data transmitted at points A and B of the slave switching circuit appearing in FIGS. 7B and 7C.
Figure 8B:
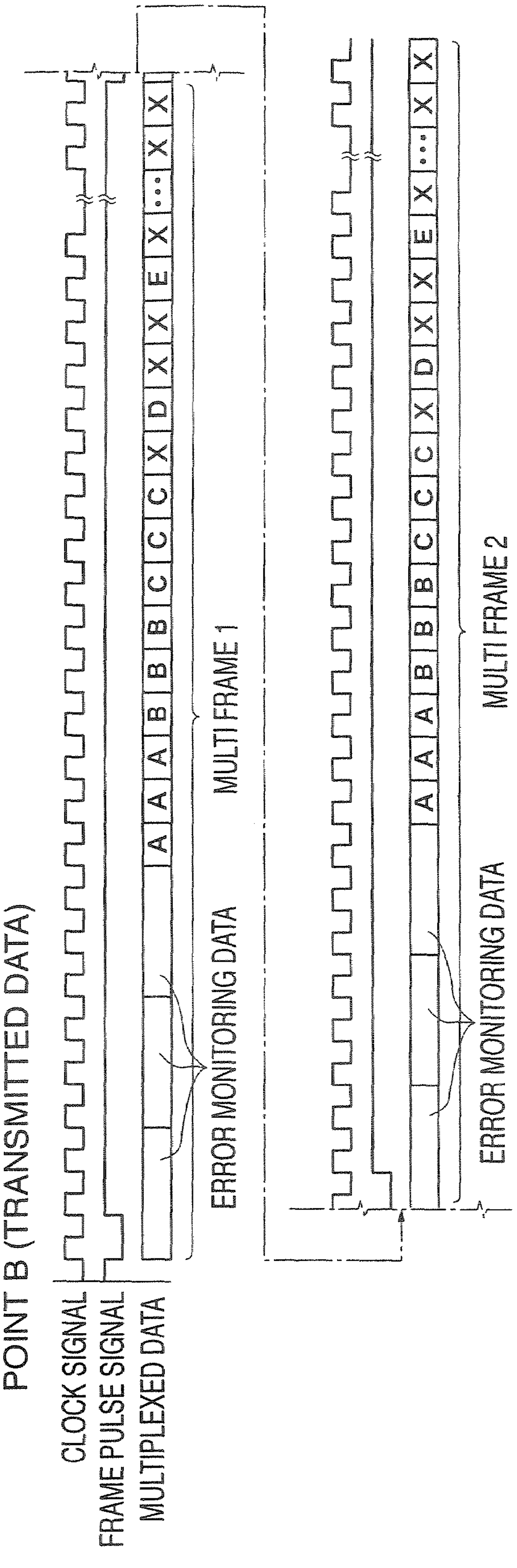
Figures 8C, 8D, 8E:
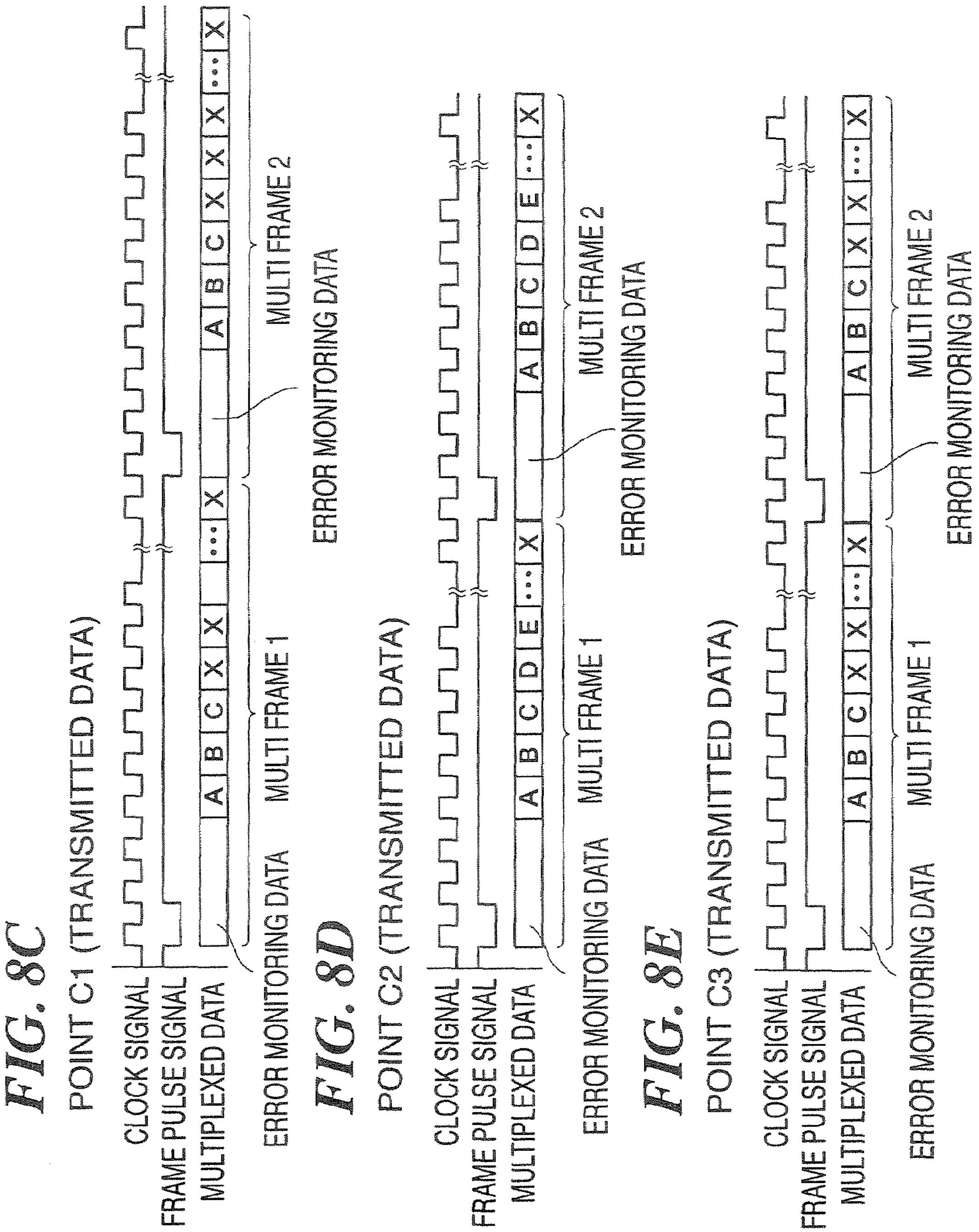
FIGS. 8C to 8E are drawings for explaining the operation of the slave switching circuit appearing in FIG. 7A, and show respectively transmitted data transmitted at points C1, C2, and C3 of the slave switching circuit appearing in FIG. 7B.

Next, the multiplexing circuit 610 outputs the clock signal, the frame pulse signal produced by the frame pulse signal producing circuit 611, and the multiplexed signal produced by the multiplexer 613 as a single piece of transmitted data (see FIG. 8A).

As in the case of the memory 120 appearing in FIG. 1, the multiplexed signal produced through the multiplexing by the multiplexing circuit 610 is stored in the dual port memory circuit 620 in accordance with control from the write address circuit 621. In write address setting data in the write address setting memory 623, the relationship between the order of the component data of the multiplexed signal and write destination addresses is set such that the component data of the multiplexed signal is written to predetermined addresses in the dual port memory circuit 620 in order from the top. In the dual port memory circuit 620, the pieces of component data of the multiplexed signal are written to the predetermined addresses from the top in accordance with the write address setting data under control from the write address control circuit 622.

Specifically, in the dual port memory circuit 620, the error monitoring data which is the piece of component data at the top of the multiplexed signal is written to a predetermined address in the dual port memory circuit 620, for example the address having the youngest number, the interlock factor signal A which is the $2^{nd}$ piece of component data is written to the next address, the interlock factor signal B which is the $3^{rd}$ piece of component data is written to the next address after that, the interlock factor signal C which is the $4^{th}$ piece of component data is written to the next address after that, and so on in order, the component data of one frame of the multiplexed signal being written to successive addresses.

The multiplexed signal that has been written into the dual port memory circuit 620 is next read out from the dual port memory circuit 620 in accordance with control from the read address circuit 624. In read address setting data from the read address setting memory 626 is set the relationship between the component data to be read out, the order of reading out the component data, and the read addresses of the component data, such that the error monitoring data is first read out by a number of times equal to the number m of separated signals (multiplexed signals) to be outputted from the demultiplexer 630 (for the slave switching circuit 600, m=3), and then the interlock factor signals that will be the respective pieces of component data of the separated signals outputted from the demultiplexer 630 are read out one at a time in order.

That is, first, the error monitoring data is read out three times, next the interlock factor signal A which is one of the interlock factor signals of the separated signal to be sent to the interlock circuit 661 (hereinafter referred to as the “separated signal A”) (see FIG. 8C) is read out, the interlock factor signal A which is one of the interlock factor signals of the separated signal to be sent to the interlock circuit 662 (hereinafter referred to as the “separated signal B”) (see FIG. 8D) is read out, and the interlock factor signal A which is one of the interlock factor signals of the separated signal to be sent to the driver circuit 643 (hereinafter referred to as the “separated signal C”) (see FIG. 8E) is read out, next the interlock factor signal B which is one of the interlock factor signals of the separated signal A, the interlock factor signal B which is one of the interlock factor signals of the separated signal B, the interlock factor signal B which is one of the interlock factor signals of the separated signal C, the interlock factor signal C which is one of the interlock factor signals of the separated signal A, the interlock factor signal C which is one of the interlock factor signals of the separated signal B, and the interlock factor signal C which is one of the interlock factor signals of the separated signal C are read out in order, then a blank signal is read out because all of the interlock factor signals of the separated signal A have already been read out, the interlock factor signal D which is one of the interlock factor signals of the separated signal B is read out, a blank signal is read out because all of the interlock factor signals of the separated signal C have already been read out, and a blank signal, the interlock factor signal E which is one of the interlock factor signals of the separated signal B, and a blank signal are read out in order, i.e. the reading is carried out until all of the interlock factor signals of each of the separated signals have been read out.

In the reading described above, the number of times of reading out component data is the same for all of the separated signals; when all of the interlock factor signals for a separated signal have been read out, a blank signal is read out as described above. That is, the reading is carried out such that each of the separated signals becomes the same length. Moreover, the dual port memory circuit 620 multiplexes each of the pieces of component data in the order read out (see FIG. 8B). Note that the length of one frame of the multiplexed signal produced is one pulse period of the frame pulse signal outputted from the multiplexing circuit 610. Moreover, the speed of the multiplexing here is m times (the number of outputs of the demultiplexer 630) the speed of the multiplexing by the multiplexer 613. That is, the speed is three times the speed of the multiplexing by the multiplexer 613. Next, the dual port memory circuit 620 outputs transmitted data containing the clock signal, the frame pulse signal, and the read out multiplexed signal (see FIG. 8B).

Next, in the demultiplexer 630, the pieces of component data of the multiplexed signal read out from the dual port memory circuit 620 are allotted to the output terminals in order from the top one at a time in order. Specifically, the pieces of component data of the multiplexed signal are allotted to the terminals in order one at a time until the component data runs out, i.e. the error monitoring data that is the piece of component data at the top of the multiplexed signal is allotted to the first output terminal 631, the error monitoring data that is the $2^{nd}$ piece of component data of the multiplexed signal is allotted to the second output terminal 632, the error monitoring data that is the $3^{rd}$ piece of component data of the multiplexed signal is allotted to the third output terminal 633, the interlock factor signal A that is the $4^{th}$ piece of component data of the multiplexed signal is allotted to the first output terminal 631, the interlock factor signal A that is the $5^{th}$ piece of component data of the multiplexed signal is allotted to the second output terminal 632, the interlock factor signal A that is the $6^{th}$ piece of component data of the multiplexed signal is allotted to the third output terminal 633, and then the $7^{th}$ interlock factor signal B, the $8^{th}$ interlock factor signal B, the $9^{th}$ interlock factor signal B, the $10^{th}$ interlock factor signal C, the $11^{th}$ interlock factor signal C, the $12^{th}$ interlock factor signal C, the $13^{th}$ blank signal X, the $14^{th}$ interlock factor signal D, the $15^{th}$ and $16^{th}$ blank signals X, the $17^{th}$ interlock factor signal E, and the $18^{th}$ blank signal X are allotted to the first, second, and third output terminals 631, 632, and 633 alternately (see FIGS. 8C, 8D, and 8E).

Next, the allotted signals are multiplexed to produce separated signals. Here, the separated signal A to be sent to the interlock circuit 661 corresponding to the first output terminal 631 is produced (see FIG. 8C), the separated signal B to be sent to the interlock circuit 662 corresponding to the second output terminal 632 is produced (see FIG. 8D), and the separated signal C to be sent to the driver circuit 643 corresponding to the third output terminal 633 is produced (see FIG. 8E). The demultiplexer 630 carries out the separation and the multiplexing such that the length of each of the separated signals is one pulse period of the received frame pulse signal.

Next, the demultiplexer 630 outputs transmitted data containing the clock signal, the frame pulse signal, and the separated signal A from the first output terminal 631 to the safety circuit 651, transmitted data containing the clock signal, the frame pulse signal, and the separated signal B from the second output terminal 632 to the safety circuit 655, and transmitted data containing the clock signal, the frame pulse signal, and the separated signal C from the third output terminal 633 to the driver circuit 643.

In the safety circuit 651, the error monitoring circuit 652 monitors whether or not the clock signal is missing from the received transmitted data, and inspects the received frame pulse signal and separated signal A so as to monitor whether or not the two types (55/AA) of error monitoring data (see FIG. 3) attached by the multiplexer 613 are attached alternately each pulse signal, thus monitoring for data omission, data bit slippage and so on in the separated signal. In the case that the clock signal is not missing, and the two types of error monitoring data attached by the multiplexer 613 are attached alternately each frame pulse signal, it is determined that there is no data omission, data bit slippage or the like in the separated signal, and hence that there is no error in the separated signal. On the other hand, in the case that the clock signal is missing, or the two types of error monitoring data attached by the multiplexer 613 are not attached alternately each frame pulse signal, it is determined that data omission, data bit slippage or the like has arisen in the separated signal, and hence that there is an error in the separated signal, in which case an error signal is sent to the signal producing circuit 653, and a switching signal is sent to the selecting circuit 654.

Next, upon receiving the error signal from the error monitoring circuit 652, the signal producing circuit 653 changes the value of each of the interlock factor signals in the separated signal A (the interlock factor signals A, B, and C) to a preset value ON or OFF such that the interlock circuit 661 to which the separated signal A is to be sent will drive the gas supply apparatus 47 that is the interlock destination toward safety, thus producing a predetermined safe driving signal, and sends the safe driving signal to the selecting circuit 654. The signal producing circuit 653 produces, for example, a safe driving signal in which the interlock factor signal A is an ON signal, the interlock factor signal B is an ON signal, and the interlock factor signal C is an ON signal. As a result, the gas supply apparatus 47 will stop and suspend gas supply, i.e. the gas supply apparatus 47 will be driven toward safety.

Next, in the case of receiving the switching signal from the error monitoring circuit 652, i.e. in the case that there is an error in the separated signal A, the selecting circuit 654 sends the safe driving signal to the decoding circuit 641, whereas in the case of not receiving the switching signal from the error monitoring circuit 652, i.e. in the case that there is no error in the separated signal A, the selecting circuit 654 sends the separated signal A to the decoding circuit 641 as is.

The safety circuit 655 operates similarly to the safety circuit 651. That is, in the case that the error monitoring circuit 656 determines that there is an error in the received separated signal B, the signal producing circuit 657 produces a safe driving signal for driving the vacuum equipment toward safety, and the selecting circuit 658 outputs the safe driving signal to the decoding circuit 642. On the other hand, in the case that the error monitoring circuit 656 determines that there is no error in the received separated signal B, the selecting circuit 658 outputs the received separated signal B to the decoding circuit 642 as is. Here, the signal producing circuit 657 produces, for example, a safe driving signal in which all of the interlock factor signals A, B, C, D, and E are ON signals. As a result, the vacuum equipment will stop and suspend evacuation, i.e. the vacuum equipment will be driven toward safety.

Upon receiving the separated signal or the safe driving signal from the safety circuit 651, the decoding circuit 641 decodes the received separated signal or safe driving signal, separating the separated signal or safe driving signal into component signals, extracts only the interlock factor signals (the interlock factor signals A, B, and C), and outputs the interlock factor signals to the interlock circuit 661. The decoding circuit 642 similarly decodes the received separated signal or safe driving signal, separating the separated signal or safe driving signal into component signals, extracts only the interlock factor signals (the interlock factor signals A, B, C, D, and E), and outputs the interlock factor signals to the interlock circuit 662.

On the other hand, the driver circuit 643 transmits the separated signal C received from the demultiplexer 630 to the master switching circuit 800.

Upon receiving the interlock factor signals A, B, and C from the decoding circuit 641, the interlock circuit 661 then analyzes the contents of the received interlock factor signals A, B, and C, i.e. determines whether each of the interlock factor signals is an ON signal or an OFF signal, and implements interlock control on the gas supply apparatus 47 as described above in accordance with the combination of the contents of the interlock factor signals A, B, and C.

That is, the interlock circuit 661 issues an interlock command A to the gas supply apparatus 47 commanding the gas supply apparatus 47 to stop and suspend gas supply of the processing gas in the case of any of the following conditions: the case that the value of the interlock factor signal A is in the ON state and hence the gate valve 44 is in the open state, the case that the value of the interlock factor signal B is in the ON state and hence a gas leak has arisen in the gas supply apparatus 47, or the case that the interlock factor signal C is in the ON state and hence the processing space S in the vacuum vessel 11 is in the atmospheric pressure state. Upon receiving the interlock command A, the gas supply apparatus 47 stops and suspends gas supply of the processing gas. On the other hand, in the case that none of the value of the interlock factor signal A, the value of the interlock factor signal B, and the value of the interlock factor signal C is ON, the interlock circuit 661 does not issue the interlock command A.

Similarly, the interlock circuit 662 analyzes the contents of the received interlock factor signals A, B, C, D, and E, and implements interlock control on the vacuum equipment as described above in accordance with the combination of the contents of the interlock factor signals A, B, C, D, and E.

That is, the interlock circuit 662 issues an interlock command B to the vacuum equipment commanding the vacuum equipment to stop and suspend evacuation of the vacuum vessel 11 in the case of any of the following conditions: the case that the value of the interlock factor signal A is ON and hence the gate valve 44 is in the open state, the case that the interlock factor signal B is in the ON state and hence a gas leak has arisen in the gas supply apparatus 47, the case that the interlock factor signal C is in the ON state and hence the processing space S in the vacuum vessel 11 is in the atmospheric pressure state, the case that the interlock factor signal D is in the ON state and hence the pressure of the air supplied from the utility supply apparatus 52 has decreased below the predetermined pressure, or the case that the interlock factor signal E is in the ON state and hence a fault has arisen in the gas detoxifying apparatus 50. Upon receiving the interlock command B, the vacuum equipment stops and suspends evacuation of the vacuum vessel 11. On the other hand, in the case that none of the values of the interlock factor signals A, B, C, D, and E is ON, the interlock circuit 662 does not issue the interlock command B.

Next, the operation of the slave switching circuit 700 will be described.

The A/D converting circuits 701 and 702 convert the interlock factor signals D and E received respectively from the air supply pressure monitoring sensor 53 and from the gas detoxifying apparatus 50 via the gas detoxifying apparatus I/F **50*a*** into digital signals through A/D conversion.

Next, the multiplexer 713 multiplexes together error monitoring data produced by the error monitoring data producing circuit 712 (see FIG. 3), and the interlock factor signals D and E that have been subjected to the A/D conversion, so as to produce a multiplexed signal.

Similarly to for the multiplexer 613 of the slave switching circuit 600, the multiplexer 713 multiplexes the received interlock factor signals in alphabetical order after the error monitoring data so as to produce the multiplexed signal. The length of one frame of the produced multiplexed signal is a length corresponding to one pulse period of the frame pulse signal from the frame pulse signal producing circuit 711 (see FIG. 9A), blank signals being multiplexed on in the case that the multiplexed signal produced by multiplexing together the error monitoring data and the received interlock factor signals is shorter than the frame length stipulated by the frame pulse signal. The multiplexed signal produced by the multiplexer 713 is thus a signal in which are multiplexed the error monitoring data, the interlock factor signals D and E, and a predetermined number of blank signals in this order as shown in FIG. 9A. Note that the interlock factor signals A, B, and C are not interlock factors for the interlock circuit 761, and hence these interlock factor signals are not transmitted from the master switching circuit 800.

Next, the multiplexing circuit 710 outputs the clock signal, the frame pulse signal produced by the frame pulse signal producing circuit 711, and the multiplexed signal produced by the multiplexer 713 as a single piece of transmitted data (see FIG. 9A).

The multiplexed signal produced through the multiplexing by the multiplexing circuit 710 is stored in the dual port memory circuit 720 in accordance with control from the write address circuit 721. Similarly to for the write address setting memory 623 of the slave switching circuit 600, in write address setting data in the write address setting memory 723, the relationship between the order of the component data of the multiplexed signal and write destination addresses is set such that the component data of the multiplexed signal is written to predetermined addresses in the dual port memory circuit 720 in order from the top. In the dual port memory circuit 720, the pieces of component data of the multiplexed signal are written to the predetermined addresses from the top in accordance with the write address setting data under control from the write address control circuit 722.

The multiplexed signal that has been written into the dual port memory circuit 720 is next read out from the dual port memory circuit 720 in accordance with control from the read address control circuit 724. Similarly to for the read address setting memory 626 of the slave switching circuit 600, in read address setting data from the read address setting memory 726 is set the relationship between the component data to be read out, the order of reading out the component data, and the read addresses of the component data, such that the error monitoring data is first read out by a number of times equal to the number n of separated signals (multiplexed signals) to be outputted from the demultiplexer 730 (for the slave switching circuit 700, n=2), and then the interlock factor signals that will be the respective pieces of component data of the separated signals outputted from the demultiplexer 730 are read out one at a time in order.

That is, first, the error monitoring data is read out twice, next the interlock factor signal D which is one of the interlock factor signals of the separated signal to be sent to the interlock circuit 761 (hereinafter referred to as the "separated signal D") (see FIG. 9C) is read out, the interlock factor signal D which is one of the interlock factor signals of the separated signal to be sent to the driver circuit 742 (hereinafter referred to as the "separated signal E") (see FIG. 9D) is read out, then the interlock factor signal E which is one of the interlock factor signals of the separated signal D, and the interlock factor signal E which is one of the interlock factor signals of the separated signal E are read out, and then a predetermined number of blank signals are read out.

Moreover, the dual port memory circuit 720 multiplexes each of the pieces of component data in the order read out (see FIG. 9B). Note that the length of one frame of the multiplexed signal produced is one pulse period of the frame pulse signal outputted from the multiplexing circuit 710. Moreover, the speed of the multiplexing here is n times (the number of outputs of the demultiplexer 730) the speed of the multiplexing by the multiplexer 713. That is, the speed is twice the speed of the multiplexing by the multiplexer 713. Next, the dual port memory circuit 720 outputs transmitted data containing the clock signal, the frame pulse signal, and the read out multiplexed signal (see FIG. 9B).

Next, in the demultiplexer 730, the pieces of component data of the multiplexed signal read out from the dual port memory circuit 720 are allotted to the output terminals in order from the top one at a time in order. Specifically, the pieces of component data of the multiplexed signal are allotted to the terminals in order one at a time until the component data runs out, i.e. the error monitoring data that is the piece of component data at the top of the multiplexed signal is allotted to the first output terminal 731, the error monitoring data that is the $2^{nd}$ piece of component data of the multiplexed signal is allotted to the second output terminal 732, the interlock factor signal D that is the $3^{rd}$ piece of component data of the multiplexed signal is allotted to the first output terminal 731, the interlock factor signal D that is the $4^{th}$ piece of component data of the multiplexed signal is allotted to the second output terminal 732, and then the $5^{th}$ interlock factor signal E, and the $6^{th}$ interlock factor signal E are allotted to the first and second output terminals 731 and 732 alternately (see FIGS. 9C and 9D).

Next, the allotted signals are multiplexed to produce separated signals. Here, the separated signal D to be sent to the interlock circuit 761 corresponding to the first output terminal 731 is produced (see FIG. 9C), and the separated signal E to be sent to the driver circuit 742 corresponding to the second output terminal 732 is produced (see FIG. 9D). The demultiplexer 730 carries out the separation and the multiplexing such that the length of each of the separated signals is one pulse period of the received frame pulse signal.

Next, the demultiplexer 730 outputs transmitted data containing the clock signal, the frame pulse signal, and the separated signal D from the first output terminal 731 to the safety circuit 751, and transmitted data containing the clock signal, the frame pulse signal, and the separated signal E from the second output terminal 732 to the driver circuit 742.

The safety circuit 751 operates similarly to the safety circuit 651 of the slave switching circuit 600. That is, in the case that the error monitoring circuit 752 determines that there is an error in the received separated signal D, the signal producing circuit 753 produces a safe driving signal for driving the utility supply apparatus 52 toward safety, and the selecting circuit 754 outputs the safe driving signal to the decoding circuit 741. On the other hand, in the case that the error monitoring circuit 752 determines that there is no error in the received separated signal D, the selecting circuit 754 outputs the received separated signal D to the decoding circuit 741 as is. Here, the signal producing circuit 753 produces, for example, a safe driving signal in which both of the interlock factor signals D and E are ON signals. As a result, the utility supply apparatus 52 will stop supply of the air, water, and $N_2$ gas, i.e. the utility supply apparatus 52 will be driven toward safety.

Upon receiving the separated signal or the safe driving signal from the safety circuit 751, the decoding circuit 741 decodes the received separated signal or safe driving signal, separating the separated signal or safe driving signal into component signals, extracts only the interlock factor signals (the interlock factor signals D and E), and outputs the interlock factor signals to the interlock circuit 761.

On the other hand, the driver circuit 742 transmits the separated signal E received from the demultiplexer 730 to the master switching circuit 800.

Upon receiving the interlock factor signals D and E from the decoding circuit 741, the interlock circuit 761 then analyzes the contents of the received interlock factor signals D and E, i.e. determines whether each of the interlock factor signals is an ON signal or an OFF signal, and implements interlock control on the utility supply apparatus 52 as described above in accordance with the combination of the contents of the interlock factor signals D and E. That is, the interlock circuit 761 issues an interlock command C to the utility supply apparatus 52 commanding the utility supply apparatus 52 to stop supply of the processing air, water, and $N_2$ gas in the case of either of the following conditions: the value of the interlock factor signal D is ON and hence the pressure of the air supplied from the utility supply apparatus 52 has decreased below the predetermined pressure required for driving the systems such as the gate valve 44 of the plasma processing apparatus 10, or the case that the interlock factor signal E is in the ON state and hence a fault has arisen in the gas detoxifying apparatus 50. Upon receiving the interlock command C, the utility supply apparatus 52 stops supply of the air, water, and $N_2$ gas. On the other hand, in the case that neither the value of the interlock factor signal D nor the value of the interlock factor signal E is ON, the interlock circuit 761 does not issue the interlock command C.

Next, the operation of the master switching circuit 800 will be described.

As described above, transmitted data containing respectively the separated signals C and E transmitted respectively from the driver circuits 643 and 742 of the slave switching circuits 600 and 700 (see FIG. 8E and FIG. 9D) are received by the safety circuits 810 and 820.

Similarly to in the safety circuit 651, in each of the safety circuits 810 and 820, the error monitoring circuit 811 or 821 inspects for the clock signal being missing and inspects the error monitoring data, thus determining whether or not there is an error. In the case that there is no error, the received transmitted data is outputted from the selecting circuit 813 or 823 as is. On the other hand, in the case that there is an error, the multiplexed signal is made to be a safe driving signal obtained by the signal producing circuit 812 or 822 by changing the contents of each of the interlock factor signals in the separated signal C or E to a preset value (ON or OFF) such that the vacuum equipment, the gas supply apparatus 47, and the utility supply apparatus 52 will be driven toward safety, and the safe driving signal is outputted from the selecting circuit 813 or 823 together with the clock signal and the frame pulse signal. The signal producing circuit 812 produces, for example, a safe driving signal in which each of the interlock factor signals A, B, and C is an ON signal. Moreover, the signal producing circuit 822 produces, for example, a safe driving signal in which both of the interlock factor signals D and E are ON signals. As a result, the vacuum equipment, the gas supply apparatus 47, and the utility supply apparatus 52 will be driven toward safety.

Next, similarly to for the multiplexer 613 of the slave switching circuit 600 described above, the multiplexer 833 multiplexes the received multiplexed signals in a preset order. Specifically, the multiplexer 833 multiplexes the received interlock factor signals in alphabetical order after the error monitoring data so as to produce a multiplexed signal. The multiplexer 833 produces the multiplexed signal such that the length of one frame of the produced multiplexed signal is a length corresponding to one pulse period of the received frame pulse signal. In the case that the multiplexed signal produced by multiplexing together the error monitoring data and the received interlock factor signals is shorter than the frame length stipulated by the frame pulse signal, the multiplexer 833 multiplexes on a predetermined number of blank signals so as to make the length of the produced multiplexed signal be the frame length.

Next, the multiplexing circuit 830 outputs the clock signal, the frame pulse signal, and the produced multiplexed signal as a single piece of transmitted data (see FIG. 10A).

The multiplexed signal produced through the multiplexing by the multiplexer 833 is stored in the dual port memory circuit 840 in accordance with control from the write address circuit 841. Similarly to for the write address setting data in the slave switching circuit 600, in write address setting data in the write address setting memory 843, the relationship between the component data of the multiplexed signal, the order of the component data, and write destination addresses is set such that the component data of the multiplexed signal is written to predetermined addresses in the dual port memory circuit 840 in order from the top. In the dual port memory circuit 840, the pieces of component data of the multiplexed signal are written to the predetermined addresses from the top in accordance with the write address setting data under control from the write address control circuit 842. Specifically, in the dual port memory circuit 840, the error monitoring data which is the piece of component data at the top of the multiplexed signal is written to a predetermined address in the dual port memory circuit 840, for example the address having the youngest number, the interlock factor signal A which is the $2^{nd}$ piece of component data is written to the next address, and then the interlock factor signals B, C, D, and E which are the $3^{rd}$, $4^{th}$, $5^{th}$, and $6^{th}$ pieces of component data are written to successive addresses, the component data of one frame of the multiplexed signal being written to successive addresses in order.

The multiplexed signal that has been written into the dual port memory circuit 840 is next read out from the dual port memory circuit 840 in accordance with control from the read address circuit 844. Similarly to for the read memory address setting data in the slave switching circuit 600, in read address setting data from the read address setting memory 846 is set the relationship between the component data to be read out, the order of reading out the component data, and the read addresses of the component data, such that the error monitoring data is first read out by a number of times equal to the number p of separated signals (multiplexed signals) to be outputted from the demultiplexer 850 (for the master switching circuit 800, p=2), and then the interlock factor signals that will be the respective pieces of component data of the separated signals outputted from the demultiplexer 850 are read out one at a time in order.

For the master switching circuit 800, first, the error monitoring data is read out once, and then because there is no need to send interlock factor signals to the slave switching circuit 700 for the present interlock control, a blank signal is read out as a component signal of the separated signal to be sent to the slave switching circuit 700 (hereinafter referred to as the "separated signal G") Next, the interlock factor signal D which is one of the interlock factor signals of the separated signal to be sent to the slave switching circuit 600 (hereinafter referred to as the "separated signal F") (see FIG. 10C) is read out, a blank signal X is read out, the interlock factor signal E which is one of the interlock factor signals of the separated signal F is read out, and a blank signal X is read out, and then because all of the interlock factor signals of the separated signal F have already been read out, a predetermined number of blank signals are read out. Moreover, the dual port memory circuit 840 multiplexes each of the pieces of component data in the order read out to produce a multiplexed signal, and outputs the multiplexed signal together with the clock signal and the frame pulse signal (see FIG. 10B). Note that the length of one frame of the multiplexed signal produced is one pulse period of the received frame pulse signal, blank signals X being read out such as to become this length.

Next, in the demultiplexer 850, the pieces of component data of the multiplexed signal read out from the dual port memory circuit 840 are allotted to the output terminals in order from the top one at a time in order. Specifically, the pieces of component data of the multiplexed signal are allotted to the terminals in order one at a time until the component data runs out, i.e. the error monitoring data that is the piece of component data at the top of the multiplexed signal is allotted to a first output terminal 851, the blank signal X that is the $2^{nd}$ piece of component data is allotted to a second output terminal 852, and then the interlock factor signal D, the blank signal X, the interlock factor signal E, and the blank signal X that are the $3^{rd}$, $4^{th}$, $5^{th}$, and $6^{th}$ pieces of component data are allotted to the first and second output terminals 851 and 852 alternately. Next, the allotted signals are multiplexed to produce separated signals. Here, the separated signal F to be sent to the slave switching circuit 600 corresponding to the first output terminal 851 is produced (see FIG. 10C), and the separated signal G to be sent to the slave switching circuit 700 corresponding to the second output terminal 852 is produced. The separated signal G is comprised of only blank signals X. The demultiplexer 850 carries out the separation and the multiplexing such that the length of each of the separated signals is one pulse period of the received frame pulse signal.

Next, the demultiplexer 850 outputs transmitted data containing the clock signal, the frame pulse signal, and the separated signal F from the first output terminal 851 (see FIG. 10C) to the driver circuit 871, and transmitted data containing the clock signal, the frame pulse signal, and the separated signal G from the second output terminal 852 to the driver circuit 872.

The driver circuit 871 sends the transmitted data to the safety circuit 670 via the receiver circuit 691 of the slave switching circuit 600.

In the slave switching circuit 600, the safety circuit 670 operates similarly to the safety circuit 651. That is, in the case that the error monitoring circuit 671 determines that there is an error in the received separated signal F, the signal producing circuit 672 produces a safe driving signal for driving the vacuum equipment, the gas supply apparatus 47, and the utility supply apparatus 52 toward safety, and the selecting circuit 673 outputs the safe driving signal to the multiplexer 613. On the other hand, in the case that the error monitoring circuit 671 determines that there is no error in the received separated signal F, the selecting circuit 673 outputs the received separated signal F to the multiplexer 613 as is. Here, the signal producing circuit 672 produces, for example, a safe driving signal in which both of the interlock factor signals D and E are ON signals. As a result, the vacuum equipment, the gas supply apparatus 47, and the utility supply apparatus 52 will be driven toward safety.

On the other hand, the driver circuit 872 sends the transmitted data to the receiver circuit 791 of the slave switching circuit 700. As described above, for the slave switching circuit 700, the interlock factor signals from the slave switching circuit 600 are not required for the interlock control on the utility supply apparatus 52, and hence the receiver circuit 791 does not output the transmitted data received from the master switching circuit 800 to the safety circuit 770. Alternatively, it may be such that the driver circuit 872 of the master switching circuit 800 does not send the transmitted data (blank signals) to the receiver circuit 791 of the slave switching circuit 700.

As described above, according to the interlock control apparatus 66 of the working example of the present invention, when implementing interlock control between a plurality of control modules, interlock factor signals sent and received between the control modules (the slave switching circuits) are sent and received in multiplexed form. As a result, the number of signals sent and received between the control modules can be reduced, and hence the amount of wiring for connecting the control modules together can be reduced. The structure of the interlock control apparatus can thus be simplified, and hence the structure of the system controller 60 of the plasma processing apparatus 10 can be simplified.

Moreover, according to the interlock control apparatus 66, the control modules (the slave switching circuits) are connected together by the master switching circuit, and interlock factor signals required for the interlock control in each of the control modules are sent by the master switching circuit to the respective control modules in multiplexed form. As a result, the number of signals sent and received between the control modules can be further reduced, and hence the amount of wiring for connecting the control modules together can be further reduced. The structure of the interlock control apparatus can thus be further simplified.

According to the interlock control apparatus 66, conditions for multiplexing and separating the sent and received interlock factor signals are set through changeable preset conditions such as multiplexing conditions for the multiplexers 613, 713, and 833 in the slave switching circuits and the master switching circuit, the write address setting data for the write address circuits 621, 721, and 841, the read address setting data for the read address circuits 624, 724, and 844, separating conditions for the demultiplexers 630, 730, and 850, and the pulse period of the frame pulse signal. As a result, even if functions of the control modules are added or changed, or a new control module is added, desired interlock control can be carried out between the control modules by changing the above preset conditions. In this way, the interlock control apparatus 66 can easily cope with addition or changing of the functions of the control modules in the plasma processing apparatus 10, or addition of a new control module.

The interlock control apparatus 66 has safety circuits, and in the case that there is an error in transmitted data transmitted between the control modules, a safety circuit produces a signal for driving the vacuum equipment, the gas supply apparatus 47, and the utility supply apparatus 52 toward safety. As a result, in the case that an error has arisen in transmitted data transmitted between the control modules, control is carried out such as to drive the equipment including the vacuum equipment, the gas supply apparatus 47, and the utility supply apparatus 52 toward safety. The safety of the interlock control apparatus can thus be improved, and hence the safety of the plasma processing apparatus can be improved.

In the interlock control apparatus 66, each of the slave switching circuits and the master switching circuit has a data storing circuit, it being possible to connect a monitoring terminal to the data storing circuit via an I/F. As a result, an operator can easily inspect state detecting signals, i.e. interlock factor signals, that are multiplexed and transmitted. The operator can thus easily inspect the state of the plasma processing apparatus 10 from the interlock factor signals, and hence can easily analyze the cause or the like in the case that a problem has arisen.

In the interlock control apparatus 66 according to the embodiment of the present invention, interlock control is implemented between two control modules out of the control modules of the plasma processing apparatus 10, but the interlock control apparatus 66 may implement interlock control between a larger number of control modules by increasing the number of slave switching circuits. In this case, effects as described above can again be achieved.

Moreover, for the interlock control apparatus 66, the interlock factor signals detected by the control module 61 are not used in the interlock control on the utility supply apparatus 52, which is an interlock destination for the control module 62, by the slave switching circuit 700. However, similarly to for the slave switching circuit 600, the slave switching circuit 700 may use the interlock factor signals sent from the other slave switching circuit 600 in the interlock control on the interlock destination.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. An interlock control apparatus, comprising:

a plurality of control modules, each of which controls driving of at least one piece of equipment and includes a slave switching apparatus; and a master switching apparatus connected to said plurality of control modules, wherein each of said slave switching apparatuses comprises:

a multiplexing apparatus that produces a multiplexed signal by multiplexing state detecting signals, each of which indicates any of a plurality of states of a piece of the equipment whose driving is controlled by a corresponding control module;

a storage apparatus that stores the multiplexed signal;

a reading apparatus that reads out the stored multiplexed signal;

a separating apparatus that separates the read out multiplexed signal so as to produce a plurality of separated signals; and a transmitting apparatus that transmits predetermined separated signals out of the separated signals to said master switching apparatus, wherein said master switching apparatus transmits at least one signal of the predetermined separated signals from another one of said slave switching apparatuses to a predetermined one of said slave switching apparatuses, wherein a part of the plurality of separated signals includes the at least one signal transmitted through said master switching apparatus from an other one of said slave switching apparatuses, and wherein the predetermined one of said slave switching apparatuses is provided with at least one controller that controls driving of a corresponding piece of the equipment based on the plurality of separated signals.

2. An interlock control apparatus as claimed in claim 1, wherein said multiplexing apparatus multiplexes the state detecting signals in a preset order, and said reading apparatus reads out the state detecting signals from the stored multiplexed signal based on preset conditions and re-multiplexes the read out state detecting signals in a read out order.

3. An interlock control apparatus as claimed in claim 1, further comprising:

a separated signal monitoring apparatus that determines whether or not one of the separated signals is normal, and in response to a separated signal not being normal, produces a control signal for driving the piece of the equipment corresponding to the not normal separated signal toward safety, and outputs the control signal to said controller corresponding to the not normal separated signal.

4. An interlock control apparatus as claimed in claim 1, wherein each of said slave switching apparatuses has a monitoring interface enabling display of the multiplexed signal.

5. An interlock control apparatus as claimed in claim 1, wherein said master switching apparatus comprises:

a master multiplexing apparatus that produces a master multiplexed signal by multiplexing the predetermined separated signals transmitted respectively by said transmitting apparatuses, a master storage apparatus that stores the master multiplexed signal, a master reading apparatus that reads out the stored master multiplexed signal, a master separating apparatus that separates the read out master multiplexed signal so as to produce a plurality of master separated signals, and an output apparatus that outputs one of the master separated signals to one of said slave switching apparatuses.

6. An interlock control apparatus as claimed in claim 5, wherein said master multiplexing apparatus multiplexes the transmitted predetermined separated signals in a preset order, and said master reading apparatus reads out the state detecting signals from the stored master multiplexed signal based on preset conditions and re-multiplexes the read out state detecting signals in a read out order.

7. An interlock control apparatus as claimed in claim 5, wherein said multiplexing apparatus multiplexes the state detecting signal and the master separated signal.

8. An interlock control apparatus as claimed in claim 5, wherein each of the slave switching apparatuses further comprises:

a master separated signal monitoring apparatus that determines whether or not the master separated signal is normal, and in response to a master separated signal not being normal, produces a control signal for driving the equipment controlled by the control module corresponding to the not normal master separated signal toward safety.

* * * * *